(12) United States Patent
Arai et al.

(10) Patent No.: US 7,516,467 B1
(45) Date of Patent: Apr. 7, 2009

(54) METHOD AND APPARATUS FOR PREPARING AND TRANSMITTING ELECTRONIC PROGRAM INFORMATION AND APPARATUS FOR PRODUCING ELECTRONIC PROGRAM GUIDE FROM THE ELECTRONIC PROGRAM INFORMATION

(75) Inventors: Yuko Arai, Tokyo (JP); Takeshi Nagao, Kawaguchi (JP); Kenichi Fujita, Kawasaki (JP); Hiroki Shinohara, Yokohama (JP); Takayuki Suzuki, Tokyo (JP); Aki Nakagawa, Fujisawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 09/204,142

(22) Filed: Dec. 3, 1998

(30) Foreign Application Priority Data

Dec. 5, 1997 (JP) .................................. 9-352048

(51) Int. Cl.
*H04N 5/445* (2006.01)
*G06F 13/00* (2006.01)
*G06F 3/00* (2006.01)

(52) U.S. Cl. .............................. 725/39; 725/45; 725/56
(58) Field of Classification Search .................. 725/61, 725/39, 45, 56, 50
See application file for complete search history.

(56) References Cited

U.S. PATENT DOCUMENTS

| | | | |
|---|---|---|---|
| 5,223,924 A | 6/1993 | Strubbe | |
| 5,469,431 A * | 11/1995 | Wendorf et al. | 370/254 |
| 5,579,055 A | 11/1996 | Hamilton et al. | |
| 5,625,406 A * | 4/1997 | Newberry et al. | 725/54 |
| 5,642,153 A * | 6/1997 | Chaney et al. | 725/40 |

(Continued)

FOREIGN PATENT DOCUMENTS

DE 196 42 558 A 4/1997

(Continued)

OTHER PUBLICATIONS

Eitz G.: Zukuenftige Informations—Und Datenangebote Beim Digitalen Fernsehen—Rundfunktechnische Mitteilungen, Mensing. Norderstedt, DE. vol. 41, No. 2, Jun. 1, 1997, pp. 67-72, XP000696795, ISSN: 0035-9890.

(Continued)

*Primary Examiner*—Hunter B. Lonsberry
(74) *Attorney, Agent, or Firm*—Michael G. Gilman

(57) ABSTRACT

General electronic program information described on a general level and individual electronic program information described on an individual level are prepared according to electronic program information of a channel service of a broadcast service provider for each channel service according to electronic program information degree of detail setting information. The electronic program information degree of detail setting information indicates a degree of detail for the contents of the individual electronic program information described on an individual level and a degree of detail for contents of the general electronic program information described on a general level. The general level corresponds to a low degree of detail, and the individual level corresponds to a high degree of detail. One piece of individual electronic program information of a particular channel service and pieces of general electronic program information of channel services, other than the particular channel service, are multiplexed and transmitted to each viewer. Accordingly, the general electronic program information and the individual electronic program information can be transmitted while effectively using a data transmission band.

7 Claims, 43 Drawing Sheets

U.S. PATENT DOCUMENTS

| | | | | |
|---|---|---|---|---|
| 5,801,753 | A * | 9/1998 | Eyer et al. | 725/50 |
| 5,850,218 | A * | 12/1998 | LaJoie | 725/45 |
| 5,883,677 | A | 3/1999 | Hofmann | |
| 5,900,915 | A * | 5/1999 | Morrison | 725/44 |
| 6,311,329 | B1 * | 10/2001 | Terakado et al. | 725/44 |
| 6,405,372 | B1 * | 6/2002 | Kim et al. | 725/50 |
| 6,477,705 | B1 * | 11/2002 | Yuen et al. | 725/41 |

FOREIGN PATENT DOCUMENTS

| | | |
|---|---|---|
| DE | 19642558 | 4/1997 |
| EP | 0 662 769 A | 7/1995 |
| EP | 0 662 769 A1 | 7/1995 |
| EP | 0 721 253 | 7/1996 |
| EP | 0721253 | 7/1996 |
| EP | 0 777 385 | 6/1997 |
| EP | 0 784 405 A | 7/1997 |
| EP | 0784405 | 7/1997 |
| EP | 0 854 645 A | 7/1998 |
| EP | 0 854 645 A2 | 7/1998 |
| JP | 08314979 | 11/1996 |
| JP | 08 314979 A | 3/1997 |
| JP | 9-205624 | 8/1997 |
| WO | WO 94/14284 | 6/1994 |
| WO | WO 94/19881 | 9/1994 |
| WO | WO 94/29811 | 12/1994 |
| WO | WO-96/34486 | 10/1996 |
| WO | WO 96 34486 A | 10/1996 |
| WO | WO 96/34491 | 10/1996 |
| WO | WO 97/13368 | 4/1997 |
| WO | WO 97/33434 | 9/1997 |
| WO | WO 97/41690 | 11/1997 |

OTHER PUBLICATIONS

Eitz G: "Zukuenftige Informations-und Datemanagebote beim Digitalen Fernsehen EPG und Lesezeichen" Rundfunktechnische Mitteilungen, Mensing. Norderstedt, DE vol. 41, No. 2, Jun. 1, 1997 ISSN: 0035-9890.

* cited by examiner

FIG. 3

SERVICE DESCRIPTION TABLE (SDT)
INDIVIDUAL LEVEL

| TS ID | TS 1 |
|---|---|
| SERVICE ID | ST100 |
| SERVICE NAME | FUJISAN |
| SERVICE TYPE | SDTV |
| ENTERPRISER NAME | FUJISAN LTD. |
| LOCATION | PRE. SHIZUOKA |

EVENT INFORMATION TABLE (EIT)
INDIVIDUAL LEVEL

| SERVICE ID | ST100 | | | | | | | |
|---|---|---|---|---|---|---|---|---|
| TS ID | TS 1 | | | | | | | |
| EVENT ID | TP3 | TP4 | TP5 | ... | TP9 | TP10 | TP11 | TP12 |
| EVENT NAME | | | | | | | | |
| BROADCASTING START DATE AND TIME | 1/1 0:00 | 1/1 1:00 | 1/1 2:00 | --- | 1/7 22:10 | 1/7 23:00 | 1/7 23:15 | 1/7 23:45 |
| DURATION OF EVENT | 60 | 60 | 30 | --- | 60 | 15 | 30 | 15 |
| CAST | | | | | | | | |
| DIRECTOR | | | | | | | | |
| LOCATION | | | | | | | | |
| GENRE | | | | | | | | |
| ⋮ | | | | | | | | |

"EVENT" DENOTES "TELEVISION PROGRAM"

FIG. 4

SERVICE DESCRIPTION TABLE (SDT)
GENERAL LEVEL

| TS ID | TS1 |
|---|---|
| SERVICE ID | ST100 |
| SERVICE NAME | FUJISAN |
| SERVICE TYPE | SDTV |

EVENT INFORMATION TABLE (EIT)
GENERAL LEVEL

| SERVICE ID | ST100 | | | | | |
|---|---|---|---|---|---|---|
| TS ID | TS1 | | | | | |
| EVENT ID | TP3 | TP4 | TP5 | ... | TP109 | TP110 |
| EVENT NAME | | | | | | |
| BROADCASTING START DATE AND TIME | 1/1 0:00 | 1/1 1:00 | 1/1 2:00 | ... | 1/1 23:50 | 1/1 23:55 |
| DURATION OF EVENT | 60 | 60 | 30 | ... | 5 | 5 |

COMMON ELECTRONIC PROGRAM GUIDE

INDIVIDUAL ELECTRONIC PROGRAM GUIDE

FIG. 10

BOUQUET ASSOCIATION TABLE (BAT)

| BOUQUET ID | B5 | | |
|---|---|---|---|
| BOUQUET NAME | Sb1 | | |
| TS ID | TS20 | | |
| SERVICE ID | ST1 | ST2 | ST3 |

| BOUQUET ID | B6 | | | | | |
|---|---|---|---|---|---|---|
| BOUQUET NAME | Sb2 | | | | | |
| TS ID | TS30 | | | TS40 | | |
| SERVICE ID | ST4 | ST5 | ST6 | ST7 | ST8 | ST9 |

NETWORK INFORMATION TABLE (NIT)

| NETWORK ID | N5 | | |
|---|---|---|---|
| TS ID | TS20 | TS30 | TS40 |
| TUNING INFORMATION | 23.5 | 50.1 | 67.8 |

FIG. 11

PROGRAM ASSOCIATION TABLE (PAT)

| PROGRAM No. | P1 | P2 | P3 |
|---|---|---|---|
| PACKET ID of PMT | PK123 | PK456 | PK789 |

PROGRAM MAP TABLE (PMT)

| PROGRAM No. | P2 | | |
|---|---|---|---|
| ES TYPE | VIDEO | AUDIO | AUDIO |
| PACKET ID of ES | PK122 | PK455 | PK788 |

FIG. 12

EVENT INFORMATION TABLE (EIT)

| SERVICE ID | ST4 | | | | |
|---|---|---|---|---|---|
| TS ID | TS30 | | | | |
| EVENT ID | TP30 | TP35 | TP40 | TP42 | TP89 |
| TITLE | MORNING WEATHER | CYCLING | MORNING NEWS | MORNING VEGETABLES | GET UP! |
| BROADCASTING START DATE AND TIME | '97 11/14 4:00 | '97 11/14 5:00 | '97 11/14 6:00 | '97 11/14 7:00 | '97 11/14 8:00 |
| DURATION OF EVENT | 60 | 60 | 60 | 60 | 60 |

SERVICE DESCRIPTION TABLE (SDT)

| TS ID | TS30 | | |
|---|---|---|---|
| SERVICE ID | ST4 | ST5 | ST6 |
| SERVICE NAME | MOVIE CHANNEL | CHILDREN TV | NEWS! |
| SERVICE TYPE | NVOD | DIGITAL TV | FM RADIO |

| TS ID | TS40 | | |
|---|---|---|---|
| SERVICE ID | ST7 | ST8 | ST9 |
| SERVICE NAME | SPORTS TV | MADAM TV | COMIC TV |
| SERVICE TYPE | DIGITAL TV | DIGITAL TV | DIGITAL TV |

INDIVIDUAL ELECTRONIC PROGRAM GUIDE

| CHANNEL SERVICE ID | ST4 | ST5 | ST6 | ST7 | ST8 | ST9 |
|---|---|---|---|---|---|---|
| SERVICE NAME | MOVIE CHANNEL | CHILDREN TV | NEWS! | SPORTS TV | MADAM TV | COMIC TV |
| 4:00 | PR1 | PR5 | PR9 | PR13 | PR17 | PR21 |
| 5:00 | PR2 | PR6 | PR10 | PR14 | PR18 | PR22 |
| 6:00 | PR3 | PR7 | PR11 | PR15 | PR19 | PR23 |
| 7:00 | PR4 | PR8 | PR12 | PR16 | PR20 | PR24 |

BOUQUET ASSOCIATION TABLE (BAT)

| BOUQUET ID | B5 | | |
|---|---|---|---|
| BOUQUET NAME | Sb1 | | |
| TS ID | TS20 | | |
| SERVICE ID | ST1 | ST2 | ST3 |
| DEFAULT SELECTION FLAG | ON | OFF | OFF |

| BOUQUET ID | B6 | | | | | |
|---|---|---|---|---|---|---|
| BOUQUET NAME | Sb2 | | | | | |
| TS ID | TS30 | | | TS40 | | |
| SERVICE ID | ST4 | ST5 | ST6 | ST7 | ST8 | ST9 |
| DEFAULT SECTION FLAG | ON | OFF | OFF | OFF | OFF | OFF |

| BOUQUET ID | B5 | | |
|---|---|---|---|
| BOUQUET NAME | JAPAN TV | | |
| TS ID | TS20 | | |
| SERVICE ID | ST1 | ST2 | ST2 |
| DEFAULT SELECTION FLAG | ON | OFF | OFF |

FIG. 20

EIT

| SERVICE ID | ST6 | | | | |
|---|---|---|---|---|---|
| TS ID | TS30 | | | | |
| EVENT ID | TP30 | TP35 | TP40 | TP42 | TP89 |
| TITLE | | | | | |
| BROADCASTING START DATE AND TIME | | | | | |
| DURATION OF BROADCAST | | | | | |
| EVENT LINK INFORMATION | | | | | |

| SERVICE ID | ST7 | | | | |
|---|---|---|---|---|---|
| TS ID | TS30 | | | | |
| EVENT ID | TP50 | TP51 | TP52 | TP53 | TP54 |
| TITLE | | | | | |
| BROADCASTING START DATE AND TIME | | | | | |
| DURATION OF BROADCAST | | | | | |
| EVENT LINK INFORMATION | | | ST6 TS30 TP40 | | |

| SERVICE ID | ST8 | | | | |
|---|---|---|---|---|---|
| TS ID | TS30 | | | | |
| EVENT ID | TP60 | TP61 | TP62 | TP63 | TP64 |
| TITLE | | | | | |
| BROADCASTING START DATE AND TIME | | | | | |
| DURATION OF BROADCAST | | | | | |
| EVENT LINK INFORMATION | | | ST6 TS30 TP40 | | |

FIG. 23

| TELEVISION CHANNEL | CH5 | CH6 | CH7 | CH8 |
|---|---|---|---|---|
| 3:00 | SDTV | SDTV | SDTV | SDTV |
| 4:00 | SDTV | HDTV | | |
| 5:00 | | | | |
| 6:00 | | DATA DATA | SDTV | MUSIC |
| 7:00 | | | | SDTV |
| 8:00 | | | | |

FIG. 25

| TELEVISION CHANNEL | CH1 | CH2 | CH3 | CH4 |
|---|---|---|---|---|
| 15:00 | SDTV | SDTV | SDTV | SDTV |
| 16:00 | HDTV | HDTV | SDTV | HDTV |
| 17:00 | | | | |
| 18:00 | SDTV | DATA DATA | | MUSIC |
| 19:00 | | | | SDTV |
| 20:00 | | | | |

FIG. 26

EVENT INFORMATION TABLE (EIT)

| SERVICE ID | ST4 | | | | |
|---|---|---|---|---|---|
| TS ID | TS30 | | | | |
| EVENT ID | TP30 | TP35 | TP40 | TP42 | TP89 |
| TITLE | WEATHER | CYCLING | NEWS | VEGETABLES | GET UP! |
| BROADCASTING START DATE AND TIME | '97 11/14 4:00 | '97 11/14 5:00 | '97 11/14 6:00 | '97 11/14 7:00 | '97 11/14 8:00 |
| DURATION OF BROADCAST | 60 | 60 | 60 | 60 | 60 |
| TRANSMISSION BANDWIDTH | 5 Mbps | 5 Mbps | 18 Mbps | 6 Mbps | 4 Mbps |

| SERVICE ID | ST5 | | | | |
|---|---|---|---|---|---|
| TS ID | TS30 | | | | |
| EVENT ID | TP31 | TP32 | TP41 | TP43 | TP88 |
| TITLE | WORLD NEWS | TRICYCLE | HELP! | WORLD WEATHER | LOCAL NEWS |
| BROADCASTING START DATE AND TIME | '97 11/14 4:00 | '97 11/14 5:00 | '97 11/14 6:00 | '97 11/14 7:00 | '97 11/14 8:00 |
| DURATION OF BROADCAST | 60 | 60 | 60 | 60 | 60 |
| TRANSMISSION BANDWIDTH | 18 Mbps | 5 Mbps | 9 Mbps | 6 Mbps | 6 Mbps |

FIG. 28

| 4:00 | WEATHER | WORLD NEWS | |
|------|---------|------------|---|
| 5:00 | CYCLING | TRICYCLE | |
| 6:00 | | NEWS | HELP! |
| 7:00 | VEGETABLES | WORLD WEATHER | |
| 8:00 | GET UP! | LOCAL NEWS | |

TODAY'S PROGRAM GUIDE

| | CH30 | CH31 | CH32 | CH33 |
|---|------|------|------|------|
| 3:00 | PR1 | PR8 | PR13 | PR18 |
| 4:00 | PR2 | PR9 | | PR19 |
| 5:00 | PR3 | | | PR20 |
| 6:00 | PR4 | | PR14 | |
| 7:00 | PR5 | PR10 | PR15 | |
| 8:00 | PR6 | PR11 | PR16 | |
| 9:00 | PR7 | PR12 | PR17 | |

| SERVICE TYPE | DATA | MUSIC | SDTV | HDTV |
|---|---|---|---|---|
| DISPLAY WIDTH RATIO | 1 | 1 | 5 | 15 |

FIG. 33
ELECTRONIC PROGRAM GUIDE
|      | CH1   | CH2   | CH3   | CH4   | CH5   |
|------|-------|-------|-------|-------|-------|
| 3:00 | TP100 | TP102 | TP103 | TP108 | TP104 |
| 4:00 |       | TP105 |       |       |       |
| 5:00 | TP101 | TP110 | TP106 | TP109 |       |
| 6:00 |       |       | TP107 |       | TP111 |
→ SELECTION ROUTE
FIG 34
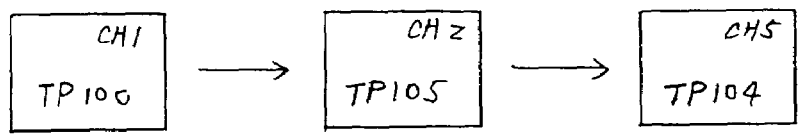
FIG. 36
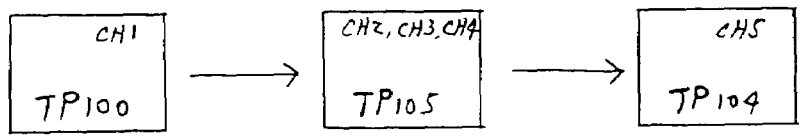

| CHANNEL SERVICE ID | ST101 | ST103 | ST900 | ST901 | ST902 | ST903 |
|---|---|---|---|---|---|---|
| SERVICE TYPE | SDTV | MUSIC | MUSIC | MUSIC | MUSIC | MUSIC |

SUB-CHANNEL SERVICES OF ST103

SDT

| TS ID | TS3 | |
|---|---|---|
| SERVICE ID | ST101 | ST103 |
| SERVICE NAME | WEATHER! | MC |
| SERVICE TYPE | SDTV | MUSIC |
| MAIN/SUB | MAIN | MAIN |
| REFERENTIAL SERVICE | — | ST900~ST903 |
| REFERENTIAL TS | — | TS5 |

FIG. 41

SDT

| TS ID | TS3 | | TS5 | | | |
|---|---|---|---|---|---|---|
| SERVICE ID | ST101 | ST103 | ST900 | ST901 | ST902 | ST903 |
| SERVICE NAME | WEATHER | MC | MUSIC 1 | MUSIC 2 | MUSIC 3 | MUSIC 4 |
| SERVICE TYPE | SDTV | MUSIC | MUSIC | MUSIC | MUSIC | MUSIC |
| MAIN/SUB | MAIN | MAIN | SUB | SUB | SUB | SUB |
| REFERENTIAL SERVICE | — | ST900 ~ ST903 | ST103 | ST103 | ST103 | ST103 |
| REFERENTIAL TS | — | TS5 | TS3 | | | |

FIG. 42

EIT

| SERVICE ID | ST101 | | | | | |
|---|---|---|---|---|---|---|
| TS ID | TS3 | | | | | |
| EVENT ID | TP50 | TP51 | TP52 | TP53 | TP54 | TP55 |
| TITLE | TODAY'S WEATHER | TOMORROW WEATHER | WEATHER OF U.S.A | WEATHER OF JAPAN | WEATHER OF ASIA | WORLD WEATHER |
| BROADCASTING START TIME | 10:00 | 11:00 | 12:00 | 12:30 | 13:00 | 13:30 |
| DURATION OF BROADCAST | 60 | 60 | 30 | 30 | 30 | 30 |

FIG. 43

EIT

| SERVICE ID | ST103 | | | | | |
|---|---|---|---|---|---|---|
| TS ID | TS3 | | | | | |
| EVENT ID | TP3 | TP4 | TP5 | TP6 | TP7 | TP8 |
| TITLE | MUSIC A | MUSIC B | MUSIC C | MUSIC D | MUSIC E | MUSIC E |
| BROADCASTING START TIME | 10:00 | 11:00 | 12:00 | 12:30 | 13:00 | 13:30 |
| DURATION OF BROADCAST | 60 | 60 | 30 | 30 | 30 | 30 |

FIG. 44

EIT

| SERVICE ID | ST 900 | | | | | |
|---|---|---|---|---|---|---|
| TS ID | TS 5 | | | | | |
| EVENT ID | TP200 | TP201 | TP202 | TP203 | TP204 | TP205 |
| TITLE | | | MUSIC C | | | |
| BROADCASTING START TIME | | | 12:00 | | | |
| DURATION OF BROADCAST | | | 30 | | | |

EIT

| SERVICE ID | ST 901 | | | | | |
|---|---|---|---|---|---|---|
| TS ID | TS5 | | | | | |
| EVENT ID | TP206 | TP207 | TP208 | TP209 | TP210 | TP211 |
| TITLE | | | MUSIC C | | | |
| BROADCASTING START TIME | | | 12:00 | | | |
| DURATION OF BROADCAST | | | 30 | | | |

EIT

| SERVICE ID | ST 902 | | | | | |
|---|---|---|---|---|---|---|
| TS ID | TS5 | | | | | |
| EVENT ID | TP1000 | TP1001 | TP1002 | TP1003 | TP1004 | TP1005 |
| TITLE | | | MUSIC C | | | |
| BROADCASTING START TIME | | | 12:00 | | | |
| DURATION OF BROADCAST | | | 30 | | | |

EIT

| SERVICE ID | ST 903 | | | | | |
|---|---|---|---|---|---|---|
| TS ID | TS5 | | | | | |
| EVENT ID | TP1100 | TP1101 | TP1102 | TP1103 | TP1104 | TP1105 |
| TITLE | | | MUSIC C | | | |
| BROADCASTING START TIME | | | 12:00 | | | |
| DURATION OF BROADCAST | | | 30 | | | |

FIG. 46
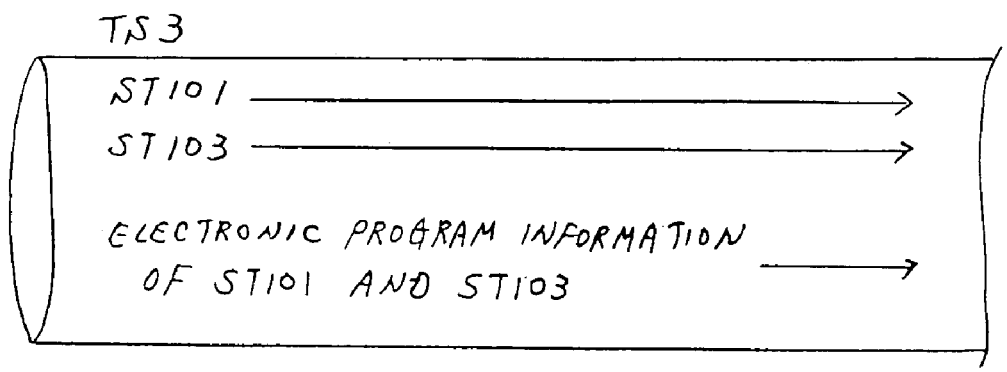
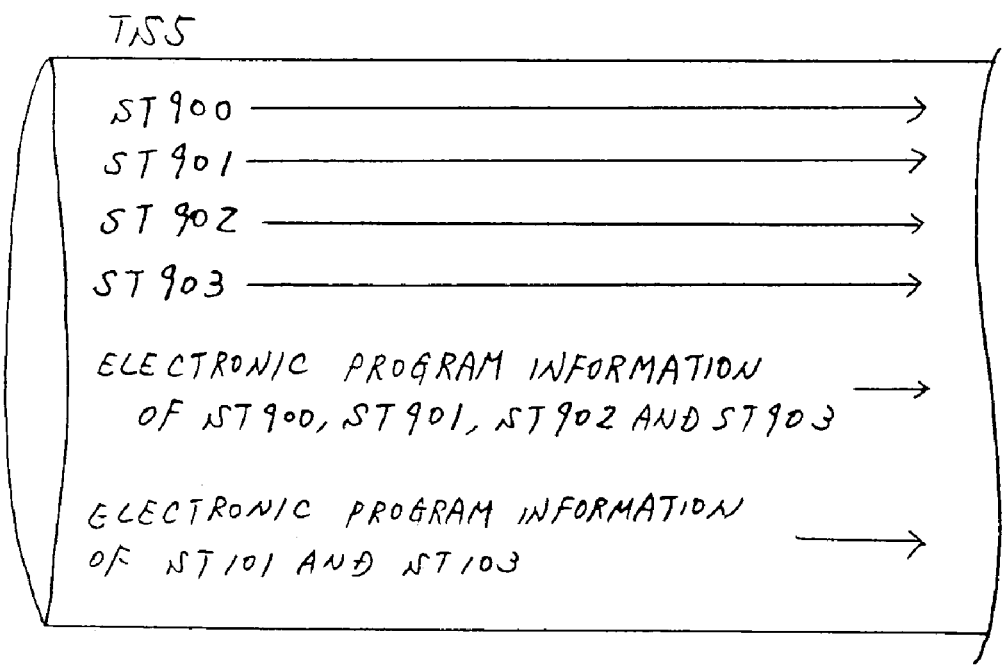

FIG. 48

TS3
- ST101 →
- ST103 →
- ELECTRONIC PROGRAM INFORMATION OF ST101, ST103, ST105 AND ST106 →
- ELECTRONIC PROGRAM INFORMATION OF ST900, ST901, ST902, ST903, ST910 AND ST911 →

TS5
- ST900 →
- ST901 →
- ST902 →
- ST903 →
- ELECTRONIC PROGRAM INFORMATION OF ST101, ST103, ST105 AND ST106 →
- ELECTRONIC PROGRAM INFORMATION OF ST900, ST901, ST902, ST903, ST910 AND ST911 →

TS6
- ST105 →
- ELECTRONIC PROGRAM INFORMATION OF ST101, ST103, ST105 AND ST106 →
- ELECTRONIC PROGRAM INFORMATION OF ST900, ST901, ST902, ST903, ST910 AND ST911 →

TS7
- ST910 →
- ST911 →
- ELECTRONIC PROGRAM INFORMATION OF ST101, ST103, ST105 AND ST106 →
- ELECTRONIC PROGRAM INFORMATION OF ST900, ST901, ST902, ST903, ST910 AND ST911 →

TS8
- ST106 →
- ELECTRONIC PROGRAM INFORMATION OF ST101, ST103, ST105 AND ST106 →

FIG. 51A

TODAY'S PROGRAM GUIDE

|      | CH30 | CH31 | CH32 | CH33 |
|------|------|------|------|------|
| 3:00 | PR1  | PR8  | PR13 | PR18 |
| 4:00 | PR2  | PR9  |      | PR19 |
| 5:00 | PR3  |      |      | PR20 |
| 6:00 | PR4  |      | PR14 |      |
| 7:00 | PR5  | PR10 | PR15 |      |
| 8:00 | PR6  | PR11 | PR16 |      |
| 9:00 | PR7  | PR12 | PR17 |      |

FIG. 51B

MUSIC CHANNELS

|      | CH50 | CH51 | CH52 | CH53 | CH54 | CH55 |
|------|------|------|------|------|------|------|
| 3:00 | MUSIC 1 | MUSIC 2 | MUSIC 3 | MUSIC 4 | MUSIC 5 | MUSIC 6 |

|      | CH56 | CH57 | CH58 | CH59 | CH60 | CH61 |
|------|------|------|------|------|------|------|
| 3:00 | MUSIC 7 | MUSIC 8 | MUSIC 9 | MUSIC 10 | MUSIC 11 | MUSIC 12 |

|      | CH62 | CH63 | CH64 | CH65 | CH66 | CH67 |
|------|------|------|------|------|------|------|
| 3:00 | MUSIC 13 | MUSIC 14 | MUSIC 15 | MUSIC 16 | MUSIC 17 | MUSIC 18 |

|      | CH68 | CH69 | CH70 | CH71 | CH72 | CH73 |
|------|------|------|------|------|------|------|
| 3:00 | MUSIC 19 | MUSIC 20 | MUSIC 21 | MUSIC 22 | MUSIC 23 | MUSIC 24 |

[BEFORE] [NEXT] [RETURN]

FIG. 52

SDT

| TS ID | TS3 | | TS5 | | | |
|---|---|---|---|---|---|---|
| CHANNEL/SERVICE ID | ST101 | ST103 | ST900 | ST901 | ST902 | ST903 |
| SERVICE NAME | WEATHER | MC | MUSIC 1 | MUSIC 2 | MUSIC 3 | MUSIC 4 |
| SERVICE TYPE | SDTV | MUSIC | MUSIC | MUSIC | MUSIC | MUSIC |
| MAIN/SUB | MAIN | MAIN | SUB | SUB | SUB | SUB |
| REFERENTIAL SERVICE | — | ST900 ∼ ST903 | ST103 | ST103 | ST103 | ST103 |
| REFERENTIAL TS | — | TS5 | TS3 | | | |
| DEFAULT SUB-CHANNEL SERVICE SELECTING FLAG | — | — | ON | OFF | OFF | OFF |

FIG. 54

SDT

| TS ID | | TS3 | | TS5 | | | |
|---|---|---|---|---|---|---|---|
| CHANNEL/SERVICE ID | | ST101 | ST103 | ST900 | ST901 | ST902 | ST903 |
| SERVICE NAME | | WEATHER | MC | MUSIC 1 | MUSIC 2 | MUSIC 3 | MUSIC 4 |
| SERVICE TYPE | | SDTV | MUSIC | MUSIC | MUSIC | MUSIC | MUSIC |
| MAIN/SUB | | MAIN | MAIN | SUB | SUB | SUB | SUB |
| REFERENTIAL SERVICE | | — | ST900 ∼ ST903 | ST103 | ST103 | ST103 | ST103 |
| REFERENTIAL TS | | — | TS5 | TS3 | | | |
| VIEWER ATTRIBUTE | AGE | — | — | 19 OR MORE | 1 TO 5 | 60 OR MORE | 20 TO 30 |
| | DISTRICT | — | — | JAPAN | JAPAN | EAST AREA | NORTH AREA |

FIG. 56

SDT

| TS ID | TS3 | | TS5 | | | |
|---|---|---|---|---|---|---|
| CHANNEL SERVICE ID | ST101 | ST103 | ST900 | ST901 | ST902 | ST903 |
| SERVICE NAME | WEATHER | MC | MUSIC 1 | MUSIC 2 | MUSIC 3 | MUSIC 4 |
| SERVICE TYPE | SDTV | MUSIC | MUSIC | MUSIC | MUSIC | MUSIC |
| MAIN/SUB | MAIN | MAIN | SUB | SUB | SUB | SUB |
| REFERENTIAL SERVISE | — | ST900 ~ ST903 | ST103 | ST103 | ST103 | ST103 |
| REFERENTIAL TS | — | TS5 | TS3 | | | |
| GENRE | — | — | MOVIE | SPORTS | NEWS | NEWS |

METHOD AND APPARATUS FOR PREPARING AND TRANSMITTING ELECTRONIC PROGRAM INFORMATION AND APPARATUS FOR PRODUCING ELECTRONIC PROGRAM GUIDE FROM THE ELECTRONIC PROGRAM INFORMATION

BACKGROUND OF THE INVENTION

1. Field of the Invention

The present invention relates to method and apparatus for preparing and transmitting electronic program information multiplexed with video and audio signals. Also, the present invention relates to an apparatus for producing an electronic program guide from the electronic program information multiplexed with the video and audio signals.

2. Description of the Related Art

In digital satellite broadcasting, a video signal and an audio signal are broadcast from a central station to a plurality of terminals according to the Moving Picture Experts Group 2 (MPEG2). In the MPEG2, video and audio signals are multiplexed with each other into a packet in the central station, and a plurality of packets are transmitted to each terminal in the form of a transport stream (TS) representing a transmission line. In this case, electronic program information prescribed in the MPEG2 and DVB is transmitted with the video and audio signals. The electronic program information includes both control information, used to reproduce the video and audio signals multiplexed with each other, and electronic program guide information, used to prepare an electronic program guide. The electronic program guide information is described in a form of a section type table, and the section type is prescribed in MPEG2 and DVB.

2.1. Previously Proposed Art

FIG. 1 shows a configuration of a conventional digital broadcasting system.

As shown in FIG. 1, a conventional digital broadcasting system 300 is composed of a central broadcasting station system 301 and a plurality of viewers' terminals 302. In the central broadcasting station system 301, video and audio signals of television programs are transmitted from a television program and electronic program information organizing system 312 to a video/audio stream producing system 313, and the video and audio signals are prepared as a video/audio stream in the system 313. Also, electronic program scheduling information is transmitted from the television program and electronic program information organizing system 312 to an electronic program information preparing and transmitting system 314, and electronic program information, which is composed of program information, used to reproduce the video and audio signals multiplexed with each other, and added information, used to prepare electronic program information, is prepared in the system 314. The video/audio stream produced in the system 313 and the electronic program information prepared in the system 314 are multiplexed with each other in a TS multiplexer and up-link system 315, the electronic program information multiplexed with the video/audio stream is received in an information receiving device (IRD) 302 at each viewer's terminal (or a television set) through a satellite 316.

Also, cipher key information is transmitted from a cipher key managing and producing system 317 to the IRD 302, and television program viewing information is returned from the IRD 302 to an accounting information collecting system 318 through a public switched telephone network (PSTN) 319.

2.2. Problems to be Solved by the Invention

However, because an electronic program guide (called a common electronic program guide) of television programs provided by all broadcast service providers is prepared in the conventional digital broadcasting system 300 and is displayed in each viewer's terminal 302, an electronic program guide (called an individual electronic program guide) of television programs provided by each broadcast service provider cannot be prepared in the conventional digital broadcasting system 300.

Also, even though each broadcast service provider desires to provide various services for the viewers, because the services provided by one broadcast service provider are set forth in the electronic program guide in the same format as those provided by another broadcast service provider, features of the services provided by each broadcast service provider cannot be realized by the viewer.

SUMMARY OF THE INVENTION

A first object of the present invention is to provide, with due consideration of the drawbacks of such a conventional digital broadcasting system, electronic program information preparing and transmitting apparatus and method in which electronic program information used for the preparation of an individual electronic program guide and a common electronic program guide is prepared and transmitted to a viewer while effectively using a data transmission band.

Also, a second object of the present invention is to provide an electronic program guide producing apparatus in which an individual electronic program guide and a common electronic program guide are produced according to the electronic program information received from the electronic program information preparing and transmitting apparatus and displaying the individual electronic program guide and the common electronic program guide while distinguishing the individual electronic program guide from the common electronic program guide.

The first object of the present invention is achieved by an electronic program information preparing and transmitting apparatus, comprising:

electronic program information preparing means for preparing general electronic program information, in which electronic program information of a plurality of broadcast service providers is described on a general level, and for preparing individual electronic program information, in which the electronic program information of one broadcast service provider is described on an individual level, for each broadcast service provider; and electronic program information transmitting means for transmitting the general electronic program information of many broadcast service providers and the individual electronic program information of an individual broadcast service provider prepared by the electronic program information preparing means.

Also, the first object is achieved by an electronic program information preparing and transmitting method, comprising the steps of:

preparing general electronic program information described on a general level from electronic program information of a plurality of broadcast service providers;

preparing individual electronic program information described on an individual level from the electronic program information of one broadcast service provider for each broadcast service provider; and transmitting the general electronic program information of the plurality of broadcast service providers and the individual electronic program information of an individual broadcast service provider.

In the above configuration and steps, general electronic program information described on a general level and individual electronic program information described on an individual level are prepared from electronic program information of each broadcast service provider by the electronic program information preparing means for each broadcast service provider. Thereafter, the pieces of general electronic program information corresponding to the plurality of broadcast service providers and one piece of individual electronic program information corresponding to one broadcast service provider are transmitted to a viewer by the electronic program information transmitting means for each piece of individual electronic program information.

Accordingly, because individual electronic program information corresponding to all broadcast service providers is not prepared but individual electronic program information corresponding to one broadcast service provider is prepared and carried in a transport stream of the broadcast service provider for each broadcast service provider, the data transmission band required for each broadcast service provider can be effectively used.

Also, because the viewer receives the piece of individual electronic program information corresponding to each broadcast service provider, an individual electronic program guide described on an individual level can be prepared on the viewer side for each broadcast service provider. In particular, in cases where the individual level corresponds to a high degree of detail, the viewer can watch an individual electronic program guide described at a high degree of detail for each broadcast service provider. Therefore, the viewer can read detailed information for each television program listed in the individual electronic program guide.

Also, because the viewer receives the pieces of general electronic program information corresponding to each broadcast service provider, a common electronic program guide described on an overall level for the plurality of broadcast service providers can be prepared at the viewer side. In particular, in cases where the general level has to a low degree of detail, the viewer can watch a common electronic program guide of the plurality of broadcast service providers on the low degree of detail. Therefore, even though a large number of television programs are listed in the common electronic program guide, the viewer can easily obtain information about the television programs.

Also, because general electronic program information and individual electronic program information are prepared from electronic program information of each broadcast service provider, each broadcast service provider is not required to prepare general electronic program information of another broadcast service provider.

It is appropriate that a transport stream specifying information be prepared by the electronic program information preparing means for each piece of individual electronic program information, and the electronic program information transmitting means comprise:

electronic program information outputting means for outputting the pieces of general electronic program information of the plurality of broadcast service providers, the pieces of individual electronic program information of each broadcast service providers and the pieces of transport stream specifying information prepared by the electronic program information preparing means; and electronic program information multiplexing means for multiplexing the pieces of general electronic program information of the plurality of broadcast service providers and one piece of individual electronic program information of one broadcast service provider output by the electronic program information outputting means to produce combined electronic program information for each piece of individual electronic program information, carrying each piece of combined electronic program information in a transport stream, which is indicated by the piece of transport stream specifying information corresponding to the piece of individual electronic program information multiplexed in the piece of combined electronic program information, and transmitting the pieces of combined electronic program information carried in the transport streams to the viewer.

In the above configuration, each piece of combined electronic program information is carried in a transport stream indicated by the piece of transport stream specifying information corresponding to the piece of individual electronic program information. In other words, each piece of combined electronic program information, in which the piece of individual electronic program information of one broadcast service provider is multiplexed, is carried in the transport stream of that broadcast service provider. Therefore, the individual electronic program information of one broadcast service provider can be displayed when a viewer watches a television program of that broadcast service provider. Accordingly, there is no possibility that the individual electronic program information of a particular broadcast service provider is erroneously displayed when the viewer watches a television program provided by another broadcast service provider, so that conflict between broadcast service providers can be avoided.

It is also applicable that one piece of individual electronic program information of a particular broadcast service provider and pieces of general electronic program information of many broadcast service providers, other than the particular broadcast service provider, be transmitted to the viewer for each piece of individual electronic program information by the electronic program information transmitting means.

In the above configuration, the general electronic program information of each broadcast service provider is not transmitted to the viewer with individual electronic program information of the broadcast service provider. Therefore, electronic program information of each broadcast service provider is not transmitted in duplicate.

It is also applicable that the electronic program information preparing means comprise:

common electronic program information preparing means for preparing common electronic program information common to the pieces of electronic program information of a plurality of broadcast service providers from the pieces of electronic program information of each broadcast service provider;

non-common electronic program information preparing means for preparing a first non-common electronic program information not common to the plurality of broadcast service providers on an individual level from the electronic program information of each broadcast service provider and preparing a second non-common electronic program information not common to the plurality of broadcast service providers on a general level from the electronic program information of one broadcast service provider, and the electronic program information transmitting means comprises:

electronic program information multiplexing means for multiplexing the common electronic program information prepared by the common electronic program information preparing means, one piece of a first non-common electronic program information of a particular broadcast service provider prepared by the non-common electronic program information preparing means and pieces of a second non-common electronic program information of broadcast service providers, other than the particular broadcast service provider, to produce multiplexed electronic program information for each particular broadcast service provider; and multiplexed electronic program information transmitting means for transmitting the multiplexed electronic program information produced by the electronic program information multiplexing means to the viewer for each particular broadcast service provider.

In the above configuration, electronic program information common to the pieces of electronic program information of the plurality of broadcast service providers is prepared from the pieces of electronic program information of each broadcast service provider in the common electronic program information preparing means. Accordingly, each particular broadcast service provider is not required to prepare the common electronic program information.

It is also preferred that a plurality of channel services be listed in the general electronic program information or in the individual electronic program information of one broadcast service provider prepared by the electronic program information preparing means, and service specifying information indicating a particular channel service is arranged in the general electronic program information or the individual electronic program information of the broadcast service provider to automatically select the particular channel service from the channel services in cases where that broadcast service provider is selected.

In the above configuration, even though each broadcast service provider provides a plurality of channel services, when a viewer selects one broadcast service provider, the particular channel service of that broadcast service provider is automatically specified according to the service specifying information. Accordingly, each broadcast service provider can make the viewer automatically watch a television program of the particular channel service recommended by that broadcast service provider.

It is also preferred that pieces of information of a plurality of television programs be described in the individual electronic program information or the general electronic program information and program link describing information indicating that an actual television program actually broadcast is the same as one or more virtual television programs not actually broadcast be arranged in the individual electronic program information or the general electronic program information.

In the above configuration, in cases where a high definition television (HDTV) program is provided, because the HDTV program extends over a plurality of television channels, the HDTV program of one television channel is actually broadcast as an actual television program, and the HDTV program of the other television channels is not actually broadcast as a virtual television program. In this case, program link describing information (or event link describing information) arranged in the general electronic program information or the individual electronic program information indicates that the virtual television programs are the same as the actual television program.

It is also preferred that pieces of information of one or more television programs are listed in the general electronic program information or the individual electronic program information of each broadcast service provider prepared by the electronic program information preparing means and a transmission bandwidth be described as the information for each television program.

In the above configuration, a transmission bandwidth indicating a display quality is described as the information of each television program in the general electronic program information or the individual electronic program information. Therefore, the viewer can select one of the television programs according to the transmission bandwidth.

It is also preferred that information of one broadcast service provider, information of a broadcasting schedule and information of a television channel is described as the information of each television program to produce a three-dimensional electronic program guide in which a display width of each television program is proportional to the transmission bandwidth of the television program.

In the above configuration, information of one broadcast service provider, information of a broadcasting schedule and information of a television channel are described as the information for each television program. Therefore, a three-dimensional electronic program guide, in which a display width of each television program is proportional to the transmission bandwidth of the television program, can be produced. Accordingly, the viewer can easily select a television program while watching the three-dimensional electronic program guide.

It is also preferred that one or more main channel services and one or more sub-channel services, that one subordinate to one main channel service be hierarchically listed in the general electronic program information or in the individual electronic program information of each broadcast service provider prepared by the electronic program information preparing means.

It is also preferred that one or more main television programs and one or more television programs that are subordinate to the one main television program are hierarchically listed in the general electronic program information or the individual electronic program information of each broadcast service provider prepared by the electronic program information preparing means.

In the above configuration, the main channel services (or the main television programs) and the sub-channel services (or the sub-television programs) are hierarchically listed in the general electronic program information or in the individual electronic program information. Therefore, even though a large number of channel services (or television programs) are provided by one broadcast service provider, an electronic program guide, in which the channel services (or television programs) are hierarchically arranged, can be easily produced. Accordingly, the viewer can easily select one channel service (or one television program) from the channel services (or television programs) of the electronic program guide.

It is also preferred that the general electronic program information including information of the main channel services be carried in all transport streams and the individual electronic program information including information of the sub-channel services be carried in a particular transport stream in which television programs of the sub-channel services are actually carried.

In the above configuration, because information of the main channel services is carried in all transport streams of all broadcast service providers, the information of the main channel services arranged in a common electronic program table can be displayed regardless of which broadcast service provider is selected by the viewer. Also, because information of the sub-channel services is carried in a particular transport stream in which television programs of the sub-channel services are actually carried, when the viewer selects a particular broadcast service provider corresponding to the sub-channel services, the information of the sub-channel services can be displayed arranged in an individual electronic program table.

It is also preferred that television programs provided by a particular broadcast service provider be carried in a plurality of particular transport streams, television programs of the sub-channel services be carried in one particular transport stream, the general electronic program information including information of the main channel services be carried in all transport streams and the individual electronic program information including information of the sub-channel services be carried in each of the particular transport streams.

In the above configuration, in cases where a plurality of particular transport streams correspond to a plurality of channel services of a particular broadcast service provider, information of the sub-channel services provided by the particular broadcast service provider is carried by each of the particular transport streams. Therefore, even though the viewer selects the channel services of the particular broadcast service provider, the information of the sub-channel services can be displayed arranged in an individual electronic program table.

The second object of the present invention is achieved by an electronic program guide producing apparatus, comprising:

electronic program information receiving means for receiving electronic program information of a plurality of broadcast service providers;

common electronic program guide producing means for producing a common electronic program guide of channel services provided by a plurality of broadcast service providers from the electronic program information of each broadcast service provider received by the electronic program information receiving means; and individual electronic program guide producing means for producing an individual electronic program guide of channel services made available by one broadcast service provider from the electronic program information of that broadcast service provider received by the electronic program information receiving means for all broadcast service providers.

In the above configuration, a common electronic program guide of channel services provided by the broadcast service providers is produced from the pieces of general electronic program information of each broadcast service provider, and an individual electronic program guide of channel services provided by each broadcast service provider is produced from the individual electronic program information of each broadcast service provider.

Accordingly, the viewer can watch the common electronic program guide displayed on a displaying unit. Also, the viewer can watch the individual electronic program guide displayed on the displaying unit.

Also, because the individual electronic program guide of all broadcast service providers is not produced, but the individual electronic program guide of each broadcast service provider is produced and displayed with a television program of that broadcast service provider, the data transmission band required for the individual electronic program guide displayed can be effectively used.

It is preferred that the electronic program guide producing apparatus further comprise:

displaying means for displaying a television program of a channel service provided by a particular broadcast service provider selected from the plurality of broadcast service providers, displaying the common electronic program guide produced by the common electronic program guide producing means regardless of the particular broadcast service provider selected, and displaying a particular individual electronic program guide of the particular broadcast service provider produced by the individual electronic program guide producing means while displaying the television program of the channel service provided by the particular broadcast service provider.

In the above configuration, the common electronic program guide is displayed by the displaying means regardless of the broadcast service provider of the television program displayed by the displaying means. Also, the particular individual electronic program guide of the particular broadcast service provider is displayed only when a television program of the channel service provided by that particular broadcast service provider is displayed.

Accordingly, the common electronic program guide can be displayed any time. Also, the individual electronic program guide of each broadcast service provider can be displayed when a television program provided by that broadcast service provider is displayed. Therefore, there is no probability that an individual electronic program guide of a broadcast service provider, other than the particular broadcast service provider providing the television program currently displayed by the displaying means, is erroneously displayed, so that a conflict between broadcast service providers can be avoided.

It is also preferred that a plurality of channel services be listed in the electronic program information of one broadcast service provider received by the electronic program information receiving means, service specifying information indicating a particular channel service selected from the channel services arranged in the electronic program information, and a television program of the particular channel service of the broadcast service provider be automatically displayed by the displaying means in cases where the viewer selects that broadcast service provider.

In the above configuration, even though each broadcast service provider provides a plurality of channel services, when a viewer selects a particular broadcast service provider, the particular channel service of that broadcast service provider is automatically specified according to the service specifying information. Accordingly, each broadcast service provider can make the viewer automatically watch a television program of the particular channel service recommended by that broadcast service provider.

It is also preferred that a plurality of channel services be listed in one individual electronic program guide produced by the individual electronic program guide producing means or in the common electronic program guide produced by the common electronic program guide producing means. A viewer attribute is arranged as information of each channel service of the individual electronic program guide or the common electronic program guide, and a television program of a particular channel service of a particular broadcast service provider is automatically displayed by the displaying means in cases where the viewer attribute identifying a particular channel service agrees with an attribute identified by the viewer and specified in the individual electronic program guide or the common electronic program guide.

In the above configuration, each broadcast service provider provides a plurality of channel services, and a viewer attribute is arranged identifying information of each channel service of the individual electronic program guide or the common electronic program guide. Therefore, when a viewer selects a particular broadcast service provider, a particular channel service, of which the attribute agrees with an attribute of the viewer in the individual electronic program guide or the common electronic program guide, is automatically selected, and a television program of the particular channel service of that broadcast service provider is displayed. Accordingly, each broadcast service provider can make the viewer automatically watch the television program of the particular channel service recommended by that broadcast service provider.

It is also preferred that a plurality of channel services be listed in one individual electronic program guide produced by the individual electronic program guide producing means or in the common electronic program guide produced by the common electronic program guide producing means. A genre is arranged as information of each channel service of the individual electronic program guide or the common electronic program guide, and a television program of a particular channel service of a particular broadcast service provider is automatically displayed by the displaying means in cases where the genre of the particular channel service agrees with a viewer's favorite genre in the individual electronic program guide or the common electronic program guide.

In the above configuration, each broadcast service provider provides a plurality of channel services, and a genre is arranged based on information for each channel service of the individual electronic program guide or the common electronic program guide. Therefore, when a viewer selects one broadcast service provider, a particular channel service, of which the genre agrees with a viewer's favorite genre in the individual electronic program guide or the common electronic program guide of the broadcast service provider, is automatically selected, and a television program of the particular channel service of that broadcast service provider is displayed. Accordingly, each broadcast service provider can make the viewer automatically watch the television program of the particular channel service recommended by that broadcast service provider.

It is also preferred that pieces of information of a plurality of television programs be described in one individual electronic program guide produced by the individual electronic program guide producing means or in the common electronic program guide produced by the common electronic program guide producing means, program link describing information indicating that an actual television program actually broadcast is the same as one or more virtual television programs not actually broadcast be arranged in the individual electronic program guide or the common electronic program guide, and the individual electronic program guide or the common electronic program information be displayed by the displaying means.

In the above configuration, in cases where a high definition television (HDTV) program is provided, because the HDTV program extends over a plurality of television channels, the HDTV program of one television channel is actually broadcast as an actual television program, and the HDTV program of the other television channels is not actually broadcast as a virtual television program. In this case, program link describing information is described in the individual electronic program guide or the common electronic program guide to indicate that the virtual television programs are the same as the actual television program. Therefore, the viewer can recognize the virtual television programs, and the viewer can select the HDTV program without any trouble.

It is also preferred that information of a particular program extending over a plurality of television channels be described in one individual electronic program guide produced by the individual electronic program guide producing means or in the common electronic program guide produced by the common electronic program guide producing means and the information of the particular program is displayed by the displaying means in the individual electronic program guide or the common electronic program guide.

In the above configuration, even though a particular program, extending over a plurality of television channels, is broadcast, information of the particular program is displayed in the individual electronic program guide. Therefore, the viewer can recognize the particular program extending over a plurality of television channels by watching the individual electronic program guide.

It is also preferred that information of a particular television program extending over a plurality of television channels be described in one individual electronic program guide produced by the individual electronic program guide producing means or the common electronic program guide produced by the common electronic program guide producing means, the information of the particular television program be described in each television channel of the individual electronic program guide or the common electronic program guide, the information of the particular television program described in each television channel be displayed by the displaying means as the individual electronic program guide or the common electronic program guide, and the selection of the particular television program be visually indicated on each television channel in cases where the particular television program of one television channel is selected.

In the above configuration, even though a particular program extending over a plurality of television channels is broadcast, information of the particular television program is described in each television channel and is displayed as the individual electronic program guide or the common electronic program guide. Thereafter, when the viewer selects the particular television program of one television channel, the selection of the particular television program is visually indicated in each television channel. Therefore, the viewer can easily recognize the television channels corresponding to the particular program.

It is also preferred that display quality information be described as information of each television program in one individual electronic program guide produced by the individual electronic program guide producing means or in the common electronic program guide produced by the common electronic program guide producing means to indicate a display quality of the television program, and pieces of information of the television programs are displayed by the displaying means as the individual electronic program guide or the common electronic program guide to indicate the display quality of each television program according to the display quality information of the television program.

In the above configuration, display quality information, indicating the quality of each television program, is described as information of the television program in the individual electronic program guide or the common electronic program guide. Therefore, the viewer can select one of the television programs while referring to the display quality information.

It is also preferred that information of one broadcast service provider, information of a schedule and information of a television channel be described as information relative to each television program in one individual electronic program guide produced by the individual electronic program guide producing means or in the common electronic program guide produced by the common electronic program guide producing means, a transmission bandwidth be described as information related to each television program in the individual electronic program guide or the common electronic program guide, and a three-dimensional electronic program guide composed of three components of the broadcast service provider, the schedule and the television channel be displayed by the displaying means on condition that the display width of each television program in the three-dimensional electronic program guide is proportional to the transmission bandwidth of the television program.

In the above configuration, information of one broadcast service provider, information of a broadcasting schedule and information of a television channel are described as the information of each television program in one individual electronic program guide, a transmission bandwidth indicating the display quality of each television program is described as information related to the television program in the individual electronic program guide or in the common electronic program guide, and a three-dimensional electronic program guide, in which the display width of each television program is proportional to the transmission bandwidth of the television program, is displayed. Accordingly, the viewer can easily select a television program while watching the three-dimensional electronic program guide.

It is also preferred that information of television programs be described in one individual electronic program guide produced by the individual electronic program guide producing means or in the common electronic program guide produced by the common electronic program guide producing means, the information of the television programs be displayed by the displaying means as the individual electronic program guide or the common electronic program guide while displaying a television program of one television channel, and the electronic program guide producing apparatus, further comprise:

television channel changing means for changing a television program of a first television channel to a television program of a second television channel in cases where the television program of the first television channel has no relationship with the television program of the second television channel and changing the television program of the first television channel to a television program of a third television channel in cases where the television program of the first television channel refers to the information of the television program of the second television channel, the television program of the second television channel refers to the information of the television program of the first television channel or the television programs of the first and second television channels refers to the information of a television program of one television channel.

In the above configuration, a plurality of television channels are normally selected by the television channel changing means one after another in the predetermined order. However, in cases where the television program of a first television channel is related to the television program of a second television channel, the change from the first television channel to the second television channel is not performed. In detail, in cases where the television program of the first television channel refers to the information of the television program of the second television channel, the television program of the second television channel refers to the information of the television program of the first television channel or the television programs of the first and second television channels refers to the information of a television program of one television channel, the second television channel is not selected, but a third television channel is selected.

Accordingly, because the first television channel is automatically changed to the third television channel, the viewer is not required to select the third television channel having no relationship with the television program of the first television channel by repeatedly operating the television channel changing means. Therefore, the viewer can rapidly select a next television program having no relationship with the television program of a previously selected television channel.

It is also preferred that channel identifying information indicating the second television channel or the third television channel changed by the television channel changing means and one or more fourth television channels be displayed in cases where the second television channel or the third television channel and the fourth television channels refer to information of the same television channel, and channel identifying information indicating the second television channel or the third television channel changed by the television channel changing means and one or more fifth television channels be displayed in cases where the fifth television channels refer to information of the second television channel or information of the third television channel.

In the above configuration, the first television channel is changed to the second television channel (or the third television channel) by the television channel changing means. In cases where the second television channel (or the third television channel) and one or more fourth television channels refer to information of one television channel, channel identifying information indicating the second television channel (or the third television channel) and the fourth television channels is displayed. Also, in cases where one or more fifth television channels refer to information of the second television channel (or information of the third television channel), channel identifying information indicating the second television channel (or the third television channel) and the fifth television channels is displayed.

It is also preferred that information of one or more main channel services and information of one or more sub-channel services subordinate to one main channel service be hierarchically described in one individual electronic program guide produced by the individual electronic program guide producing means or in the common electronic program guide produced by the common electronic program guide producing means, and the information of the main channel services and the information of the sub-channel services hierarchically described be displayed by the displaying means as the individual electronic program guide or the common electronic program guide.

It is also preferred that information of one or more main television programs and information of one or more television programs subordinate to one main television program be hierarchically described in one individual electronic program guide produced by the individual electronic program guide producing means or the common electronic program guide produced by the common electronic program guide producing means, and the information of the main television programs and the information of the sub-television programs hierarchically described be displayed by the displaying means as the individual electronic program guide or the common electronic program guide.

In the above configuration, information of the main channel services (or the main television programs) and information of the sub-channel services (or the sub-television programs) are hierarchically described in one individual electronic program guide or the common electronic program guide and are displayed. Therefore, even though a large number of channel services (or television programs) are provided by one broadcast service provider, an electronic program guide, in which the channel services (or television programs) are hierarchically arranged, can be easily produced. Accordingly, the viewer can easily select one channel service (or one television program) from the channel services (or television programs) of the electronic program guide.

It is also preferred that information of a main television program and information of one or more sub-television programs, subordinate to the main television program, be hierarchically described in one individual electronic program guide produced by the individual electronic program guide producing means or the common electronic program guide produced by the common electronic program guide producing means, the information of the main television programs be displayed by the displaying means as the individual electronic program guide, and the information of the sub-television programs be displayed by the displaying means as the individual electronic program guide or the common electronic program guide in cases where the main television program or a channel service of the main television program described in the information of the main television programs is selected.

In the above configuration, when information of the main television program or a channel service of the main television program described in the information of the main television programs is selected by the viewer, the information of the television programs subordinate to the main television program is automatically displayed. Therefore, the viewer is not required to manually select each of the sub-television programs.

It is also preferred that information of a main television program and information of one or more television programs subordinate to the main television program be hierarchically described in one individual electronic program guide produced by the individual electronic program guide producing means or the common electronic program guide produced by the common electronic program guide producing means, a viewer attribute be described as information related to each sub-television program, and a particular sub-television program be automatically displayed by the displaying means, on condition that the viewer attribute described as the information of the particular sub-television program agrees with an attribute identified by the viewer, in cases where the viewer selects the main television program.

In the above configuration, when the viewer selects the information of the main television program, a particular sub-television program is selected from among the sub-television programs subordinate to the main television program on condition that the viewer attribute of the particular sub-television program agrees with an attribute selected by the viewer, and the particular sub-television program is automatically displayed. Therefore, the viewer can easily watch his most favorite television program.

It is also preferred that information of a main television program and information of one or more sub-television programs subordinate to the main television program be hierarchically described in one individual electronic program guide produced by the individual electronic program guide producing means or the common electronic program guide produced by the common electronic program guide producing means, a genre be described as information of each sub-television program, and a particular sub-television program be automatically displayed by the displaying means, on condition that the genre described as the information of the particular sub-television program agrees with a viewer favorite genre, in cases where the viewer selects the main television program.

In the above configuration, when the viewer selects the information of the main television program, a particular sub-television program is selected from among the sub-television programs subordinate to the main television program on condition that the genre of the particular sub-television program agrees with a viewer selected favorite genre, and the particular sub-television program is automatically displayed. Therefore, the viewer can easily watch his most favorite television program.

BRIEF DESCRIPTION OF THE DRAWINGS

The objects, features and advantages of the present invention will be apparent from the following description taken in conjunction with the accompanying drawings, in which:

FIG. 3 shows an example of a service description table (SDI) of a channel service ST100 described on an individual level and an example of an event information table (EIT) of the channel service ST100 described on the individual level;

FIG. 4 shows an example of a service description table (SDI) of a channel service ST100 described on a general level and an example of an event information table (EIT) of the channel service ST100 described on the general level;

FIG. 10 shows a bouquet association table (BAT) and a network information table (NIT) in case of digital video broadcasting (DVB) of European digital broadcast standards;

FIG. 11 shows a program association table (PAT) and a program map table (PMT) in case of MPEG2;

FIG. 12 shows an event information table (EIT) and a service description table (SDT) in case of digital video broadcasting (DVB) of European digital broadcast standards;

FIG. 20 shows an event information table EIT, in which event link information corresponding to an actual television program actually broadcast is not described in a column of the event link information and two event information tables EIT in which event link information corresponding to a virtual television program not actually broadcast is described in a column of the event link information, according to the seventh embodiment

FIG. 23 shows a television program table, in which information of an HDTV program extending over three television channels adjacent to each other is described, according to the ninth embodiment;

FIG. 25 shows a television program table, in which information of an HDTV program extending over three television channels separately positioned is highlighted, according to the tenth embodiment;

FIG. 26 shows a plurality of event information tables EIT, in which bandwidth information is described for each television program, according to an eleventh embodiment of the present invention;

FIG. 28 shows a television program table, in which a display width for information of one television program is set for each television program, according to the eleventh embodiment;

FIG. 29 shows an electronic program table, in which a display width for television program information is set for each television channel, according to a modification of the eleventh embodiment;

FIG. 33 shows an example of an electronic program guide according to the twelfth embodiment;

FIG. 34 shows a plurality of television programs displayed on a displaying unit one after another according to the twelfth embodiment;

FIG. 36 shows a plurality of television programs displayed on a displaying unit one after another according to the thirteenth embodiment;

FIG. 41 shows an example of a service description table SDT of main channel services and sub-channel services;

FIG. 42 shows an example of an event information table EIT of a main channel service;

FIG. 43 shows an example of an event information table EIT of another main channel service;

FIG. 44 shows an example of event information tables EIT of sub-channel services;

FIG. 46 shows an example of transport streams in which a plurality of channel services and electronic program information of the channel services are carried, according to a sixteenth embodiment of the present invention;

FIG. 48 shows an example of transport streams in which a plurality of channel services and electronic program information of the channel services are carried, according to a seventeenth embodiment of the present invention;

FIG. 51A shows an example of an electronic program table of main channel services;

FIG. 51B shows an example of an electronic program table of sub-channel services;

FIG. 52 shows an example of a service description table SDT of main channel services and sub-channel services, according to a nineteenth embodiment of the present invention;

FIG. 54 shows an example of a service description table SDT of main channel services and sub-channel services, according to a twentieth embodiment of the present invention;

FIG. 56 shows an example of a service description table SDT of main channel services and sub-channel services, according to a twenty-first embodiment of the present invention.

DETAILED DESCRIPTION OF THE EMBODIMENTS

Preferred embodiments of an electronic program information preparing and transmitting apparatus and an electronic program guide producing apparatus according to the present invention are described with reference to the drawings.

First Embodiment

Figure 1:
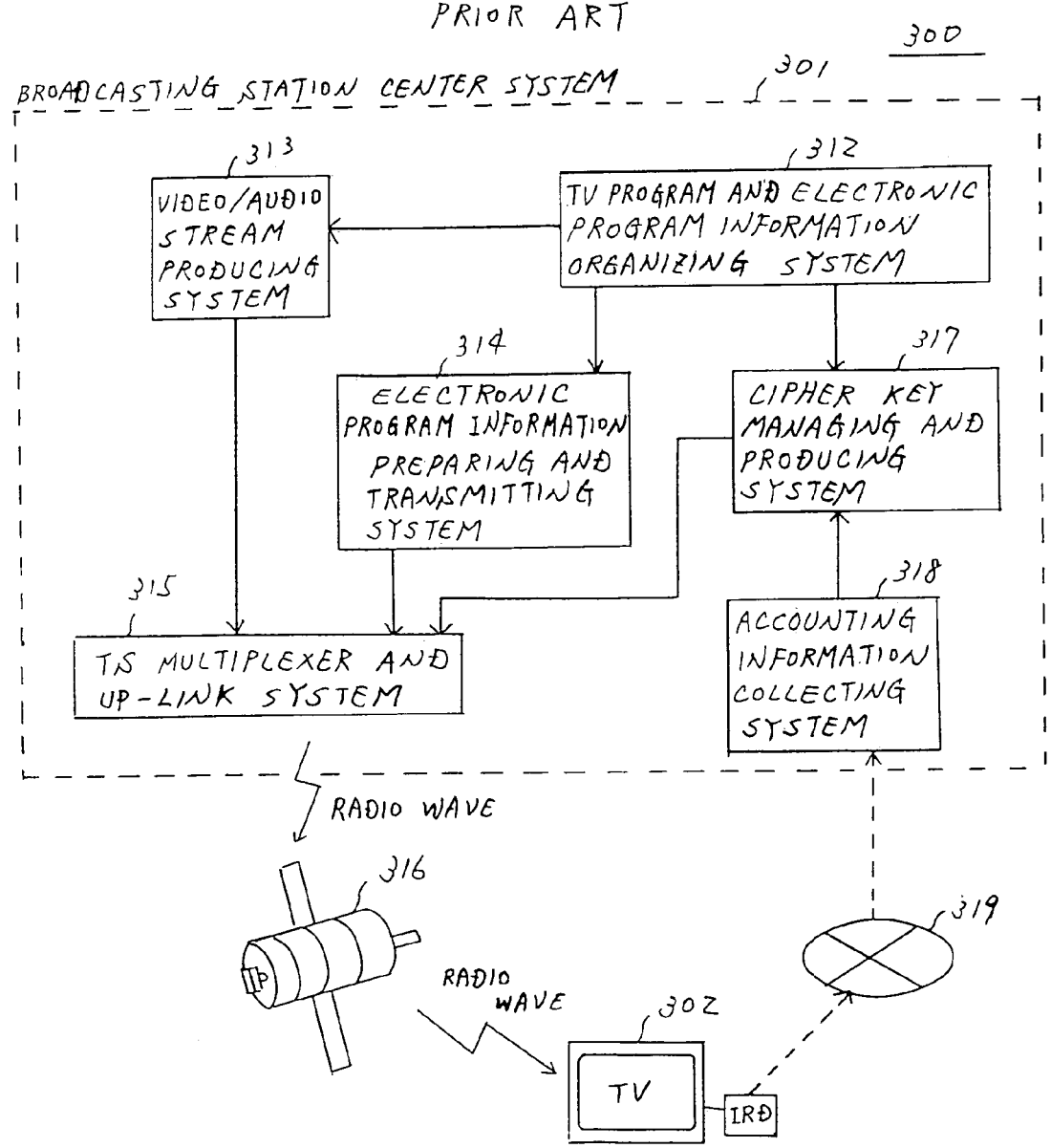
FIG. 1 shows a configuration of a conventional digital broadcasting system composed of a broadcasting station center system and a plurality of viewer's terminals.
Figure 2:
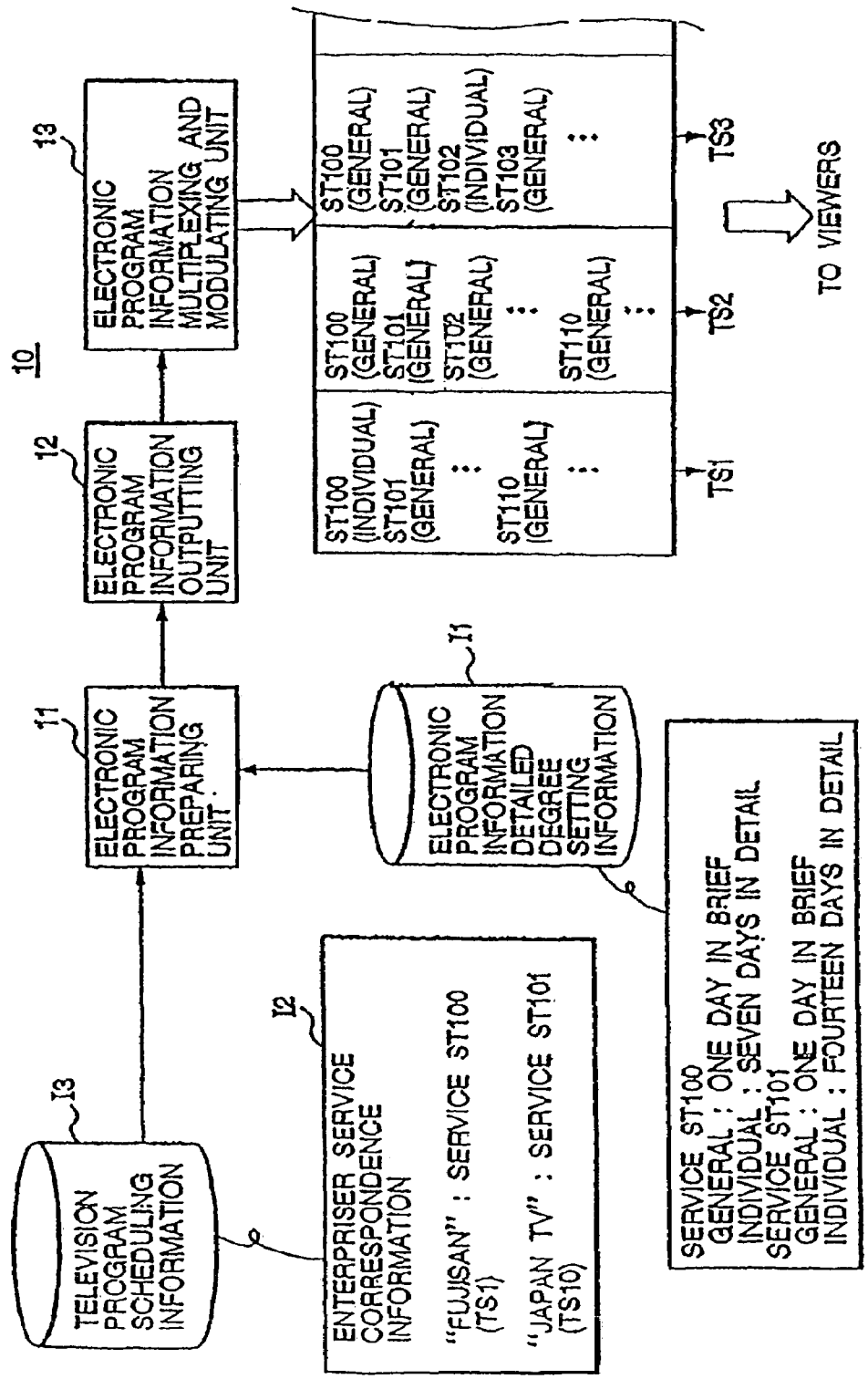
FIG. 2 is an explanatory view showing a total configuration of an electronic program information preparing and transmitting apparatus according to a first embodiment of the present invention.

FIG. 2 is an explanatory view showing a total configuration of an electronic program information preparing and transmitting apparatus placed in a central broadcasting station system according to a first embodiment of the present invention.

As shown in FIG. 2, an electronic program information preparing and transmitting apparatus 10 placed in a central broadcasting station system comprises:

an electronic program information preparing unit 11, for preparing general electronic program information described on a general level from electronic program information of a channel service provided by an individual broadcast service provider for each of a plurality of broadcast service providers, means for preparing individual electronic program information described on an individual level from the electronic program information of the channel service of each broadcast service provider, and means for preparing TS specifying information indicating a transport stream for each channel service;

an electronic program information outputting unit 12 for outputting the pieces of general electronic program information of the channel services prepared in the preparing unit 11, the pieces of individual electronic program information of the channel services prepared in the preparing unit 11 and the pieces of TS specifying information prepared in the preparing unit 11; and an electronic program information multiplexing and modulating unit 13 for multiplexing and modulating one piece of individual electronic program information of a particular channel service of a particular broadcast service provider and the pieces of general electronic program information of other broadcast service providers of channel services other than the particular channel service output from the outputting unit 12 to produce packets of combined electronic program information carried in a transport stream, which is indicated by the TS specifying information of the particular broadcast service provider, for each piece of individual electronic program information, and means for transmitting the packets of each piece of combined electronic program information to a plurality of viewer's terminals.

An operation performed in the electronic program information preparing and transmitting apparatus 10 of the above configuration is described.

When each broadcast service provider intends to provide electronic program information carried in a transport stream (TS) for a plurality of viewer's terminals, individual electronic program information described on an individual level corresponding to a high degree of detail is prepared in an electronic program information preparing unit 11 for each channel service (or each television channel) of television programs provided by a specific broadcast service provider according to both electronic program information detailed degree setting information I1 and provider service correspondence information I2. The individual level corresponds to a high degree of detail. Also, general electronic program information described on a general level is prepared in an electronic program information preparing unit 11 for each channel service of television programs provided by a corresponding broadcast service provider according to the electronic program information detailed degree setting information I1 and the provider service correspondence information I2. The general level corresponds to a low degree of detail. The individual electronic program information described on the individual level and the general electronic program information described on the general level are prepared for each broadcast service provider.

Electronic program information corresponding to one channel service of one or more television programs provided by one broadcast service provider indicates guide (or attribute) information of the television programs and is carried in one transport stream. The electronic program information degree of detail setting information I1 indicates a degree of detail for contents of the individual electronic program information described on the individual level and a detailed degree for contents of the general electronic program information described on the general level. The provider service correspondence information I2 indicates the correspondence between each broadcast service provider and one channel service carried in one transport stream, and the information I2 is included in the television program scheduling information I3. Each transport stream corresponds to one or more channel services selected by each viewer.

In general, each broadcast service provider desires to cause a viewer to watch the detailed contents of the electronic program information of one or more television programs provided by that broadcast service provider when the viewer selects a particular channel service (or a particular television channel) of that broadcast service provider, and each broadcast service provider desires to cause a viewer to watch the brief contents of electronic program information of one or more television programs provided by that broadcast service provider when the viewer selects a channel service (or a television channel) of another broadcast service provider.

Therefore, in cases where the particular electronic program information provided by a particular broadcast service provider is carried in a particular transport stream corresponding to the particular broadcast service provider and is transmitted to the viewer's terminals, the particular electronic program information prepared on the individual level is carried in a particular transport stream of the particular broadcast service provider and is transmitted to the viewer's terminals. In contrast, in cases where the particular electronic program information provided by a particular broadcast service provider is carried in transport streams other than a particular transport stream of the particular broadcast service provider and is transmitted to the viewer's terminals, the particular electronic program information prepared on the general level is carried in each of transport streams other than the particular transport stream and is transmitted to the viewer's terminals.

In the electronic program information preparing unit 11, a service description table (SDT) and an event information table (EIT) are prepared as electronic program information corresponding to each channel service. The service description table SDT is prepared according to the provider service correspondence information I2, and the event information table EIT is prepared according to the television program scheduling information I3 and the electronic program information degree of detail setting information I1.

In the electronic program information degree of detail setting information I1, detailed contents of the electronic program information described on the individual level and brief contents of the electronic program information described on the general level are set for each channel service. For example, in case of the electronic program information described on the individual level for a channel service ST100, detailed guide information of a broadcast service provider is listed on the individual level in the service description table SDT corresponding to the channel service ST100 of the broadcast service provider, and detailed guide information of a plurality of television programs covering 7 days is listed on the individual level in the event information table-corresponding to the channel service ST100 of that broadcast service provider. The service description table and the event information table described on the individual level for the channel service ST100 are, for example, shown in FIG. 3. Also, as the electronic program information described on the general level for the channel service ST100, brief guide information of the broadcast service provider is listed on the general level in the service description table SDT corresponding to the channel service ST100 of the broadcast service provider, and brief guide information of a plurality of television programs broadcast in one day is listed on the individual level in the event information table corresponding to the channel service ST100 of the broadcast service provider. The service description table and the event information table described on the general level for the channel service ST100 are, for example, shown in FIG. 4.

In the same manner, the electronic program information of a plurality of television programs covering over 14 days is described on the individual level for a channel service ST101 of the television programs, and the electronic program information of a plurality of television programs in one day is described on the general level for the channel service ST101.

In addition to the electronic program information, TS specifying information, which indicates a particular transport stream corresponding to the individual electronic program information described on the individual level, is prepared according to the provider service correspondence information I2 for each channel service. For example, as shown in FIG. 2, because a comment "the channel service ST100 is carried in a transport stream TS1 and the channel service ST101 is carried in a transport stream TS10" is described in the provider service correspondence information I2, the TS specifying information indicates:

(1) the transport stream TS1 for the electronic program information which is described on the individual level for the channel service ST100, (2) transport streams other than the transport stream TS1 for the electronic program information which is described on the general level for the channel service ST100, (3) the transport stream TS10 for the electronic program information which is described on the individual level for the channel service ST101, and (4) transport streams other than the transport stream TS10 for the electronic program information which is described on the general level for the channel service ST101.

The pieces of individual electronic program information described on the individual level, the pieces of general electronic program information described on the general level and the pieces of TS specifying information prepared in the electronic program information preparing unit 11 are sent to the electronic program information multiplexing and modulating unit 13 through the electronic program information outputting unit 12.

In the multiplexing and modulating unit 13, each piece of individual electronic program information, which is described on the individual level for a particular channel service of a particular broadcast service provider, is multiplexed with pieces of general electronic program information described on the general level for channel services of broadcast service providers other than the particular broadcast service provider and are carried in a particular transport stream specified by TS specifying information corresponding to the individual electronic program information described on the individual level.

For example, in cases where the channel service ST100 corresponds to guide information of a plurality of first television programs carried in the transport stream TS1 and in cases where the channel service ST101 corresponds to guide information of a plurality of second television programs carried in the transport stream TS10, the electronic program information (SDT and EIT described in detail) described on the individual level for the channel service ST100 and the electronic program information (SDT and EIT simply described) described on the general level for the channel service ST101 are multiplexed with each other to be carried in the transport stream TS1 corresponding to the first television programs and are transmitted to the viewer's terminal, the electronic program information (SDT and EIT described in detail) described on the individual level for the channel service ST101 and the electronic program information (SDT and EIT simply described) described on the general level for the channel service ST100 are multiplexed with each other to be carried in the transport stream TS10 corresponding to the second television programs and are transmitted to the viewer's terminal, and the electronic program information (SDT and EIT simply described) described on the general level for the channel services ST100 and ST101 are multiplexed with each other to be carried in each of transport streams, which correspond to other television programs, other than the transport streams TS1 and TS10, and are transmitted to the viewer's terminal.

Accordingly, because individual electronic program information corresponding to all channel services provided by all broadcast service providers is not prepared, but individual electronic program information corresponding to one channel service of one television program provided by one broadcast service provider is prepared, and carried in one transport stream, the data transmission band required for each broadcast service provider can be effectively used.

Also, detailed contents of the electronic program information corresponding to a channel service of one or more television programs provided by a particular broadcast service provider are carried in a particular transport stream and can be transmitted to the viewer's terminals, and brief contents of the electronic program information corresponding to the channel service of the television programs provided by the particular broadcast service provider are carried in each of transport streams other than the particular transport stream and are transmitted to the viewer's terminals.

Therefore, when the viewer selects a particular television channel corresponding to the particular transport stream of the particular broadcast service provider, the viewer can watch detail contents of the electronic program information of the television programs provided by the particular broadcast service provider. In contrast, when the viewer selects a television channel not corresponding to the particular transport stream of the particular broadcast service provider, the viewer watches brief contents of the electronic program information of the television programs provided by the particular broadcast service provider.

In this embodiment, each broadcast service provider provides a group of television programs of only one channel service (or one television channel). However, each broadcast service provider can provide groups of television programs for one or more channel services respectively carried in one transport stream. For example, in cases where a comment "a channel service ST100 of a broadcast service provider "Fujisan" is carried in a transport stream TS1, a channel service ST102 of the broadcast service provider "Fujisan" is carried in a transport stream TS3 and the channel service ST101 of a broadcast service provider "Japan TV" is carried in a transport stream TS10" is described in the provider service correspondence information I2;

(1) electronic program information (SDT and EIT described in detail) described on the individual level for the channel service ST100 is carried in each of the transport streams TS1 and TS3 of the broadcast service provider "Fujisan", (2) electronic program information (SDT and EIT simply described) described on the general level for the channel service ST100 is carried in each of transport streams other than the transport streams TS1 and TS3, (3) electronic program information (SDT and EIT described in detail) described on the individual level for the channel service ST101 is carried in the transport stream TS10 of the broadcast service provider "Japan TV", (4) general electronic program information (SDT and EIT simply described) described on the general level for the channel service ST101 is carried in each of transport streams other than the transport stream TS10, (5) individual electronic program information (SDT and EIT described in detail) described on the individual level for the channel service ST102 is carried in each of the transport streams TS1 and TS3 of the broadcast service provider "Fujisan", and (6) general electronic program information (SDT and EIT simply described) described on the general level for the channel service ST102 is carried in each of transport streams other than the transport streams TS1 and TS3.

Accordingly, detailed contents of the electronic program information corresponding to a channel service of all television programs provided by a particular broadcast service provider can be carried in each of one or more particular transport streams of the particular broadcast service provider and can be transmitted to the viewer's terminals, and brief contents of the electronic program information corresponding to the channel service of the television programs provided by the particular broadcast service provider are carried in each of transport streams other than the particular transport streams of the particular broadcast service provider and are transmitted to the viewer's terminals.

Figure 5:
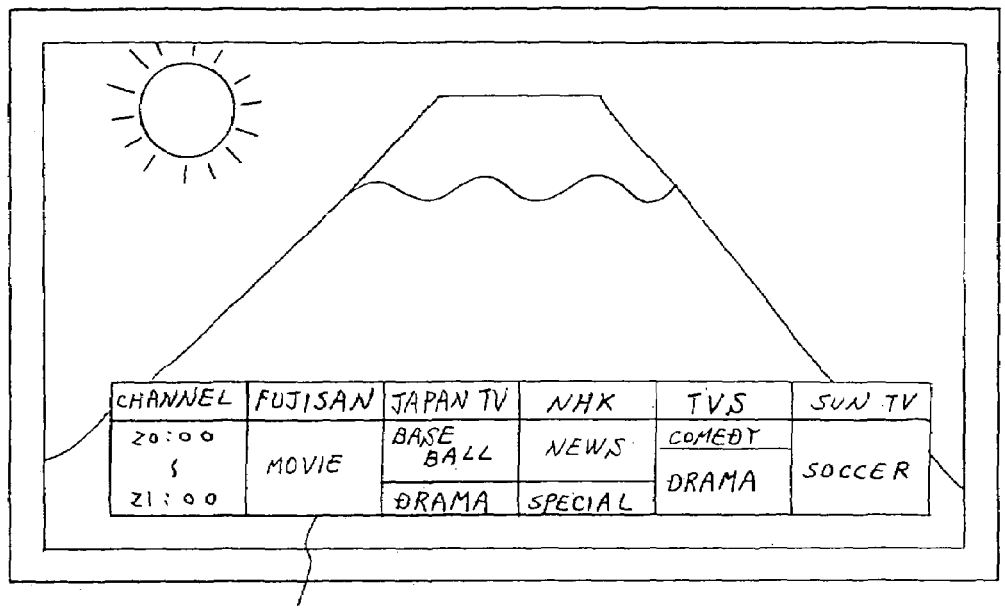
FIG. 5 shows an example of a common electronic program guide of television programs provided by all broadcast service providers.

Also, because brief contents of the general electronic program information corresponding to a plurality of channel services of a plurality of broadcast service providers, other than a particular broadcast service provider, can be obtained in each viewer's terminal, in cases where pieces of general electronic program information of the general level carried in transport streams of broadcast service providers are gathered, a common electronic program guide of the television programs provided by all broadcast service providers can be produced in each viewer's terminal. For example, as shown in FIG. 5, pieces of electronic program information of the general level provided by broadcast service providers "Japan TV", "NHK", "TVS" and "Sun TV" are carried in a transport stream of a particular broadcast service provider "Fujisan", pieces of electronic program information of the general level provided by broadcast service providers "Fujisan", "NHK", "TVS" and "Sun TV" are carried in a transport stream of the broadcast service provider "Japan TV", so that a common electronic program guide of the television programs provided by all broadcast service providers "Fujisan", "Japan TV", "NHK", "TVS" and "Sun TV" can be produced from the pieces of electronic program information of the general level provided by all broadcast service providers "Fujisan", "Japan TV", "NHK", "TVS" and "Sun TV".

Figure 6:
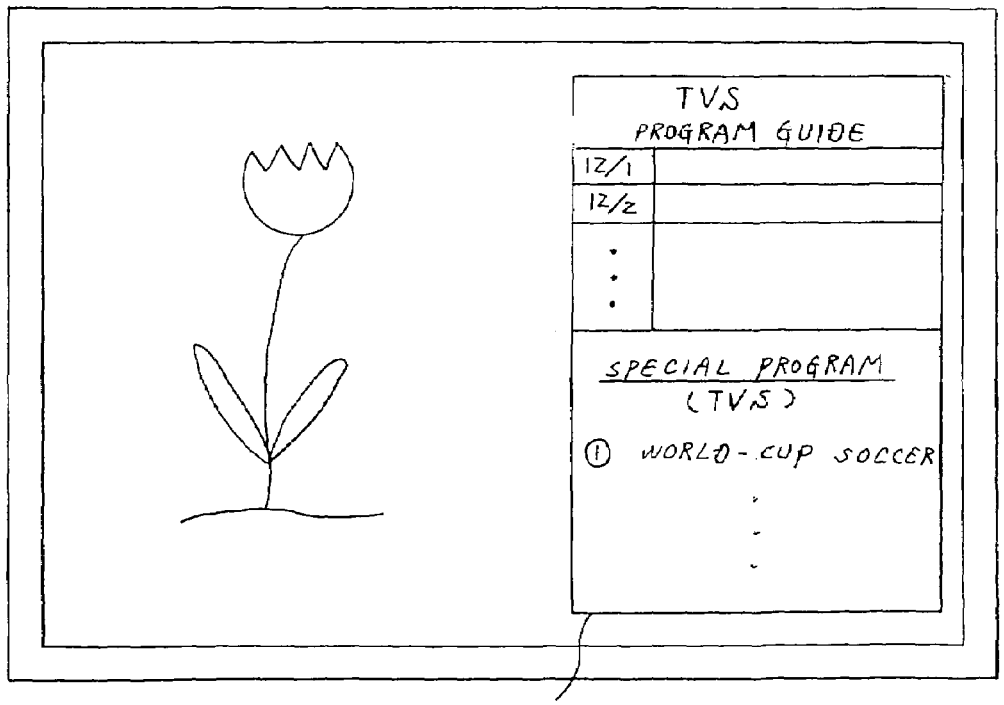
FIG. 6 shows an example of an individual electronic program guide of television programs provided by an individual broadcast service provider.

Also, because detailed contents of the electronic program information corresponding to all channel services of a particular broadcast service provider can be obtained in each viewer's terminal for each particular broadcast service provider, an individual electronic program guide of the television programs provided by one broadcast service provider can be produced from the individual electronic program information of the broadcast service provider described on the individual level in each viewer's terminal for each broadcast service provider. For example, as shown in FIG. 6, when a viewer selects a television channel of the broadcast service provider "TVS", electronic program information at the individual level provided by the broadcast service provider "TVS" is received in the viewer's terminal, an individual electronic program guide of the television programs provided by the broadcast service provider "TVS" can be produced from the electronic program information of the individual level provided by the broadcast service provider "TVS".

Also, in this embodiment, the electronic program information degree of detail setting information I1 sets detailed contents of the electronic program information described on the individual level and brief contents of the electronic program information described on the general level for each channel service. However, that the television program scheduling information I3 can set detailed contents of the electronic program information described on an individual level and brief contents of the electronic program information described on a general level for each channel service.

Second Embodiment

In this embodiment, electronic program information is prepared in a preparing unit for each broadcast service provider.

Figure 7:
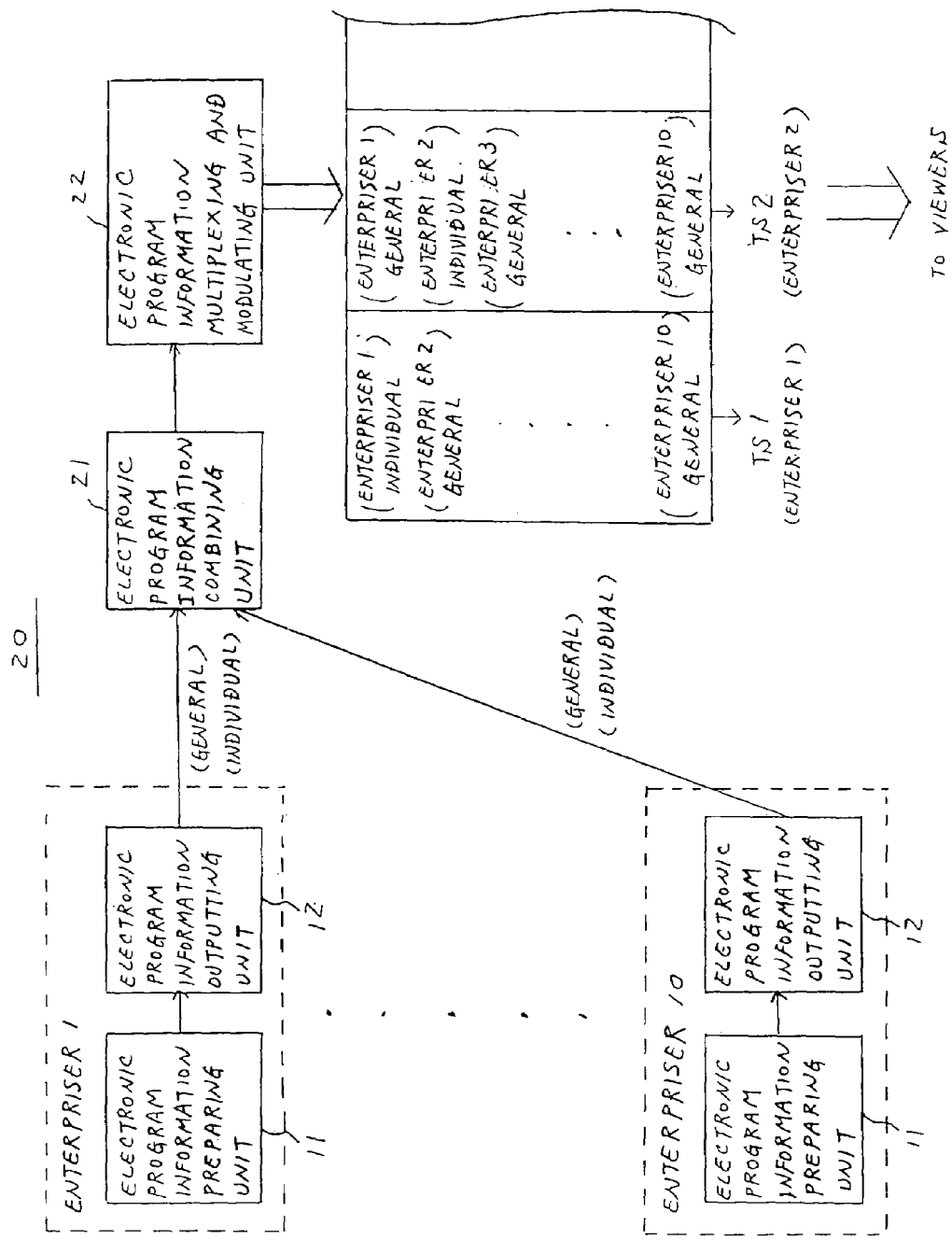
FIG. 7 is an explanatory view showing a total configuration of an electronic program information preparing and transmitting apparatus according to a second embodiment of the present invention.

FIG. 7 is an explanatory view showing the total configuration of an electronic program information preparing and transmitting apparatus placed in a central broadcasting station system according to a second embodiment of the present invention.

As shown in FIG. 7, an electronic program information preparing and transmitting apparatus 20 placed in a central broadcasting station system comprises:

the electronic program information preparing unit 11 and the electronic program information outputting unit 12 arranged for each broadcast service provider;

an electronic program information combining unit 21 for receiving the pieces of electronic program information and pieces of TS specifying information from the preparing units 11 of all broadcast service providers and combining the electronic program information described on an individual level with one or more pieces of electronic program information described on general levels for each piece of electronic program information described on the individual level; and an electronic program information multiplexing and modulating unit 22 for multiplexing and modulating each set of electronic program information described on an individual level and pieces of electronic program information described on general levels combined by the combining unit 21 to produce packets of electronic program information carried in a transport stream indicated by the TS specifying information corresponding to the electronic program information described on the individual level and transmitting the packets to viewer's terminals.

In the above configuration, an operation performed in the electronic program information preparing and transmitting apparatus 20 is described.

In each electronic program information preparing unit 11, a service description table (SDT) and an event information table (EIT) corresponding to electronic program information described on an individual level are prepared for each channel service of one broadcast service provider according to electronic program information detailed degree setting information I1 and television program scheduling information I3 of the broadcast service provider, independent of the preparation of other pieces of electronic program information performed in other electronic program information preparing units 11. In this case, the degree of detail for the electronic program information described on the individual level is determined by each broadcast service provider, so that the degree of detail of the individual level is not fixed.

Also, a service description table (SDT) and an event information table (EIT) are prepared as an additional portion of electronic program information described on a general level for the channel service, of the broadcast service provider in each electronic program information preparing unit 11 according to the electronic program information degree of detail setting information I1 and the television program scheduling information I3 of the broadcast service provider. In this case, the degree of detail for the electronic program information described on the general level is determined by each broadcast service provider, so that the degree of detail of the general level is not fixed.

Also, TS specifying information indicating the transport stream of the broadcast service provider is prepared in each electronic program information preparing unit 11. The electronic program information described on an individual level, the electronic program information described on a general level and the TS specifying information prepared in each electronic program information preparing unit 11 are sent to the electronic program information combining unit 21 through the electronic program information outputting unit 12.

In the combining unit 21, provider service correspondence information I2, indicating the correspondence between each broadcast service provider and the channel service, is recorded. Particular electronic program information, which is described on an individual level for the channel service of a particular broadcast service provider, is combined with one or more pieces of electronic program information, which are described on general levels for the channel services of one or more broadcast service providers other than the particular broadcast service provider, according to the provider service correspondence information I2 for each particular broadcast service provider.

Thereafter, each set of electronic program information described on an individual level and one or more pieces of electronic program information described on a general level(s) is sent with the TS, specifying information corresponding to the electronic program information described on an individual level, to the electronic program information multiplexing and modulating unit 22. In the multiplexing and modulating unit 22, each set of electronic program information described on an individual level and one or more pieces of electronic program information described on a general level(s) is multiplexed and carried in a particular transport stream indicated by the TS specifying information corresponding to the electronic program information described on an individual level.

Accordingly, the electronic program information described on an individual level, for a channel service of the particular broadcast service provider, can be carried with one or more pieces of electronic program information described on a general level(s) for channel services of broadcast service providers other than the particular broadcast service provider in the particular transport stream corresponding to television programs provided by the particular broadcast service provider. The electronic program information described on an individual level and the electronic program information described on the general levels are transmitted to viewer's terminals in the same manner as in the first embodiment.

Also, because each broadcast service provider can prepare electronic program information independent of the preparation of other pieces of electronic program information performed by other broadcast service providers, even though the preparation of the other pieces of electronic program information is changed, each broadcast service provider can prepare electronic program information without any adverse influence of the change on the other pieces of electronic program information of the other broadcast service providers.

Also, because the degree of detail of the electronic program information prepared by each broadcast service provider is determined by the broadcast service provider, each broadcast service provider can arbitrarily set the degree of detail for electronic program information described on an individual level and the degree of detail for electronic program information described on a general level.

Third Embodiment

Contents of a part of electronic program information (or contents of common electronic program information) are common to all broadcast service providers. In this embodiment, the common electronic program information is not prepared by each broadcast service provider but is prepared in a common preparing unit, and electronic program information (or non-common electronic program information), other than the common electronic program information, is prepared in the same manner as in the second embodiment.

Figure 8:
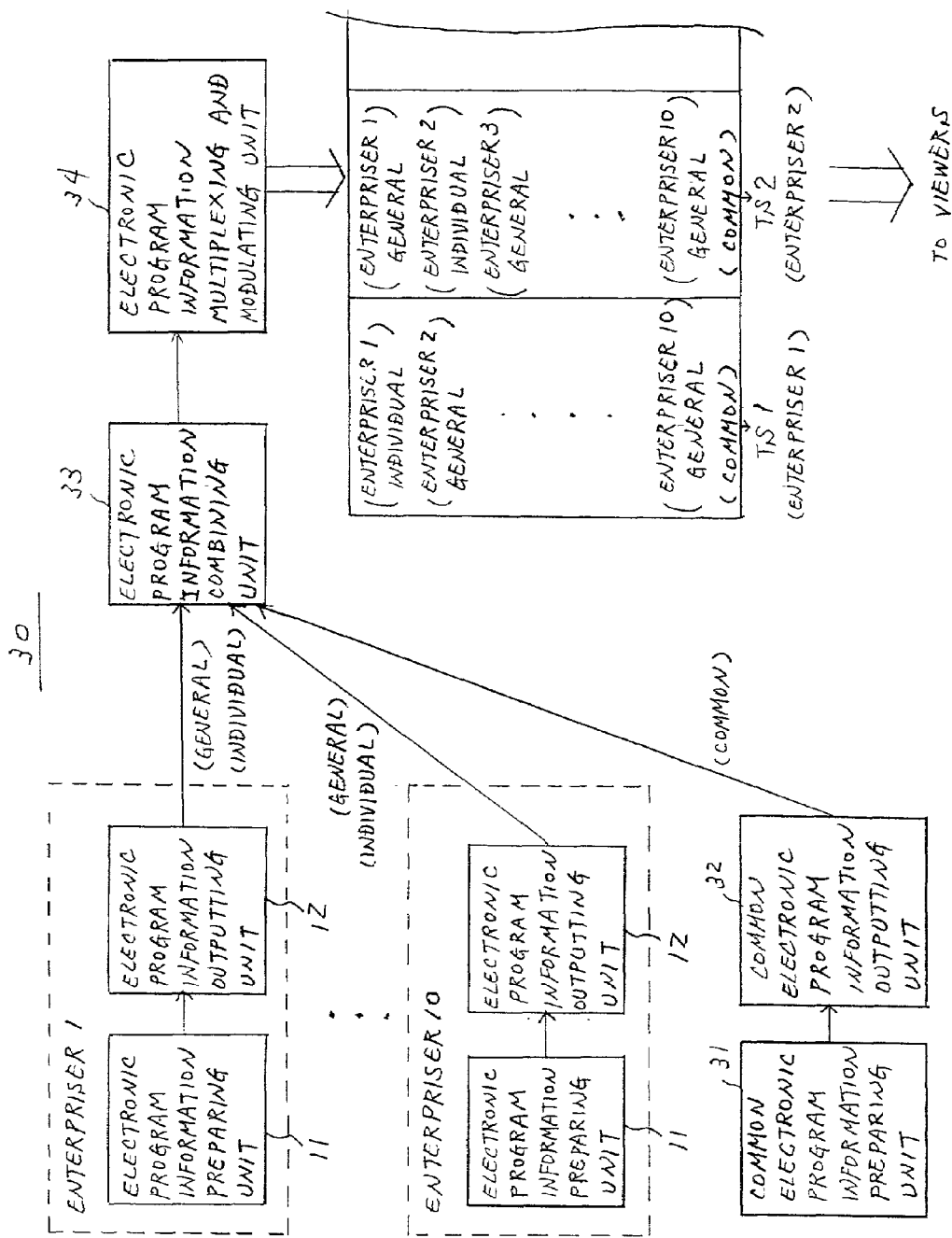
FIG. 8 is an explanatory view showing a total configuration of an electronic program information preparing and transmitting apparatus according to a third embodiment of the present invention.

FIG. 8 is an explanatory view showing a total configuration of an electronic program information preparing and transmitting apparatus located in a central broadcasting station system according to the third embodiment of the present invention.

As shown in FIG. 8, an electronic program information preparing and transmitting apparatus 30 located in a central broadcasting station system comprises:

a common electronic program information preparing unit 31 for preparing contents (called common electronic program information) common to the pieces of electronic program information of all broadcast service providers;

a common electronic program information outputting unit 32 for outputting the common electronic program information;

an electronic program information preparing unit 11 and an electronic program information outputting unit 12, arranged for each broadcast service provider, for preparing non-common electronic program information described on an individual level and non-common electronic program information described on a general level from contents of the pieces of electronic program information other than the common electronic program information for each broadcast service provider and means for transmitting the pieces of non-common electronic program information;

an electronic program information combining unit 33 for receiving the non-common electronic program information and TS specifying information from each of the outputting units 12 of all broadcast service providers, means for receiving the common electronic program information from the outputting unit 32 and means for combining the non-common electronic program information, which is described on an individual level for a channel service of a particular broadcast service provider, with one or more pieces of non-common electronic program information, which are described on general levels for channel services of broadcast service providers other than the particular broadcast service provider, and the common electronic program information for each piece of non-common electronic program information described on an individual level; and an electronic program information multiplexing and modulating unit 34 for multiplexing and modulating each set of non-common electronic program information described on an individual level, pieces of non-common electronic program information described on general levels and the common electronic program information combined with each other by the combining unit 33 to produce packets of electronic program information carried in a transport stream indicated by the TS specifying information corresponding to the non-common electronic program information described on the individual level and transmitting the packets to viewer's terminals.

In the above configuration, an operation performed in the electronic program information preparing and transmitting apparatus 30 is described.

Contents (called common electronic program information) common to the pieces of electronic program information of all broadcast service providers is prepared in a common electronic program information preparing unit 31. For example, a network information table (NIT) and bouquet association table (BAT) are common to all broadcast service providers because the NIT or BAT is hardly changed. In the NIT, tuning information used to select each of transport streams included in a network is described. In the BAT, names of channel services of all broadcast service providers, names of all transport streams including the channel services and names of bouquets are described in a list. Each bouquet corresponds to one broadcast service provider.

Also, contents (called non-common electronic program information) of electronic program information other than the common electronic program information are prepared in the electronic program information preparing unit 11 of each broadcast service provider in the same manner as in the second embodiment.

Thereafter, the common electronic program information prepared in the unit 31 is sent to the electronic program information combining unit 33 through the common electronic program information outputting unit 32, and each piece of non-common electronic program information is sent to the electronic program information combining unit 33 through the electronic program information outputting unit 12.

In the combining unit 33, the non-common electronic program information, which is described on an individual level for the channel service of a particular broadcast service provider, pieces of non-common electronic program information, which are described on general levels for channel services of broadcast service providers other than the particular broadcast service provider, and the common electronic program information for each particular broadcast service provider, are combined with each other. Thereafter, each set of the non-common electronic program information described on an individual level, the pieces of non-common electronic program information described on general levels and the common electronic program information combined with each other is multiplexed and modulated in the multiplexing and modulating unit 34 to produce packets of electronic program information, and the packets are carried in a particular transform stream, which is specified by the TS specifying information corresponding to the non-common electronic program information described on the individual level and corresponds to one or more television programs provided by the particular broadcast service provider, and are transmitted to the viewer's terminal.

Accordingly, because the common electronic program information common to all broadcast service providers is not prepared in the electronic program information preparing unit 11 of each broadcast service provider but is prepared in the common electronic program information preparing unit 31, the work for preparing electronic program information performed by each broadcast service provider can be reduced.

Also, in cases where a time and date table (TDT) is prepared by each broadcast service provider, there is a probability that a time set by one broadcast service provider differs from a time set by another broadcast service provider. Therefore, the TDT should be prepared in the common electronic program information preparing unit 31 as common electronic program information.

Fourth Embodiment

In a digital broadcast system, video and audio signals indicating one or more television programs and a group of program specific information (PSI) tables prescribed according to the MPEG2 (or a group of service information (SI) tables prescribed according to digital video broadcasting (DVB) of European digital broadcast standards) are multiplexed and modulated to produce a digital broadcast signal for each broadcast service provider (or for each bouquet). Each digital broadcast signal is composed of a plurality of packets, and each digital broadcast signal is carried in a transport stream and is transmitted to viewer's terminals. The PSI or SI is repeatedly transmitted to the viewer's terminals. When contents of the PSI or SI are renewed, a version number attached to the PSI or SI is incremented.

Figure 9:
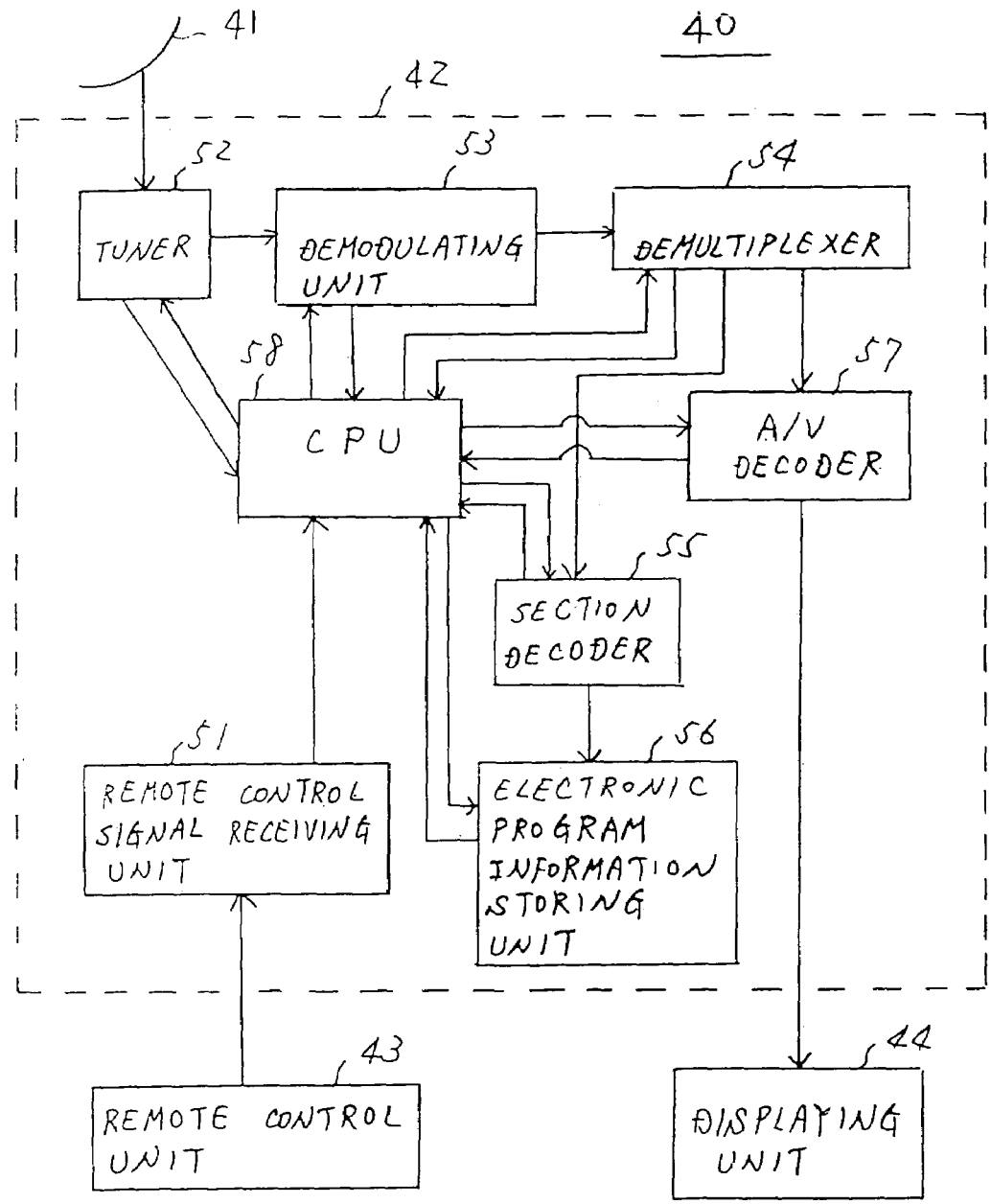
FIG. 9 is a block diagram of an electronic program information receiving terminal including an electronic program guide producing apparatus according to a fourth embodiment of the present invention.

FIG. 9 is a block diagram of an electronic program information receiving terminal including an electronic program guide producing apparatus according to a fourth embodiment of the present invention.

As shown in FIG. 9, an electronic program information receiving terminal 40 comprises:

an antenna 41 for receiving a plurality of digital broadcast signals transmitted from the electronic program information preparing and transmitting apparatus 10, 20 or 30. Each digital broadcast signal is carried in one transport stream of one of a plurality of broadcast service providers. Audio and video signals of television programs provided by each broadcast service provider are included in the digital broadcast signal;

an electronic program guide producing apparatus 42, for selecting one of the digital broadcast signals received by the antenna 41, reproducing television programs from the selected digital broadcast signal and producing a common electronic program guide common to all broadcast service providers and an individual electronic program guide of each broadcast service provider from the selected digital broadcast signal;

a remote control unit 43 for transmitting a remote control signal selected by a viewer to the electronic program guide producing apparatus 42 to control the operation of the apparatus 42; and a displaying unit 44, such as a television monitor, for displaying the television programs reproduced in the apparatus 42, displaying the common electronic program guide at any time (refer to FIG. 5), and displaying the individual electronic program guide of one broadcast service provider (refer to FIG. 6) when a television program of a channel service provided by the broadcast service provider is displayed.

The electronic program guide producing apparatus 42 comprises:

a remote control signal receiving unit 51 for receiving the remote control signal transmitted from the remote control unit 43;

a tuner 52 for tuning the digital broadcast signals received by the antenna 41 according to the remote control signal to select a particular digital broadcast signal of a particular broadcast service provider from the digital broadcast signals;

a demodulating unit 53 for demodulating the particular digital broadcast signal selected by the tuner 52;

a demultiplexer 54 for demultiplexing the particular digital broadcast signal demodulated in the demodulating unit 53 to obtain video and audio signals, individual electronic program information of the particular broadcast service provider and pieces of general electronic program information of broadcast service provider other than the particular broadcast service provider (a group of program specific information (PSI) tables or a group of service information (SI) tables) from the particular digital broadcast signal;

a section decoder 55 for decoding the PSI or SI of the electronic program information;

an electronic program information storing unit 56 for storing the pieces of general electronic program information and the individual electronic program information decoded in the section decoder 55 each time a specific digital broadcast signal is selected in the tuner 52;

an audio/video (A/V) signal decoder 57 for decoding the video and audio signals obtained in the demultiplexer 54 and outputting the decoded video and audio signals to the displaying unit 44 to display one or more television programs; and a central processing unit (CPU) 58 for controlling the remote control signal receiving unit 51, the tuner 52, the demodulating unit 53, the demultiplexer 54 and the section decoder 55, controlling the audio/video signal decoder 57 to display a particular television program provided by a particular broadcast service provider on the displaying unit 44, producing a common electronic program guide common to all broadcast service providers from the pieces of general electronic program information of the broadcast service providers stored in the storing unit 56, producing an individual electronic program guide of the particular broadcast service provider from the individual electronic program information of the particular broadcast service provider stored in the storing unit 56, controlling the audio/video signal decoder 57 to display an individual electronic program guide of the particular broadcast service provider or the common electronic program guide on the displaying unit 44 according to the remote control signal received in the receiving unit 51.

Therefore, the CPU 58 functions as a common electronic program guide producing means and an individual electronic program guide producing means.

In the above configuration, the operation of the electronic program guide producing apparatus 42 is described.

When a viewer selects a particular broadcasting station by operating a button of the remote control unit 43, a particular digital broadcast signal of the particular broadcasting station received in the antenna 41 is selected by the tuner 52 according to a remote control signal of the unit 43. Thereafter, the particular digital broadcast signal is demodulated in the demodulating unit 53 and is demultiplexed in the demultiplexer 54, so that video and audio signals, individual electronic program information of the particular broadcast service provider and pieces of general electronic program information of broadcast service provider other than the particular broadcast service provider (a group of program specific information (PSI) tables or a group of service information (SI) tables), are obtained from the particular digital broadcast signal. The video and audio signals are decoded in the audio/video signal decoder 57, and a plurality of television programs provided by the particular broadcast service provider are displayed one after another on the displaying unit 44.

The tables PSI or SI of the electronic program information (the pieces of general electronic program information and the individual electronic program information of the particular broadcast service provider) are decoded in the section decoder 55 and stored in the electronic program information storing unit 56. In this case, each table of the electronic program information has a packet identification number and/or a table identification number, and a packet identification number of one table is written in another table. Therefore, a plurality of packets corresponding to the electronic program information can be collected from a particular transport stream of the particular digital broadcast signal, and types of the tables can be specified according to the table identification numbers. Also, the tables (PSI or SI) of the electronic program information are repeatedly received in the apparatus 42, and a version number attached to each table is checked by the CPU 58. Therefore, updated tables such as a network information table (NIT), a service description table (SDT) and an event information table (EIT) can always be stored in the storing unit 56.

For example, in the case of a digital video broadcasting (DVB) of the European digital broadcast standards, the common electronic program information, such as a bouquet association table (BAT) and a network information table (NIT), is transmitted from the electronic program information preparing and transmitting apparatus 30 and is received in the electronic program guide producing apparatus 42. As shown in FIG. 10, one or more transport streams corresponding to one network are listed in each NIT, and one or more channel services of the broadcasting station of one broadcast service provider (or one bouquet) are listed in each BAT. In case of the MPEG2, as shown in FIG. 11, the common electronic program information, such as a program association table (PAT) and a program map table (PMT), is transmitted from the electronic program information preparing and transmitting apparatus 30 and is received in the electronic program guide producing apparatus 42.

Also, in case of the DVB, the non-common electronic program information, such as an event information table (EIT) and a service description table (SDT), is transmitted from the electronic program information preparing and transmitting apparatus 30 and is received in the electronic program guide producing apparatus 42. The word "event", prescribed according to the digital video broadcasting (DVB) of the European digital broadcast standards, denotes a television program. As shown in FIG. 12, information of one or more television programs of one channel service carried in one transport stream is described in each EIT, and one or more channel services of television programs carried in one transport stream are described in each SDT.

Figures 13, 14:
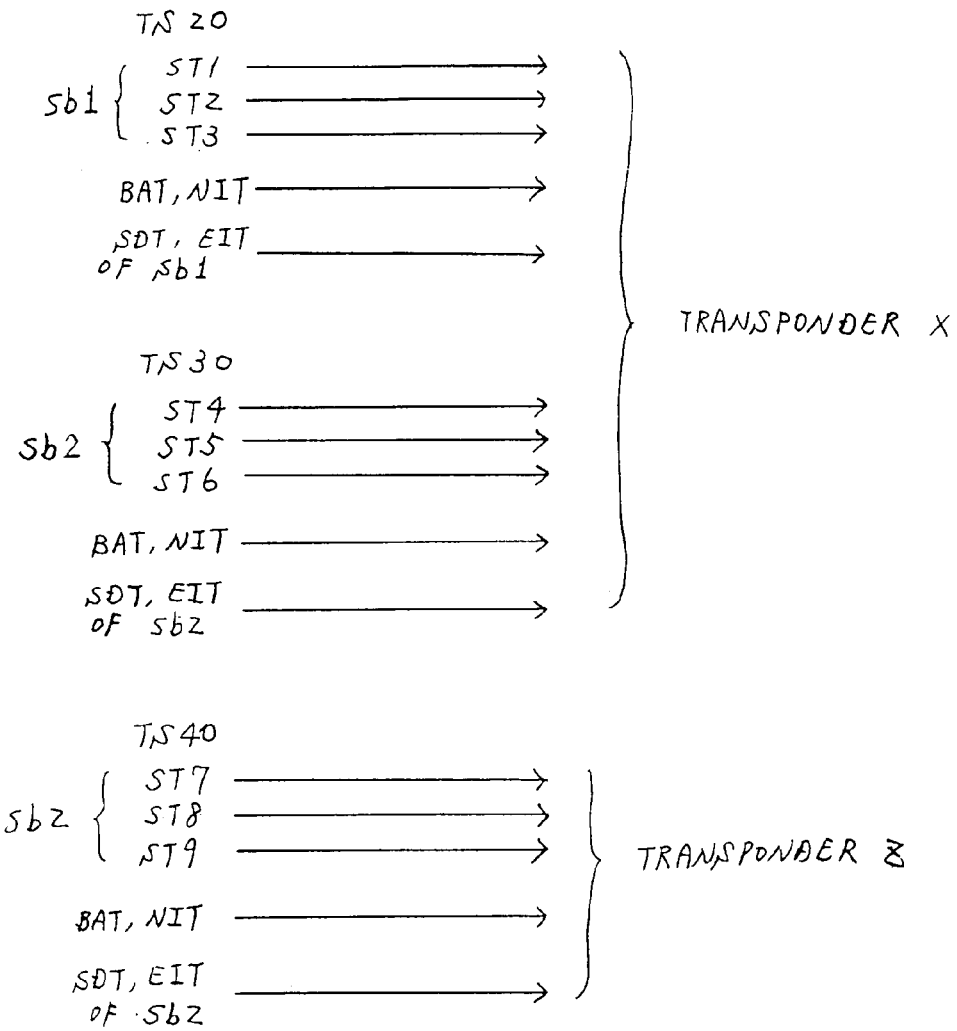
FIG. 13 shows one or more channel services, general electronic program information and non-common electronic program information transmitted to the receiving terminal apparatus including an electronic program information receiving apparatus as each transport stream.
FIG. 14 shows an example of an individual electronic program guide displayed according to the fourth embodiment.

Therefore, in case of the DVB, as shown in FIG. 13, three channel services of identification numbers ID1, ID2 and ID3 of a broadcasting station Sb1, the BAT and NIT of the common electronic program information and the SDT and EIT of the non-common electronic program information corresponding to the broadcasting station Sb1, are carried in a transport stream TS20, three channel services of identification numbers ID4, ID5 and ID6 of a broadcasting station Sb2, the BAT and NIT of the common electronic program information and the SDT and EIT of the non-common electronic program information corresponding to the broadcasting station Sb2 are carried in a transport stream TS30, and three channel services, of identification numbers ID7, ID8 and ID9 of the broadcasting station Sb2, the BAT and NIT of the common electronic program information and the SDT and EIT of the non-common electronic program information corresponding to the broadcasting station Sb2, are carried in a transport stream TS40.

Thereafter, an individual electronic program guide, made up of one or more television programs, is produced in the CPU 58 by using the tables of the electronic program information stored in the storing unit 56. In detail, the BAT is extracted from the tables for each bouquet, a particular bouquet corresponding to a particular television program currently viewed by the viewer is specified, all particular channel services corresponding to the particular bouquet are specified by using a particular BAT of the particular bouquet, particular EIT and SDT corresponding to the particular channel services are extracted from the tables, particular electronic program information corresponding to the particular channel services are extracted from the electronic program information, and an individual electronic program guide is produced according to the particular EIT and SDT and the particular electronic program information. Thereafter, the individual electronic program guide of a particular broadcast service provider, corresponding to the particular television program currently watched by the viewer, is displayed on the displaying unit 44.

An example of the individual electronic program guide is shown in FIG. 14. The channel service identification numbers (ID) ST4 to ST9 are obtained from the particular SDT, and names of particular television programs, broadcast start times of the particular television programs and broadcasting durations of the particular television programs are obtained from the particular EIT.

Accordingly, when a viewer watches a particular television program provided by a particular broadcast service provider, an individual electronic program guide of that particular broadcast service provider can be displayed.

Also, because an individual electronic program guide of a particular broadcast service provider, corresponding to a particular television program currently watched by the viewer, is displayed, there is no probability that an individual electronic program guide of a broadcast service provider, that does not correspond to a particular television program currently watched by the viewer, is erroneously displayed, so that a conflict between individual broadcast service providers can be avoided.

In this embodiment, electronic program information is transmitted from an electronic program information preparing and transmitting apparatus to the electronic program guide producing apparatus 42 according to a satellite communication or a terrestrial television broadcasting service. However, the electronic program information can be transmitted through another network system such as a telephone circuit. Also, the electronic program information can be recorded in a recording medium such as a digital versatile disc (DVD) or a floppy disc (FD).

Fifth Embodiment

Each broadcasting station (or each broadcast service provider) provides a plurality of television programs of a plurality of channel services. That is, there are a plurality of television channels corresponding to the channel services for each broadcasting station.

In this embodiment, when a viewer selects a specific bouquet (or a specific broadcasting station), a specific channel service is selected from a plurality of channel services of the specific broadcasting station, so that a specific television channel corresponding to the specific channel service is automatically selected.

Figure 15:
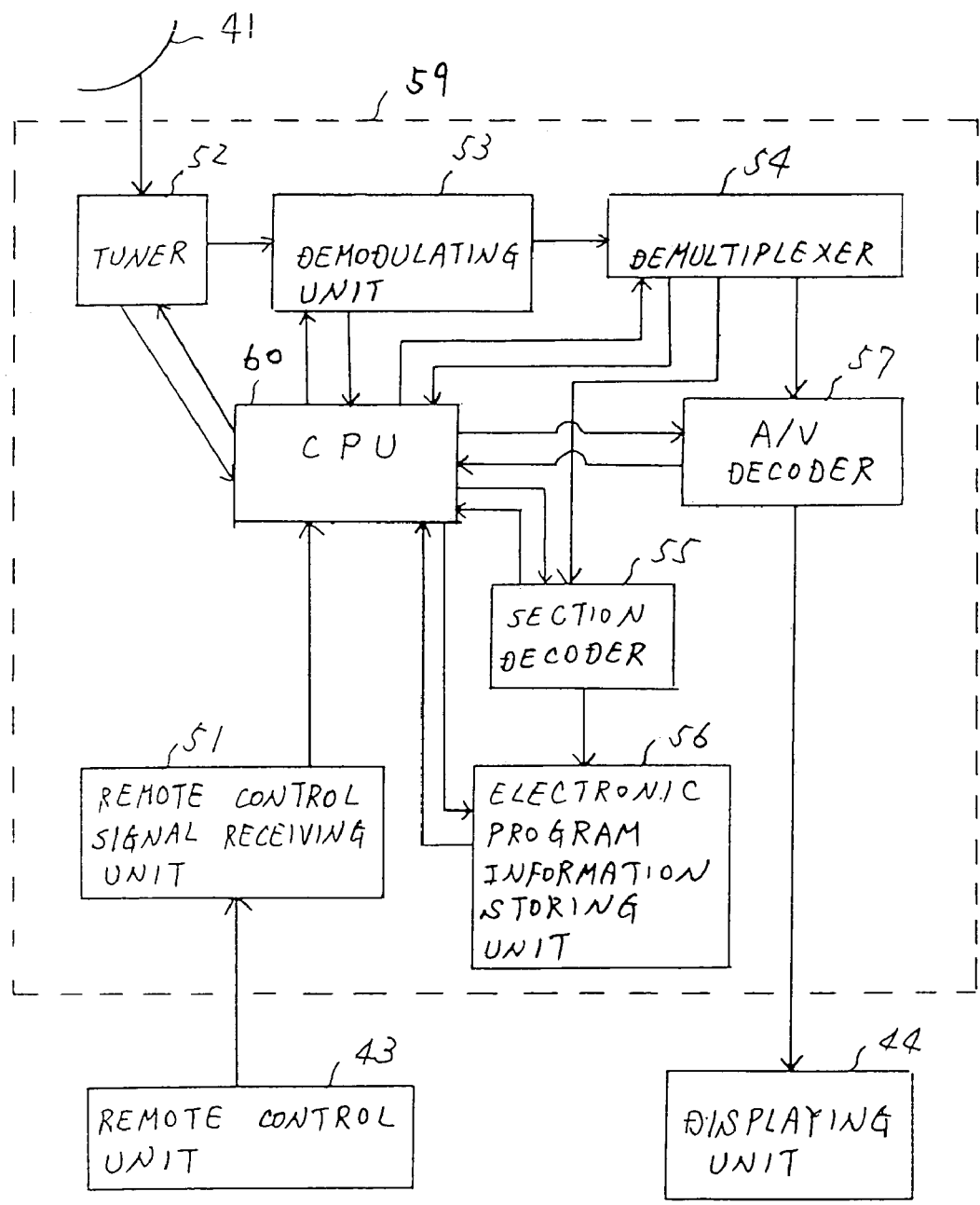
FIG. 15 is a block diagram of an electronic program information receiving apparatus including an electronic program guide producing terminal according to a fifth embodiment of the present invention.

FIG. 15 is a block diagram of an electronic program information receiving terminal including an electronic program guide producing apparatus according to a fifth embodiment of the present invention.

As shown in FIG. 15, an electronic program guide producing apparatus 59 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 60 for controlling the remote control signal receiving unit 51, the demodulating unit 53, the demultiplexer 54 and the section decoder 55, controlling the audio/video signal decoder 57 to display a particular television program provided by the particular broadcast service provider on the displaying unit 44, producing a common electronic program guide common to all broadcast service providers from the pieces of general electronic program information of the several broadcast service providers stored in the storing unit 56, producing an individual electronic program guide of the particular broadcast service provider from the individual electronic program information of the particular broadcast service provider stored in the storing unit 56, controlling the audio/video signal decoder 57 to display an individual electronic program guide of the particular broadcast service provider or the common electronic program guide on the displaying unit 44 according to the remote control signal received in the receiving unit 51, and controlling the tuner 52 to automatically select a specific television channel of a specific broadcast service provider in cases where a remote control signal indicating the specific broadcast service provider is received in the remote control signal receiving unit 51.

In the above configuration, the operation of the electronic program guide producing apparatus 59 is described with reference to FIG. 16 and FIG. 17.

A bouquet association table (BAT), in which a default selection flag is attached to each channel service, is transmitted from the electronic program information preparing and transmitting apparatus 10, 20 or 30 to the apparatus 59 for each broadcast service provider, and the BATs are stored in the storing unit 56 in the same manner as in the fourth embodiment. For example, bouquet association tables of the broadcasting stations Sb1, and Sb2 are shown in FIG. 16. As shown in FIG. 16, because a default selection flag attached to the channel service ST1 is set to "on" in the BAT of the broadcasting station Sb1, the BAT indicates a preferential selection of the channel service ST1.

Thereafter, when a viewer selects a particular broadcasting station by using the remote control unit 43, default selection flags of a particular bouquet association table (BAT) corresponding to the particular broadcasting station are checked by the CPU 60, and a particular television channel corresponding to a particular channel service, to which a default selection flag that is set to "on" is attached, is automatically selected. An example of a default selection is shown in FIG. 17.

Figures 16, 17:
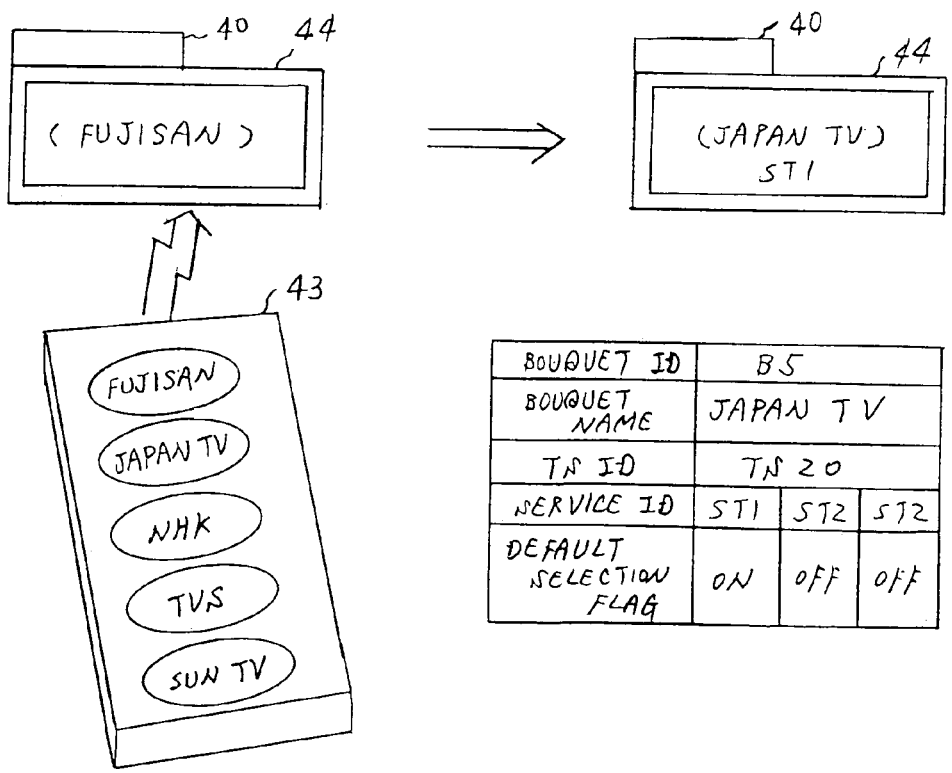
FIG. 16 shows two bouquet association tables (BATS) according to the fifth embodiment of the present invention.
FIG. 17 shows a television channel automatic selection, in which a television channel of a broadcasting station "Fujisan" is automatically changed to a particular television channel of a broadcasting station "Japan TV" according to a default flag attached to a channel service of the broadcasting station "Japan TV" when a viewer selects the broadcasting station "Japan TV", according to the fifth embodiment.

As shown in FIG. 17, in cases where a viewer desires a broadcasting station "Japan TV" when the viewer watches a television program of a broadcasting station "Fujisan", the viewer pushes a button of the broadcasting station "Japan TV" arranged in the remote control unit 43. Thereafter, the CPU 60 checks the BAT of the broadcasting station "Japan TV", a channel service ST1 is specified because a default flag attached to the channel service ST1 is set to "on", and a television channel corresponding to the channel service ST1 is automatically selected.

Thereafter, television programs and electronic program information carried in a transport stream corresponding to the particular channel service is selected in the tuning unit 52. Therefore, a television program of the particular television channel can be automatically displayed on the displaying unit 44.

Accordingly, because each broadcast service provider can specify a particular television channel selected from a plurality of television channels of the broadcast service provider, the broadcast service provider can cause the viewer to automatically select the most important television channel as determined by the broadcast service provider.

Sixth Embodiment

In this embodiment, a program attribute indicating an attribute of one television program is attached to an identification number of each television program in a table of the electronic program information.

Figure 18:
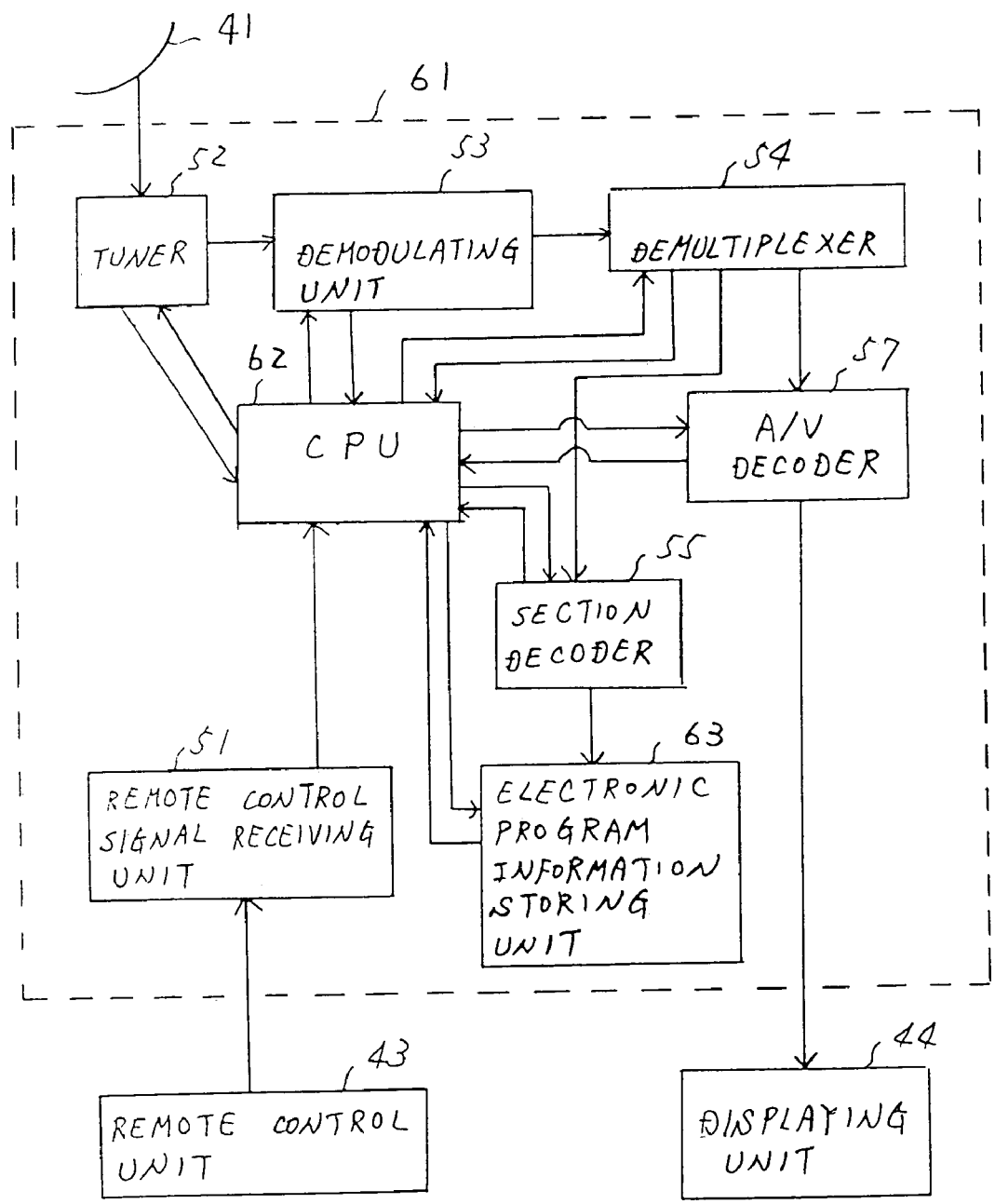
FIG. 18 is a block diagram of an electronic program information receiving terminal including an electronic program guide producing apparatus according to a sixth embodiment of the present invention.

FIG. 18 is a block diagram of an electronic program information receiving terminal including an electronic program guide producing apparatus according to a sixth embodiment of the present invention.

As shown in FIG. 18, an electronic program guide producing apparatus 61 comprises:

the remote control signal receiving unit 51, the tuner 52; the demodulating unit 53; the demultiplexer 54; the section decoder 55; the audio/video signal decoder 57;

an electronic program information storing unit 62 for storing the PSI or SI of the electronic program information decoded in the section decoder 55 and storing an attribute set by a viewer; and a central processing unit (CPU) 63 for controlling the remote control signal receiving unit 51, the tuner 52, the demodulating unit 53, the demultiplexer 54 and the section decoder 55, comparing the viewer identified attribute, stored in the storing unit 62, with a program attribute, which is attached to an identification number of each television program corresponding to the particular broadcast service provider in a table of the electronic program information stored in the storing unit 62, selecting a particular television program corresponding to a particular program attribute matching with the viewer attribute, controlling the audio/video signal decoder 57 to display the particular television program on the displaying unit 44, and controlling the electronic program information storing unit 62 to display an individual electronic program guide of the particular broadcast service provider on the displaying unit 44 by extracting particular tables, corresponding to the particular broadcast service provider, from the tables stored in the storing unit 62 according to the remote control signal received in the receiving unit 51.

In the above configuration, an attribute set by a viewer is stored in advance in the electronic program information storing unit 62. The viewer attribute indicates the taste of a viewer, features of the viewer and the like. When the viewer selects a particular broadcast service provider by using the remote control unit 43, a particular table, in which identification numbers of a plurality of television programs provided by the particular broadcast service provider are listed, is stored in the storing unit 62 in the same manner as in the fourth embodiment. In this case, a program attribute indicating an attribute of one television program is attached to the identification number of each television program in the particular table.

Thereafter, a particular television program corresponding to a particular program attribute matching with the viewer attribute is selected from the program attributes in the CPU 63, and the particular television program of a particular television channel is displayed on the displaying unit 44.

Accordingly, a particular program attribute matching with the viewer attribute can be selected, and a particular television program corresponding to the particular program attribute can be automatically displayed. Therefore, the viewer can automatically select the particular television program suitable for a particular attribute of the viewer.

Seventh Embodiment

In this embodiment, a program service genre indicating the genre of a particular television program is attached to an identification number of each television program in a table of the electronic program information.

Figure 19:
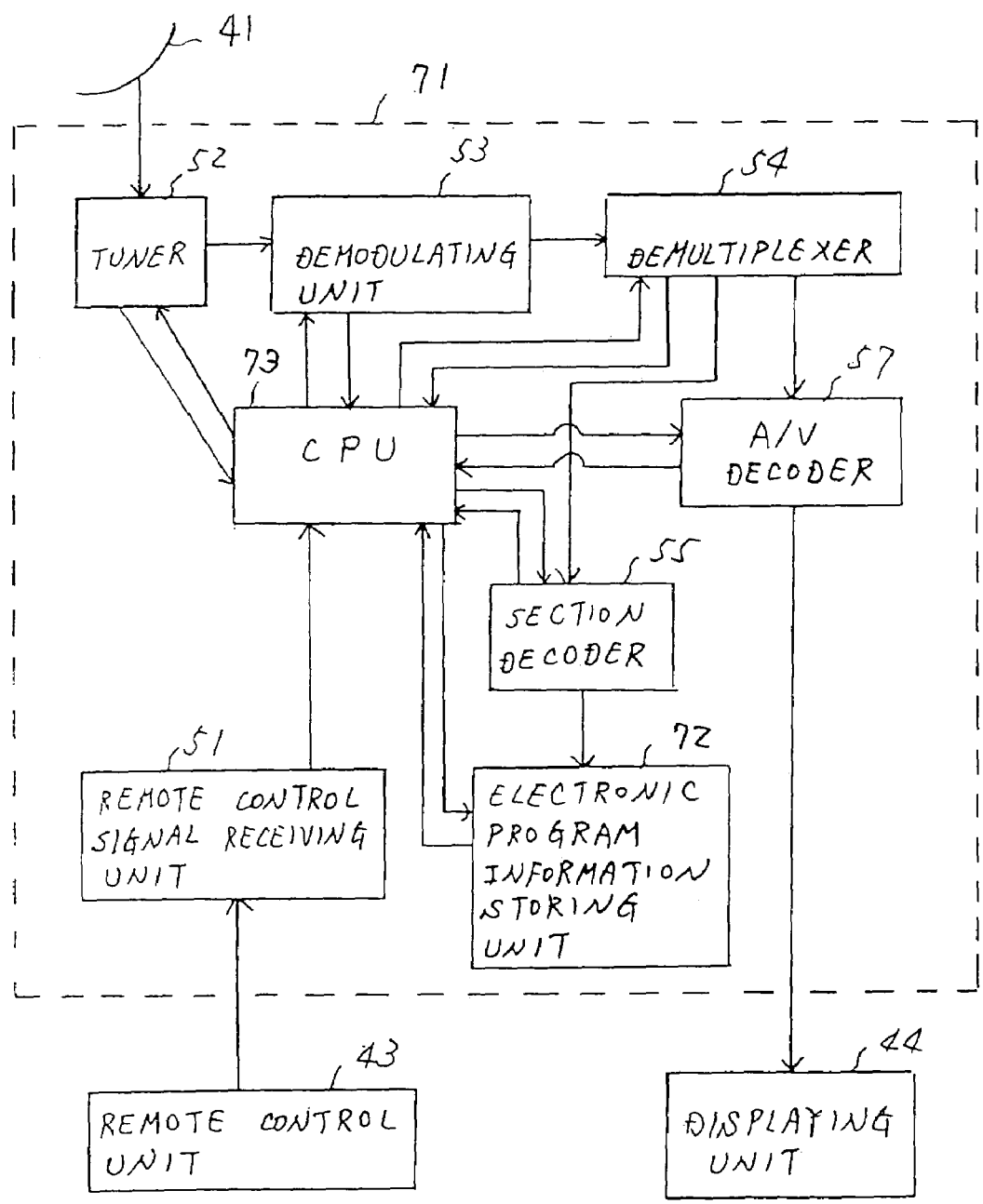
FIG. 19 is a block diagram of an electronic program information receiving terminal including an electronic program guide producing apparatus according to a seventh embodiment of the present invention.

FIG. 19 is a block diagram of an electronic program information receiving terminal, including an electronic program guide producing apparatus, according to a seventh embodiment of the present invention.

As shown in FIG. 19, an electronic program guide producing apparatus 71 comprises:

the remote control signal receiving unit 51, the tuner 52; the demodulating unit 53; the demultiplexer 54; the section decoder 55; the audio/video signal decoder 57;

an electronic program information storing unit 72 for storing the PSI or SI of the electronic program information decoded in the section decoder 55 and storing a viewer service genre set by a viewer; and a central processing unit (CPU) 73 for controlling the remote control signal receiving unit 51, the tuner 52, the demodulating unit 53, the demultiplexer 54 and the section decoder 55, comparing the viewer service genre stored in the storing unit 72 with a program service genre which is attached to an identification number of each television program corresponding to the particular broadcast service provider in a table of the electronic program information stored in the storing unit 72, selecting a particular television program corresponding to a particular program service genre agreeing with the viewer service genre, controlling the audio/video signal decoder 57 to display the particular television program on the displaying unit 44, and controlling the electronic program information storing unit 72 to display an individual electronic program guide of the particular broadcast service provider on the displaying unit 44 by extracting particular tables corresponding to the particular broadcast service provider from the tables stored in the storing unit 72 according to the remote control signal received in the receiving unit 51.

In the above configuration, a service genre, which is set by a viewer or is judged according to program viewing records of the viewer, is stored in advance in the electronic program information storing unit 72. The viewer service genre indicates a service genre desired by a viewer. For example, a movie genre, a sports genre, a music genre or the like is set as the viewer service genre.

When the viewer selects a particular broadcast service provider by using the remote control unit 43, a particular table, in which identification numbers of a plurality of television programs provided by the particular broadcast service provider are listed, is stored in the storing unit 72 in the same manner as in the fourth embodiment. In this case, a program service genre indicating a service genre of one television program is attached to the identification number of each television program in the particular table.

Thereafter, a particular television program corresponding to a particular program service genre agreeing with the viewer identified genre is selected from the program service genres in the CPU 73, and a particular television program of a particular television channel in that genre is displayed on the displaying unit 44.

Accordingly, because a particular program service genre agreeing with the viewer service genre can be selected and because a particular television program corresponding to the particular program service genre is displayed, the viewer can automatically select the particular television program belonging to a service genre suitable for the taste of the viewer.

Eighth Embodiment

In cases where a high definition television (HDTV) program is transmitted from a central broadcasting station system to viewers' terminals, because a transmission band of the HDTV program is so wide as to extend over the transmission bands of three standard television programs, the HDTV program, corresponding to three television channels of one transport stream, is transmitted after the three standard television programs corresponding to the three television channels are transmitted. In this case, an event information table (EIT) of one channel service is prepared as a table of electronic program information in the central broadcasting station system for each of the three television channels. Assuming that information of the HDTV program is described in each of the three event information tables (EITs) corresponding to the three television channels, the transmission band for the electronic program information cannot be efficiently used.

To prevent this problem in this embodiment, information of the HDTV program is described in one event information table (EIT), and event link information is written in the other two event information tables (EITs).

FIG. 20 shows three event information tables (EITs) prepared in the electronic program information preparing and transmitting apparatus 10, 20 or 30 according to an eighth embodiment of the present invention.

As shown in FIG. 20, in cases where three standard television programs identified by identification numbers TP35, TP51 and TP61 are transmitted from a central broadcasting station system before the HDTV program corresponding to three standard television programs is transmitted from the central broadcasting station system, three particular event information tables (EITs) of channel services ST6, ST7 and ST8 are transmitted from the apparatus 10, 20 or 30. The HDTV program is identified by an identification number TP40 in the event information table (EIT) of the channel service ST6, the HDTV program is identified by an identification number TP52 in the event information table (EIT) of the channel service ST7, and the HDTV program is identified by an identification number TP62 in the event information table (EIT) of the channel service ST8.

In each particular event information table, a column of event link information is arranged. In the particular event information table (EIT) of the channel service ST6, information (for example, a title of the HDTV program, a broadcasting start time of the HDTV program and a duration of broadcasting of the HDTV program) of the HDTV program is described in columns of the television program identification number TP40. Therefore, the television program TP40 is called an actual television program actually broadcast.

In each of the particular event information tables (EITs) of the channel service ST7 and ST8, information of the HDTV program is not described, but event link information "refer to event TP40 of channel service ST6 of transport stream TS30" is described in the column of event link information. Therefore, the television programs TP52 and TP62 are respectively called virtual television programs not actually broadcast.

Figure 21:
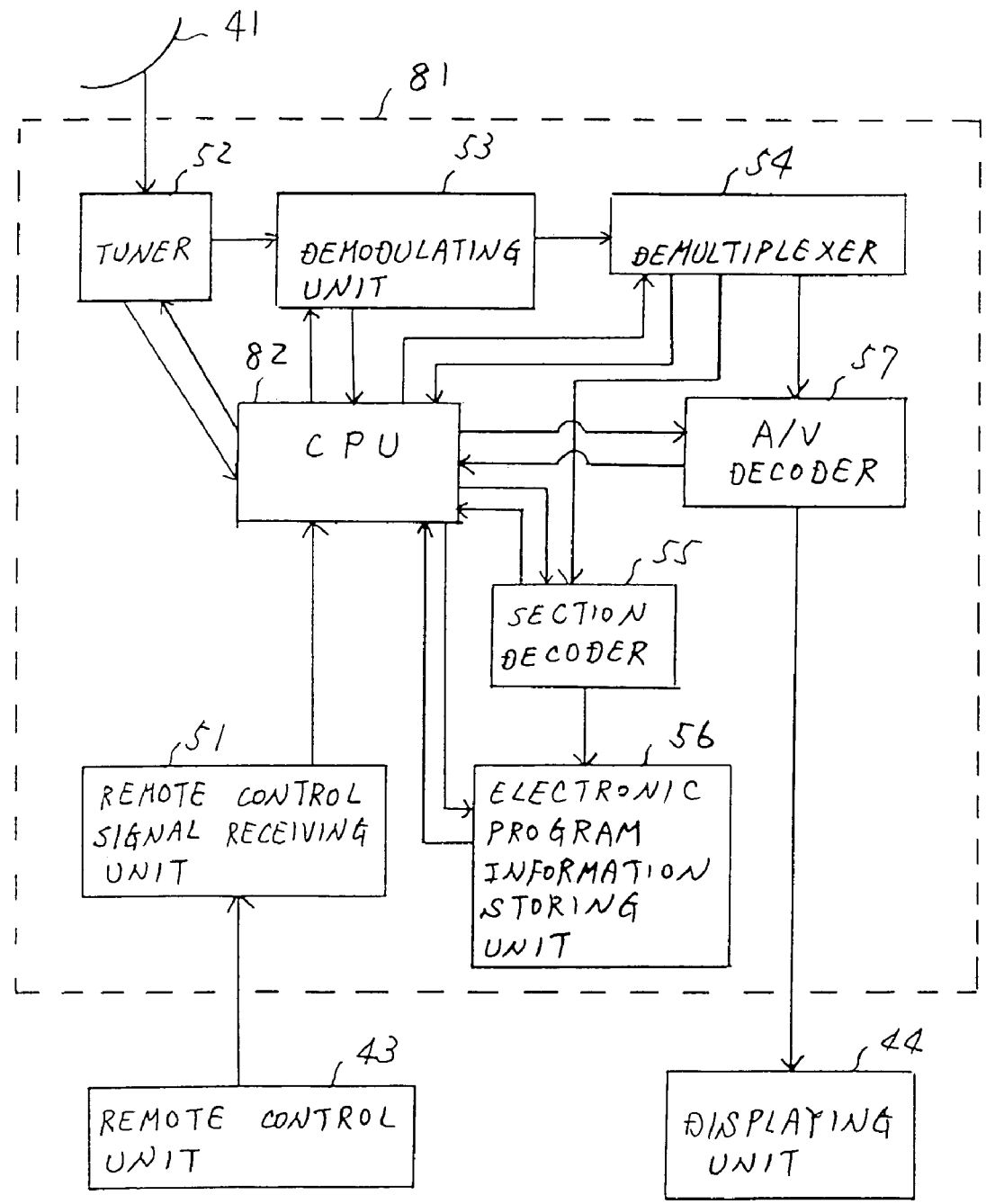
FIG. 21 is a block diagram of an electronic program information receiving terminal including an electronic program guide producing apparatus according to an eighth embodiment of the present invention.

FIG. 21 is a block diagram of an electronic program information receiving terminal including an electronic program guide producing apparatus according to the eighth embodiment of the present invention.

As shown in FIG. 21, an electronic program guide producing apparatus 81 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 82 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, displaying an event information table on the displaying unit 44 in cases where event link information is attached to the event information table, and producing an individual electronic program guide of the particular broadcast service provider while removing all virtual television programs from a broadcasting schedule of television programs of the particular broadcast service provider.

In the above configuration, in cases where a particular event information table (EIT), in which event link information is described, is detected by the CPU 82 from the electronic program information stored in the storing unit 56, because a particular television program corresponding to the event link information is a virtual television program not actually broadcast, the particular television program is removed from the broadcasting schedule of television programs, and an individual electronic program guide of the particular broadcast service provider is produced while using the broadcasting schedule of television programs.

Also, the particular event information table (EIT) is displayed on the displaying unit 44 to inform a viewer that a television program corresponding to the event link information is a virtual television program not actually broadcast.

Also, in cases where the viewer specifies the virtual television program, of which the identification number is displayed, by using the remote control unit 43, an HDTV program corresponding to the virtual television program is displayed on the displaying unit 44.

Accordingly, even though an HDTV program is broadcast, because each virtual television program not actually broadcast can be specified by event link information, information of the virtual television program can be automatically removed from an individual electronic program guide. Therefore, the viewer can watch the individual electronic program guide in which information of the virtual television program has been removed, and the data transmission band for the electronic program information can be efficiently used.

Also, in the same manner, information of the virtual television program can be automatically removed from a common electronic program guide.

In this embodiment, each virtual television program not actually broadcast is specified according to the event link information attached to the event information table (EIT). However, a table of television programs corresponding to the same HDTV program can be prepared. In this case, each virtual television program can be specified according to the table.

Ninth Embodiment

In this embodiment, in cases where an HDTV program, extending over a plurality of television channels adjacent to each other, is broadcast to each viewer's terminal, a plurality of areas of the television channels are combined into a linked area in an electronic program guide (an individual electronic program guide or a common electronic program guide), and a guide of the HDTV program is described in the linked area of the electronic program guide.

Figure 22:
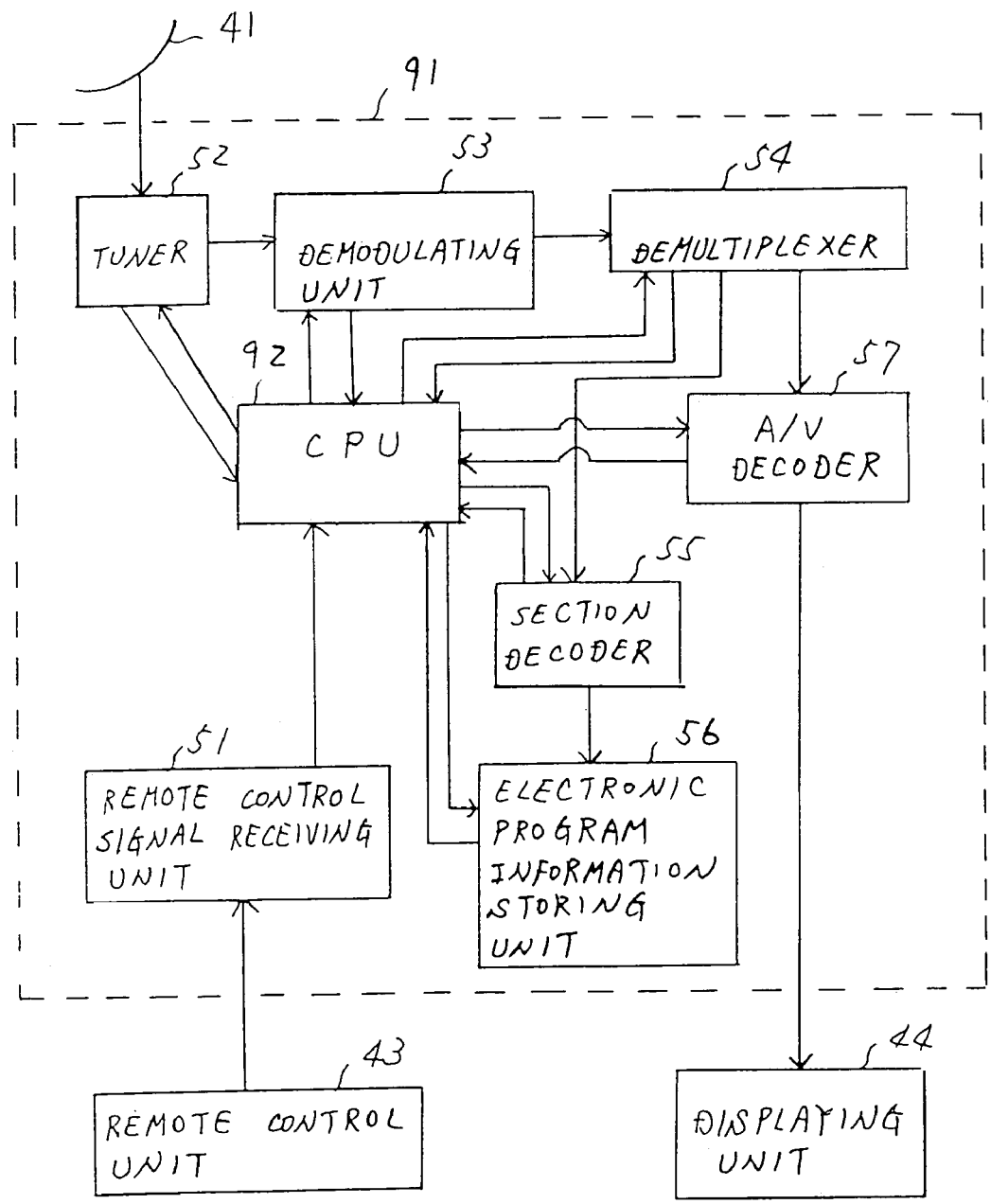
FIG. 22 is a block diagram of an electronic program information receiving terminal including an electronic program guide producing apparatus according to a ninth embodiment of the present invention.

FIG. 22 is a block diagram of an electronic program information receiving terminal including an electronic program guide producing apparatus according to a ninth embodiment of the present invention.

As shown in FIG. 22, an electronic program guide producing apparatus 91 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 92 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which information of an HDTV program extending over a plurality of television channels adjacent to each other is described in a linked area extending over guide areas of the television channels, in cases where event link information is described in one or more event information tables, and displaying the electronic program guide on the displaying unit 44.

In the above configuration, in cases where one or more event information tables EIT (refer to FIG. 20), in which event link information is described, are detected in the CPU 92 because an HDTV program extending over three television channels adjacent to each other is broadcast, an electronic program guide, in which a guide of the HDTV program is described in a linked area extending over guide areas of the television channels, is produced. For example, as shown in FIG. 23, in cases where an HDTV program extending over three television channels, CH6, CH7 and CH8, is broadcast, a guide of the HDTV program is described in a linked area extending over guide areas of the television channels CH6, CH7 and CH8 in the electronic program guide. Thereafter, the electronic program guide is displayed.

Accordingly, even though the data transmission band of an HDTV program extends over those over which a plurality of standard television programs is usually broadcast, because a guide to the HDTV program is described in a linked area extending over guide areas of a plurality of television channels used for standard television programs, the viewer can easily watch the electronic program guide.

In this embodiment, the event link information is described in one or more event information tables (EITs) to recognize that one or more virtual television programs are the same as the HDTV program. However, a table of television programs corresponding to the same HDTV program can be prepared. In this case, each virtual television program can be specified according to the table.

Tenth Embodiment

In this embodiment, in cases where an HDTV program extending over a plurality of television channels is broadcast in each viewer's terminal, a guide to the HDTV program is described in the guide area of each television channel even though event link information is described in each event information table (EIT) of channel services corresponding to the television channels, and the HDTV program guide described in each guide area is highlighted when a viewer selects one of the HDTV program guides displayed on the displaying unit 44.

Figure 24:
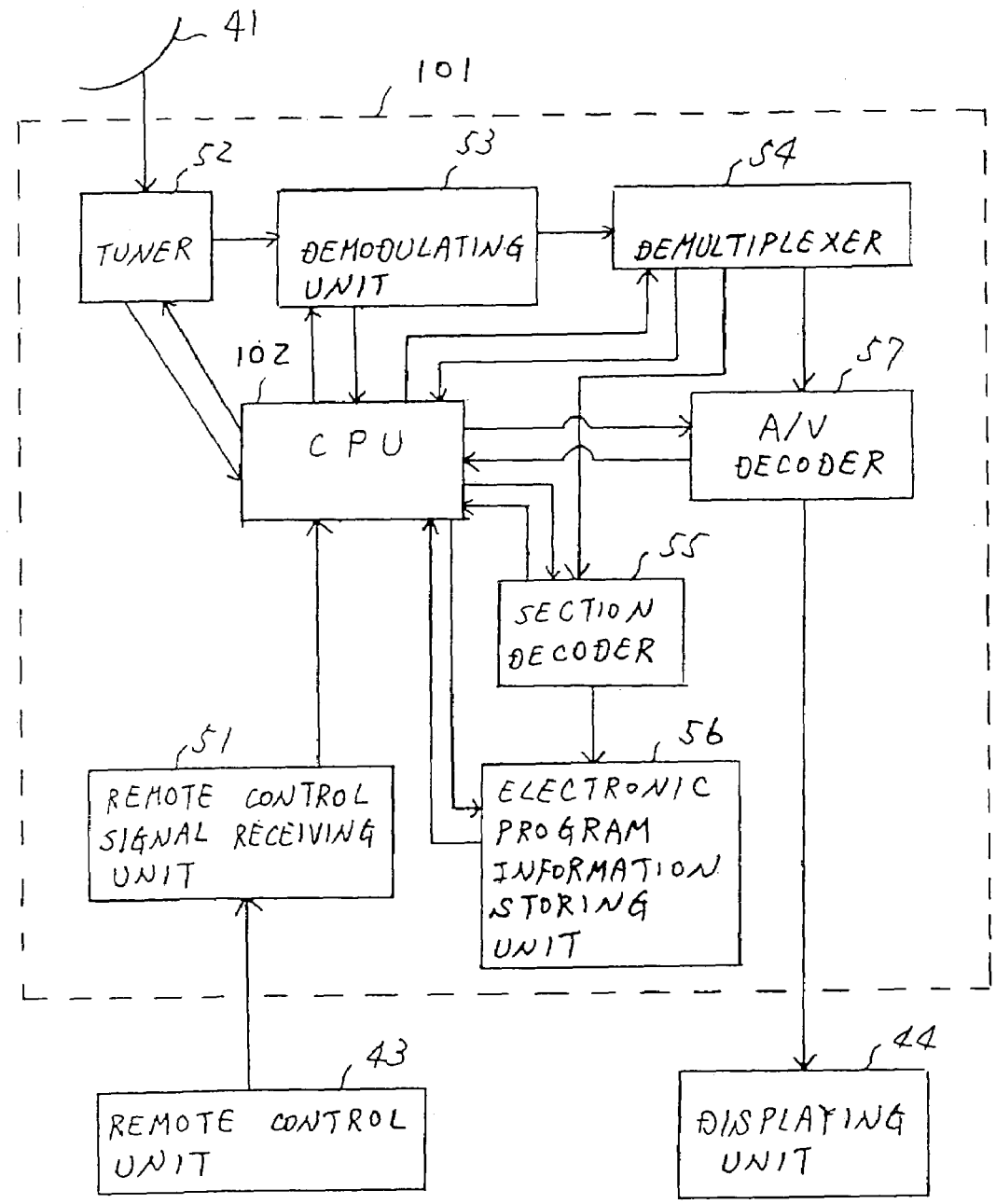
FIG. 24 is a block diagram of an electronic program information receiving terminal including an electronic program guide producing apparatus according to a tenth embodiment of the present invention.

FIG. 24 is a block diagram of an electronic program information receiving terminal including an electronic program guide producing apparatus according to a tenth embodiment of the present invention.

As shown in FIG. 24, an electronic program guide producing apparatus 101 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 102 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which information of an HDTV program extending over a plurality of television channels is described in a guide area of each television channel, in cases where event link information is described in one or more event information tables, displaying the electronic program guide on the displaying unit 44, and highlighting the HDTV program guide described in each guide area when a viewer selects one of the HDTV program guides displayed on the displaying unit 44.

In the above configuration, in cases where one or more event information tables EIT (refer to FIG. 20), in which event link information is described, are detected in the CPU 102, because an HDTV program extending over a plurality of television channels is broadcast, an electronic program guide, in which guide information of the HDTV program is described in a guide area of each television channel, is produced and displayed. Thereafter, when a viewer selects one of the HDTV program guides displayed on the displaying unit 44 by using the remote control unit 43, all guides of the HDTV program described in the guide areas of the television channels are highlighted.

For example, as shown in FIG. 25, in cases where an HDTV program extending over three television channels, for example CH1, CH2 and CH4, is broadcast, information of the HDTV program is described in each guide area of the television channels CH1, CH2 and CH4 in the electronic program guide. Thereafter, the electronic program guide is displayed. When a viewer selects one HDTV program guide of one of the television channels CH1, CH2 or CH4, all HDTV program guides of the television channels CH1, CH2 and CH4 are highlighted.

Accordingly, because all HDTV program guides are highlighted by selecting one HDTV program guide, the viewer can easily recognize all television channels corresponding to the HDTV program. In particular, even though the television channels corresponding to the HDTV program are separately positioned in the electronic program guide, the viewer can quickly recognize all television channels corresponding to the HDTV program. Therefore, the viewer can easily watch the electronic program guide.

In this embodiment, the event link information is described in one or more event information tables (EITs) to recognize that one or more virtual television programs are the same as the HDTV program. However, a table of television programs corresponding to the same HDTV program can be prepared. In this case, each virtual television program can be specified according to the table.

Eleventh Embodiment

In this embodiment, a bandwidth in data transmission of one television program from a central broadcasting station system to the receiving terminal apparatus of each viewer is described as bandwidth information for each television program in an event information table (EIT) of electronic program information. When the event information table (EIT) is received in each receiving terminal apparatus, information about each television program is displayed on condition that the display width of each television program information is proportional to the bandwidth of the television program.

The transmission bandwidth is expressed by a data transfer rate (bits per second), so that the bandwidth information of each television program indicates the display quality of the television program. An event information table (EIT) of the channel service ST4 and an event information table (EIT) of the channel service (ST5) are shown in FIG. 26 as an example.

Figure 27:
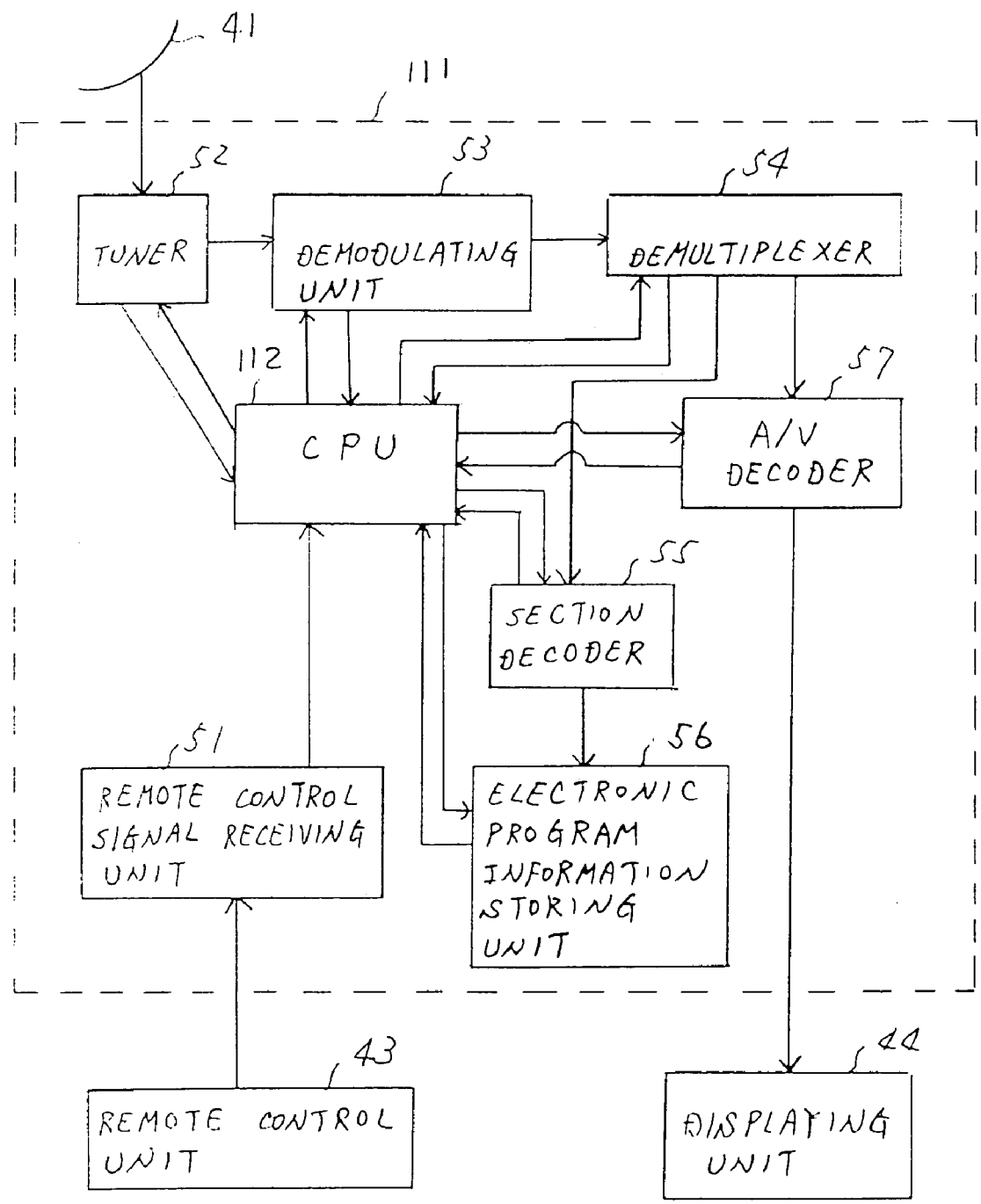
FIG. 27 is a block diagram of an electronic program information receiving terminal including an electronic program guide producing apparatus according to the eleventh embodiment of the present invention.

FIG. 27 is a block diagram of an electronic program information receiving terminal including an electronic program guide producing apparatus according to an eleventh embodiment of the present invention.

As shown in FIG. 27, an electronic program guide producing apparatus 111 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 112 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which information of each television program is arranged on condition that a display width of each television program information is proportional to a bandwidth of the television program, in cases where bandwidth information is described for each television program of each event information table, and displaying the electronic program guide on the displaying unit 44.

In the above configuration, in cases where an event information table (EIT), in which bandwidth information indicating a transmission bandwidth is described for each television program, is received and stored in the storing unit 56 for each channel service, an electronic program guide, in which information of each television program, having a display width proportional to the transmission bandwidth of the television program is displayed, is produced and is displayed.

For example, because bandwidth information indicating a wide bandwidth of 18 Mbps is described for each of the television programs "morning news" and "morning world" in the event information tables (EIT) shown in FIG. 26, as shown in FIG. 28, information about each of the television programs "morning news" and "morning world" in an electronic program guide has a wide display width.

Accordingly, when a viewer watches an electronic program guide, because a display width of information of each television program is proportional to the bandwidth of the television program, the viewer can visibly recognize the display quality of the television program, so that the viewer can utilize the electronic program guide for the selection of one or more television programs.

In this embodiment, bandwidth information is described for each television program in the event information tables (EIT) of the electronic program information. However, it is applicable that bandwidth information be described for each channel service corresponding to one television channel in the service description table (SDT) of the electronic program information. In this case, as shown in FIG. 29, an electronic program guide, in which the display width for information about a plurality of television programs corresponding to one television channel is set for each television channel, is displayed, so that the viewer can visibly recognize the display quality of television programs for each television channel. Also, bandwidth information can be included in the audio and video signals of each television program and the bandwidth information can be extracted from the audio and video signals in the A/V decoder 57.

Also, in this embodiment, the display quality of each television program is indicated by the display width of information about the television program. However, it is appropriate that a colored mark or an icon indicating the display quality of each television program be displayed according to the bandwidth information of the television program.

Also, in this embodiment, bandwidth information, indicating the display quality of each television program, is transmitted from the central broadcasting station system to each electronic program guide producing apparatus 111. However, the channel service type of each television channel should be described in the service description tables (SDT) and a display width indicating the display quality of each television program should be determined according to a correspondence table indicating the correspondence between each channel service type and one display width (refer to FIG. 30). The correspondence table indicating the correspondence between each channel service type and one display width is stored in advance in the storing unit 56 or is transmitted with the electronic program information. Therefore, when a channel service type of one television channel is received in the apparatus 111, a display width corresponding to the channel service type is determined in the CPU 113, and information of television programs corresponding to the television channel is displayed at the display width.

Twelfth Embodiment

In this embodiment, a three-dimensional electronic program guide (or a three-dimensional common electronic program guide) composed of a broadcast service provider, a broadcasting schedule and a television channel is displayed.

Figure 31:
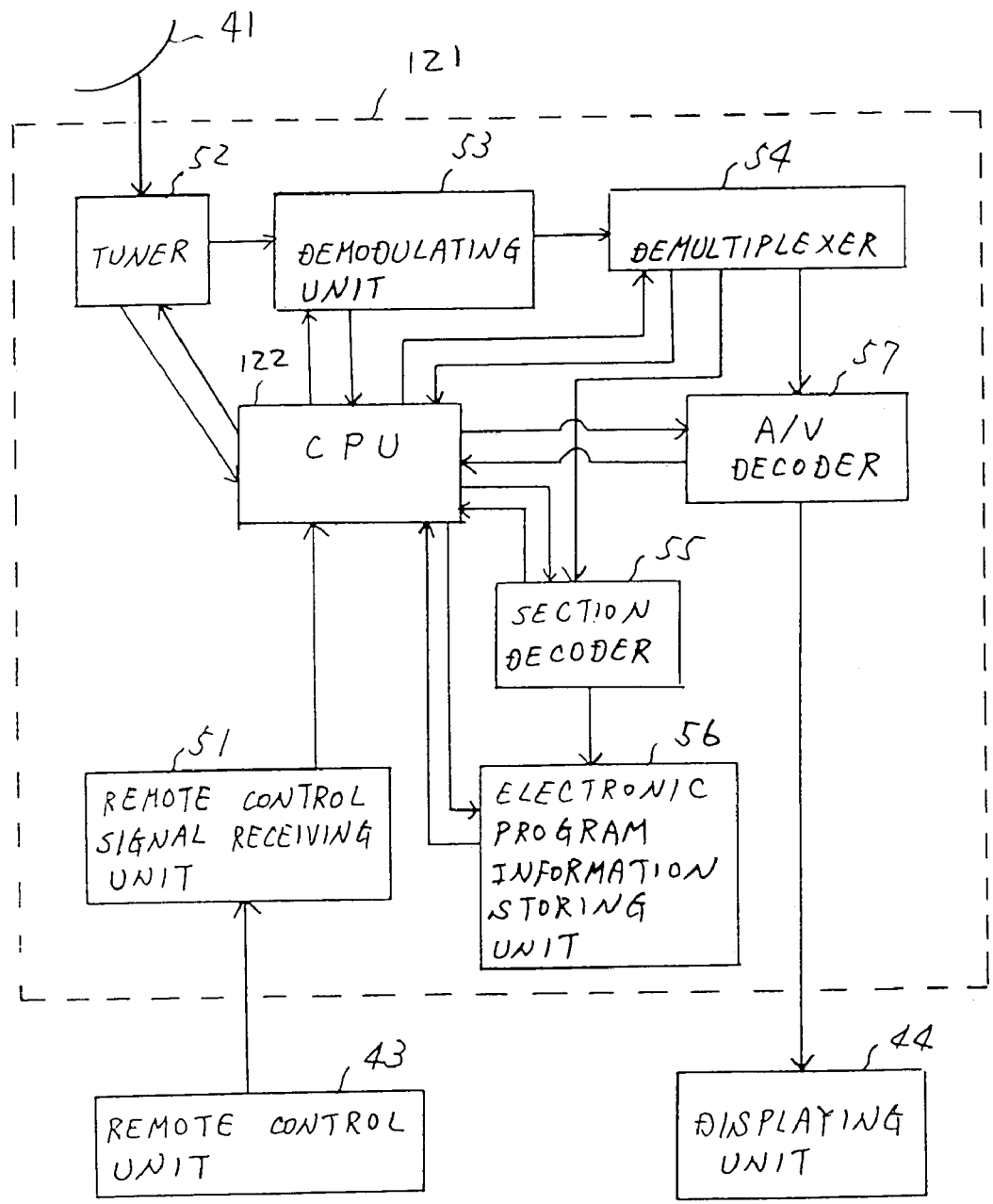
FIG. 31 is a block diagram of an electronic program information receiving terminal including an electronic program guide producing apparatus according to a twelfth embodiment of the present invention.

FIG. 31 is a block diagram of an electronic program information receiving terminal including an electronic program guide producing apparatus according to a twelfth embodiment of the present invention.

As shown in FIG. 31, an electronic program guide producing apparatus 121 comprises:

the remote control signal receiving unit 51; the tuner 52; the demodulating unit 53; the demultiplexer 54; the section decoder 55; the electronic program information storing unit 56; the audio/video signal decoder 57; and a central processing unit (CPU) 122 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing a three-dimensional electronic program guide, in which information of each television program is arranged in a three-dimensional area formed by a television channel axis, a broadcasting time axis and a broadcast service provider axis on condition that a display width of each television program information in the television channel axis is proportional to a bandwidth of the television program, in cases where bandwidth information is described for each television program of each event information table, and displaying an oblique projective figure of the three-dimensional electronic program guide on the displaying unit 44.

In the above configuration, in cases where an event information table (EIT), in which bandwidth information indicating a transmission bandwidth is described for each television program, is received and stored in the storing unit 56 for each channel service, a three-dimensional electronic program guide, in which information about each television program is arranged in a three-dimensional area formed by a television channel axis, a broadcasting time axis and a broadcast service provider axis, is produced on condition that a display width of each television program information in the television channel axis is proportional to a bandwidth of the television program. Thereafter, an oblique projective figure of the three-dimensional electronic program guide is displayed on the displaying unit 44.

Figures 30, 32:
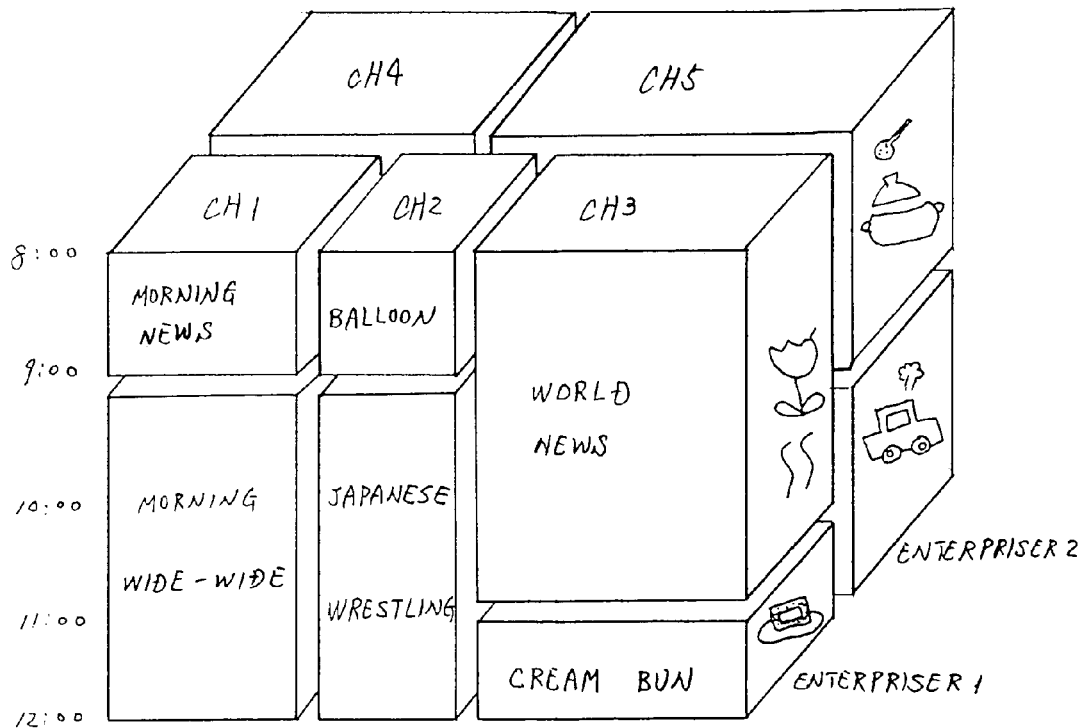
FIG. 30 shows a correspondence table indicating the correspondence between each channel service type and one display width according to a modification of the eleventh embodiment.
FIG. 32 shows an example of a three-dimensional electronic program guide according to the twelfth embodiment.

An example of the three-dimensional electronic program guide is shown in FIG. 32. As shown in FIG. 32, the television channel for each television program is expressed in an X direction, a broadcast service provider of each television program is expressed in a Y direction, a broadcasting time of each television program is expressed in a Z direction, and a display width of each television program in the X direction is proportional to the bandwidth of the television program. Also, a promotion figure for each television program, placed on the furthest right side, is displayed on a Y-Z plane. The promotion figure is included in the electronic program information transmitted from the central broadcasting station system and is displayed as an advertisement of broadcast service provider.

Accordingly, the viewer can easily recognize the broadcast service provider of each television program by watching the three-dimensional electronic program guide. Also, the viewer can watch the promotion figure for each television program.

In this embodiment, the television channel of each television program is expressed in the X direction. However, the arrangement of the television channel, the broadcast service provider and the broadcasting time is not limited to the three-dimensional electronic program guide shown in FIG. 32. For example, the broadcast service provider of each television program can be expressed in the X direction while also expressing the display width proportional to the bandwidth of each television program in the X direction.

Also, the channel of the television programs that is placed on the furthest right side can be changed to another television channel.

Thirteenth Embodiment

When the viewer desires to determine a particular television program, the viewer selects a plurality of television channels one after another to watch a plurality of television programs broadcast at the same time one after another while watching the electronic program guide of the television programs. In cases where an HDTV program extending over a plurality of television channels is broadcast to each viewer's terminal, information about the HDTV program is described in a plurality of guide areas of a plurality of television channels as in the ninth and tenth embodiments. Therefore, a television channel corresponding to the HDTV program is selected many times when the viewer desires to determine a particular television program.

For example, in cases where the electronic program guide shown in FIG. 33 is displayed on the displaying unit 44, the viewer selects a plurality of television channels CH1 to CH5 one after another to watch a plurality of television programs TP100, TP105 and TP104 broadcast in the same 4 o'clock slot one after another. In this case, when the viewer operates the remote control unit 43 to move a cursor displayed on the displaying unit 44 from the channel CH1 on the left side to the channel CH5 on the right side, the channel CH1 (television program TP100), the channel CH2 (HDTV program TP105), the channel CH3 (HDTV program TP105), the channel CH4 (HDTV program TP105) and the channel CH5 (television program TP104) are selected in that order. Therefore, the HDTV program TP105 is displayed three times on the displaying unit 44.

In this embodiment, as shown in FIG. 34, the selection of the television channels CH3 and CH4 is omitted, and the channel CH1 (television program TP100), the channel CH2 (HDTV program TP05) and the channel CH5 (television program TP104) are selected in that order, and the television program TP100, the television program TP105 and the television program TP104 are displayed on the displaying unit 44 in that order.

Figure 35:
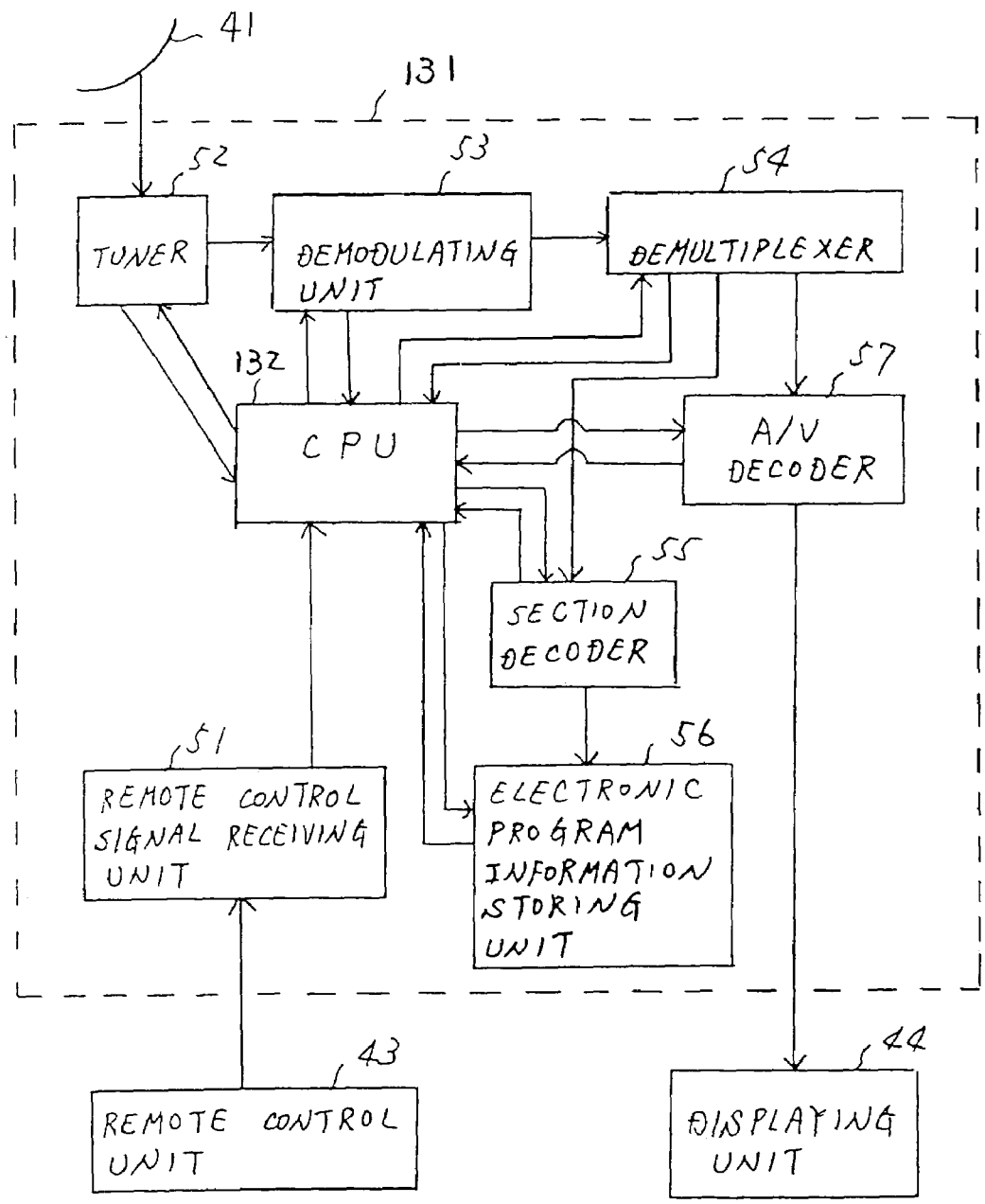
FIG. 35 is a block diagram of an electronic program information receiving terminal including an electronic program guide producing apparatus according to a thirteenth embodiment of the present invention.

FIG. 35 is a block diagram of an electronic program information receiving terminal including an electronic program guide producing apparatus according to a thirteenth embodiment of the present invention.

As shown in FIG. 35, an electronic program guide producing apparatus 131 comprises:

the remote control signal receiving unit 51; the tuner 52; the demodulating unit 53; the demultiplexer 54; the section decoder 55; the electronic program information storing unit 56; the audio/video signal decoder 57; and a central processing unit (CPU) 132 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which information of an HDTV program extending over a plurality of television channels adjacent to each other is described in a linked area extending over guide areas of the television channels, in cases where event link information is described in one or more event information fables, displaying the electronic program guide on the displaying unit 44, selecting a plurality of television channels, which are specified by a cursor moved on information of a plurality of television programs in the electronic program guide, one after another while selecting only one television channel from a plurality of television channels corresponding to an HDTV program, and displaying the television programs of the selected television channels one after another.

In the above configuration, as shown in FIG. 33, even though information about an HDTV program extending over a plurality of television channels is described in the guide areas of the television channels, the television channel corresponding to the HDTV program is not selected in duplicate. Therefore, as shown in FIG. 34, the television channel CH2 is only selected from among the television channels CH2, CH3 and CH4 corresponding to the HDTV program TP105.

Accordingly, the viewer does not watch the HDTV program in duplicate, so that the viewer can efficiently determine the television channel of a particular television program.

In this embodiment, an identification number such as TP100 is described as service identifying information of each television program in the electronic program table. However, it is applicable that the title of each television program or the logotype of each television program can be described as service identifying information.

Also, information about the HDTV program is described in the linked area according to the ninth embodiment. However, information about the HDTV program extending over a plurality of television channels is described in the guide area of each television channel according to the tenth embodiment.

Fourteenth Embodiment

In the thirteenth embodiment, as shown in FIG. 34, the numbers of the television channels are not displayed in serial order. Therefore, the viewer cannot easily realize the selection of the television channels.

In the fourteenth embodiment, in cases where an HDTV program extending over a plurality of television channels is displayed on the displaying unit 44, as shown in FIG. 36, the numbers of all television channels corresponding to the HDTV program are displayed with the HDTV program.

Figure 37:
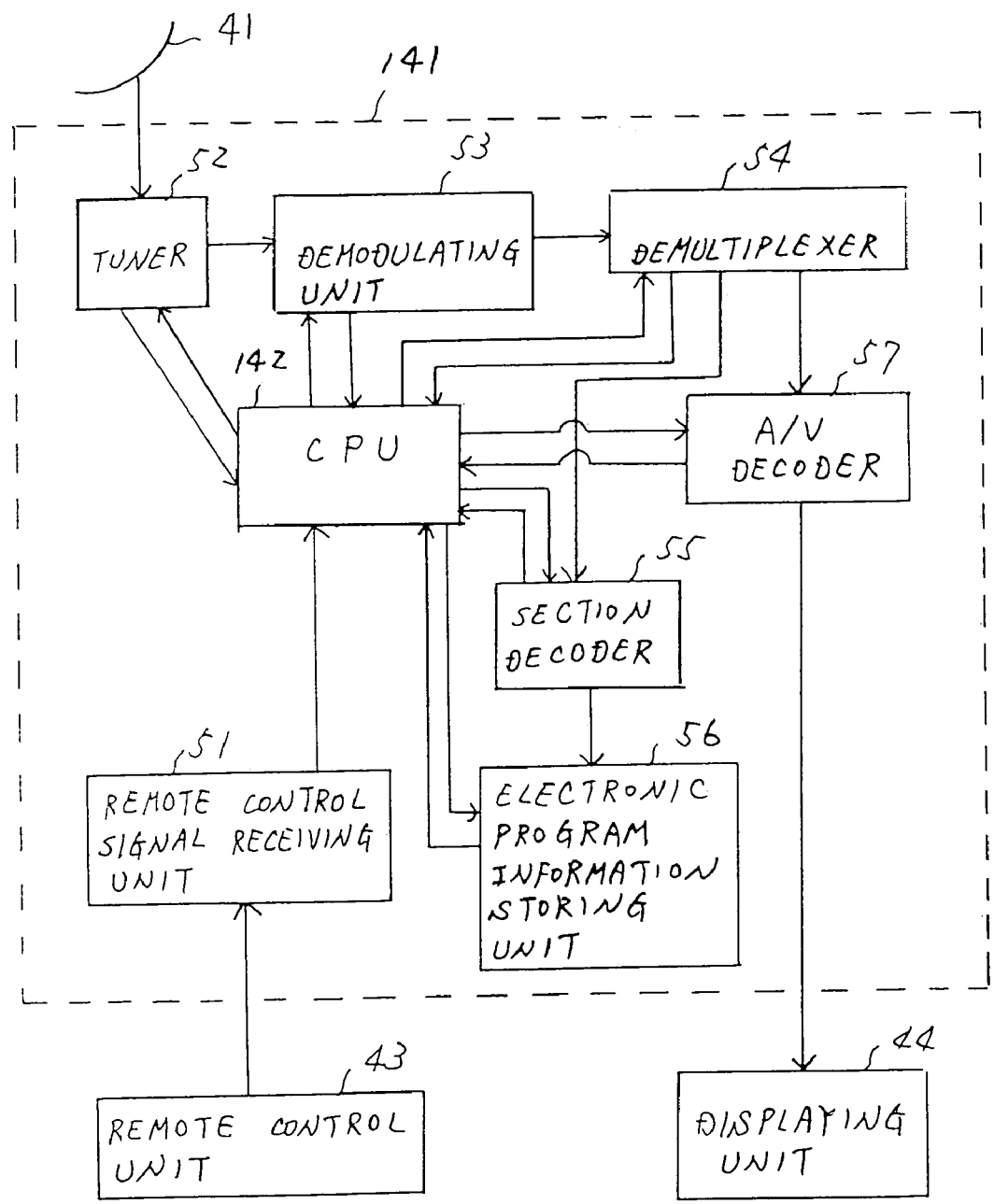
FIG. 37 is a block diagram of an electronic program information receiving terminal including an electronic program guide producing apparatus according to a fourteenth embodiment of the present invention.

FIG. 37 is a block diagram of an electronic program information receiving terminal including an electronic program guide producing apparatus according to a fourteenth embodiment of the present invention.

As shown in FIG. 37, an electronic program guide producing apparatus 141 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 142 for controlling the remote-control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which information of an HDTV program extending over a plurality of television channels adjacent to each other is described in a linked area extending over guide areas of the television channels, in cases where event link information is described in one or more event information tables, displaying the electronic program guide on the displaying unit 44, selecting a plurality of television channels, which are specified by a cursor moved on information of a plurality of television programs in the electronic program guide, one after another while selecting only a particular television channel from a plurality of television channels corresponding to an HDTV program, and displaying the television programs of the selected television channels one after another with a channel number of each selected television channel on condition that a plurality of channel numbers of all television channels corresponding to the HDTV program are displayed with the HDTV program when the particular television channel of the HDTV program is selected.

In the above configuration, as shown in FIG. 36, when the particular television channel (CH2) of the HDTV program is selected, channel numbers CH2, CH3 and CH4 of all television channels corresponding to the HDTV program are displayed with the HDTV program. Therefore, all channel numbers CH1 to CH5 are displayed in serial order.

Accordingly, the viewer can easily select the desired television channels.

In this embodiment, an identification number, such as TP100, is described as the service identifying information for each television program in the electronic program table. However, the title of each television program or the logotype of each television program can be described as service identifying information.

Also, information of the HDTV program is described in the linked area according to the ninth embodiment. However, information about the HDTV program extending over a plurality of television channels can be described in the guide area of each television channel according to the tenth embodiment.

Fifteenth Embodiment

Figures 38, 39, 40:
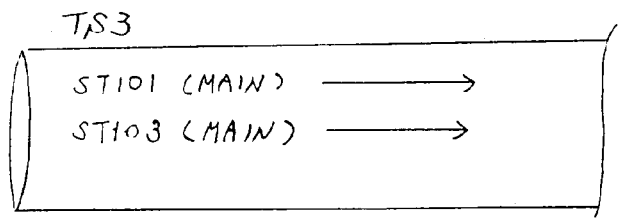
FIG. 38 shows an example of main channel services and sub-channel-services according to a fifteenth embodiment of the present invention.
FIG. 39 shows an example of transport streams in which a plurality of channel services are carried.
FIG. 40 shows an example of a service description table SDT of main channel services.

As shown in FIG. 38, a channel service ST101 of television programs belonging to a service type "SDTV", a channel service ST103 of television programs belonging to a service type "music" and a group of channel services ST900, ST901, ST902 and ST903 of television programs belonging to the service type "music" are transmitted from the central broadcasting station system to each electronic program information receiving apparatus. The group of channel services ST900, ST901, ST902 and ST903 are subordinate to the channel service ST103.

As shown in FIG. 39, the television programs of the channel services ST101 and ST103 are carried in a transport stream TS3, and the television programs of the channel services ST900, ST901, ST902 and ST903 are carried in a transport stream TS5.

In this embodiment, because the channel services ST900, ST901, ST902 and ST903 are subordinate to the channel service ST103, as shown in FIG. 40, pieces of information about the television programs of the channel services ST101 and ST103 are described in a service description table (SDT)

of the transport stream (TS3), and each of the channel services ST101 and ST103 is called a main channel service. Also, as shown in FIG. 41, pieces of information about the television programs of the channel services ST101 and ST103 and pieces of information of the television programs of the channel services ST900, ST901, ST902 and ST903 are described in a service description table (SDT) of the transport streams TS3 and TS5. Each of the channel services ST900, ST901, ST902 and ST903 is called a sub-channel service. Also, pieces of information of the television programs of the channel service ST101 are described in an event information table (EIT) shown in FIG. 42, pieces of information of the television programs of the channel service ST103 are described in an event information table (EIT) shown in FIG. 43, and pieces of information of the television programs of the channel services ST900 to ST903 are respectively described in an event information table (EIT) shown in FIG. 44.

In the service description table (SDT) shown in FIG. 41, an identifier such as "main", is written in a main/sub column of each of the channel services ST101 and ST103 to classify each of the channel services ST101 and ST103 as a main channel service. An identifier such as "sub" is written in a main/sub column of each of the channel services ST900, ST901, ST902 and ST903 to classify each of the channel services ST900, ST901, ST902 and ST903 as a sub-channel service. Reference service numbers "ST900 to ST903" are written in a reference service column of the channel service ST103 to indicate that the sub-channel services ST900 to ST903 are subordinate to the channel service ST103. A reference service number "ST103" is written in a reference service column of each of the channel services ST900, ST901, ST902 and ST903 to indicate that a main channel service of the sub-channel services ST900 to ST903 is the channel service ST103, a reference transport stream number "TS5" is written in a reference transport stream column of the channel service ST103 to indicate that sub-channel services subordinate to the channel service ST103 are carried in the transport stream TS5. A reference transport stream number "TS3" is written in a reference transport stream column of the transport stream TS5 to indicate that a main channel service of the sub-channel services ST900 to ST903 is carried in the transform stream TS3.

Therefore, the channel services ST101 and ST103 and a group of the channel services ST900, ST901, ST902 and ST903 are hierarchically described in the service description tables (SDT) and the event information tables (EIT).

Figure 45:
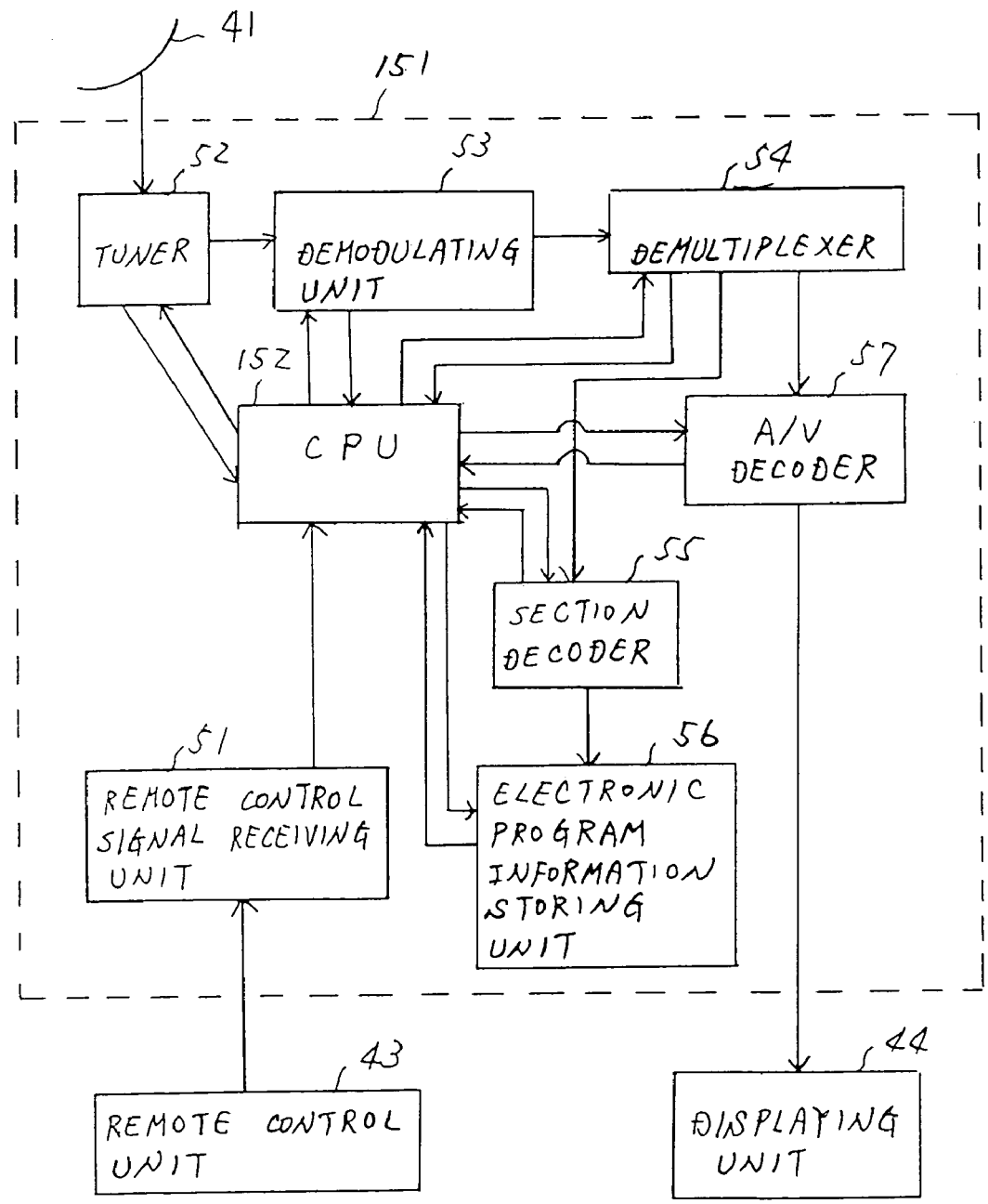
FIG. 45 is a block diagram of an electronic program information receiving terminal including an electronic program guide producing apparatus according to the fifteenth embodiment.

FIG. 45 is a block diagram of an electronic program information receiving terminal including an electronic program guide producing apparatus according to a fifteenth embodiment of the present invention.

As shown in FIG. 45, an electronic program guide producing apparatus 151 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 152 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which pieces of information of a plurality of television programs are hierarchically described and arranged, in cases where a plurality of channel services are hierarchically described in a plurality of service description tables (SDT) and event information tables (EIT) of the electronic program information stored in the storing unit 56, and displaying the electronic program guide on the displaying unit 44.

In the above configuration, in cases where a plurality of channel services, hierarchically described in a plurality of service description tables (SDT) and event information tables (EIT) of the electronic program information, are received from the central broadcasting station system, an electronic program guide, in which pieces of information of a plurality of television programs are hierarchically described and arranged, is produced and displayed.

Accordingly, even though a large number of channel services are transmitted as pieces of electronic program information from the central broadcasting station system to the electronic program guide producing apparatus 151 of each viewer, because the channel services are hierarchically classified into main channel services and sub-channel services to classify information of television programs, the viewer can easily recognize pieces of information of a large number about television programs hierarchically described in the electronic program guide (common electronic program guide or individual electronic program guide), so that the viewer can easily select a particular broadcasting station or a particular television program.

In this embodiment, pieces of information of television programs are hierarchically described in the electronic program guide. However, a plurality of channel services can be hierarchically described in the electronic program guide.

Sixteen Embodiment

In this embodiment, electronic program information, corresponding to main channel services, is carried in all transport streams (TS), and electronic program information, corresponding to each sub-channel service, is carried in a particular transport stream (TS) in which a plurality of television programs of the sub-channel service are transmitted. The correspondence between each transport stream and a group of channel services is determined in advance in the central broadcasting station system.

For example, as shown in FIG. 46, the service description table (SDT) shown in FIG. 40 and the event information tables (EIT) shown in FIG. 42 and FIG. 43 are carried in all transport streams (TS) including the transport streams TS3 and TS5, and the service description table (SDT) shown in FIG. 41 and the event information tables (EIT) shown in FIG. 44 are carried in the transport stream TS5.

Figure 47:
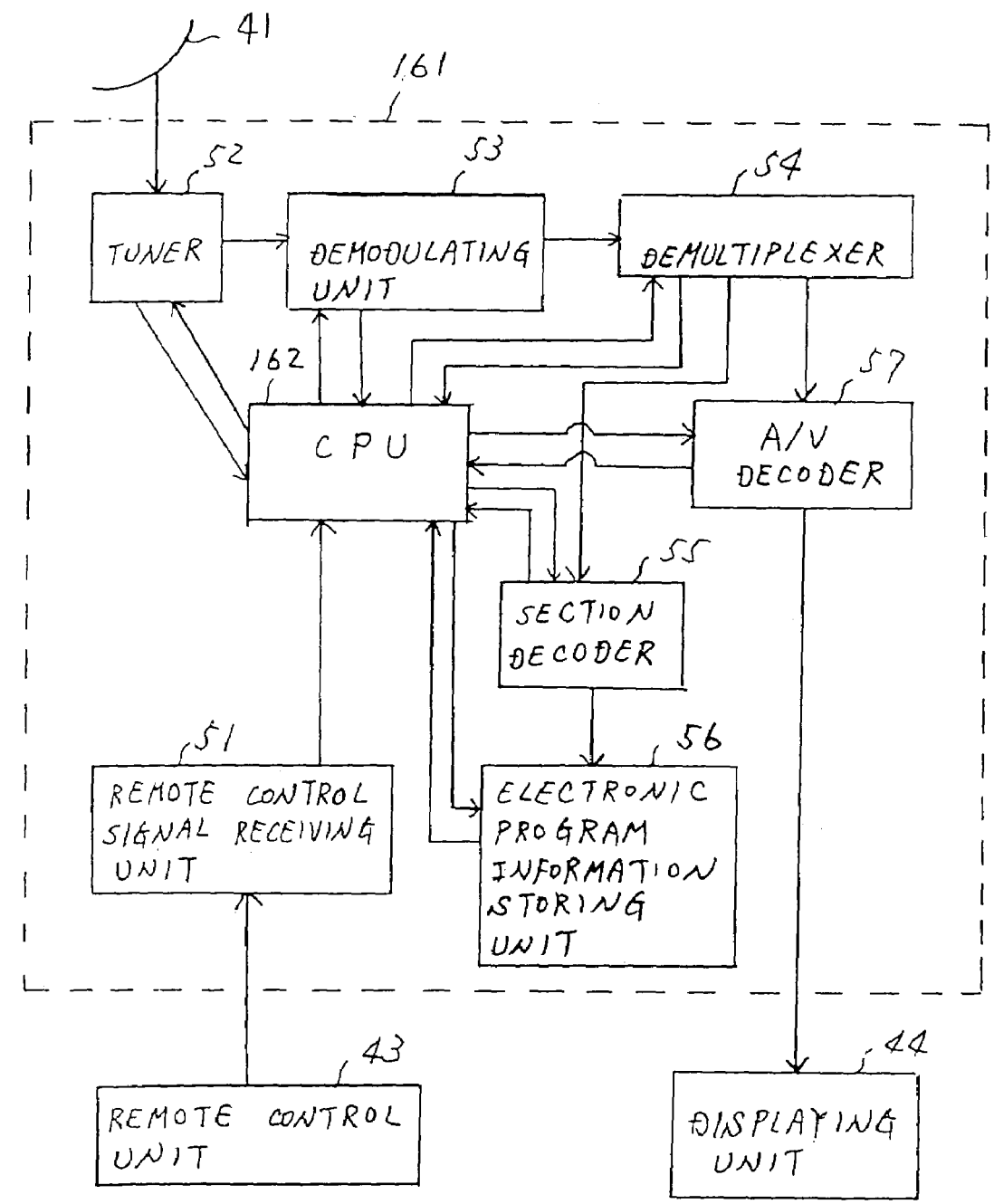
FIG. 47 is a block diagram of an electronic program information receiving terminal including an electronic program guide producing apparatus according to the sixteenth embodiment.

FIG. 47 is a block diagram of an electronic program information receiving terminal including an electronic program guide producing apparatus according to a sixteenth embodiment of the present invention.

As shown in FIG. 47, an electronic program guide producing apparatus 161 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 162 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing a common electronic program guide according to the electronic program information corresponding to main channel services carried in all transport streams, producing an individual electronic program guide of the particular broadcast service provider, in which pieces of information of a plurality of television programs are hierarchically described and arranged, according to the electronic program information corresponding to sub-channel services and main channel services carried in a particular transport stream of the particular broadcast service provider in cases where a plurality of channel services are hierarchically described in a plurality of service description tables SDT and event information tables EIT of the electronic program information stored in the storing unit 56, and displaying the common electronic program guide and the individual electronic program guide on the displaying unit 44.

In the above configuration, a common electronic program guide is produced according to the electronic program information corresponding to main channel services carried in all transport streams. An individual electronic program guide of the particular broadcast service provider is produced according to the electronic program information corresponding to all sub-channel services and all main channel services carried in a particular transport stream of the particular broadcast service provider. The common electronic program guide and the individual electronic program guide are displayed.

For example, a common electronic program guide is produced according to the electronic program information of the channel services ST101 and ST103 carried in the transport stream TS3 and pieces of electronic program information corresponding to other main channel services, and an individual electronic program guide is produced according to the electronic program information of the channel services ST101, ST103, ST900, ST901, ST902 and ST903 carried in the transport stream TS5.

Accordingly, a common electronic program guide and an individual electronic program guide can be easily produced and displayed.

Seventeenth Embodiment

In this embodiment, a broadcast service provider provides television programs of a plurality of channel services carried in a plurality of transport streams for each viewer, and a plurality of main channel services respectively have a group of sub-channel services. In this case, electronic program information corresponding to each group of sub-channel services of the broadcast service provider is carried in each of all transport streams of the broadcast service provider.

For example, as shown in FIG. 48, channel services ST101 and ST103 of television programs provided by a first broadcast service provider are carried in a transport stream TS3. A group of sub-channel services ST900, ST901, ST902 and ST903 subordinate to the channel service ST103 are carried in a transport stream TS5. A channel service ST105 of television programs provided by the first broadcast service provider is carried in a transport stream TS6. A group of sub-channel services ST910 and ST911 subordinate to the channel service ST105 are carried in a transport stream TS7. A channel service ST106 of television programs, provided by a second broadcast service provider, is carried in a transport stream TS7. In this case, the electronic program information corresponding to a first group of sub-channel services ST900, ST901, ST902 and ST903 is carried not only in the transport stream TS5 but also in each of the transport streams TS3, TS6 and TS7, and electronic program information corresponding to a second group of sub-channel services ST910 and ST911 is carried not only in the transport stream TS7 but also in each of the transport streams TS3, TS5 and TS. The correspondence between each broadcast service provider and a group of channel services is determined in advance in the central broadcasting station system.

Figure 49:
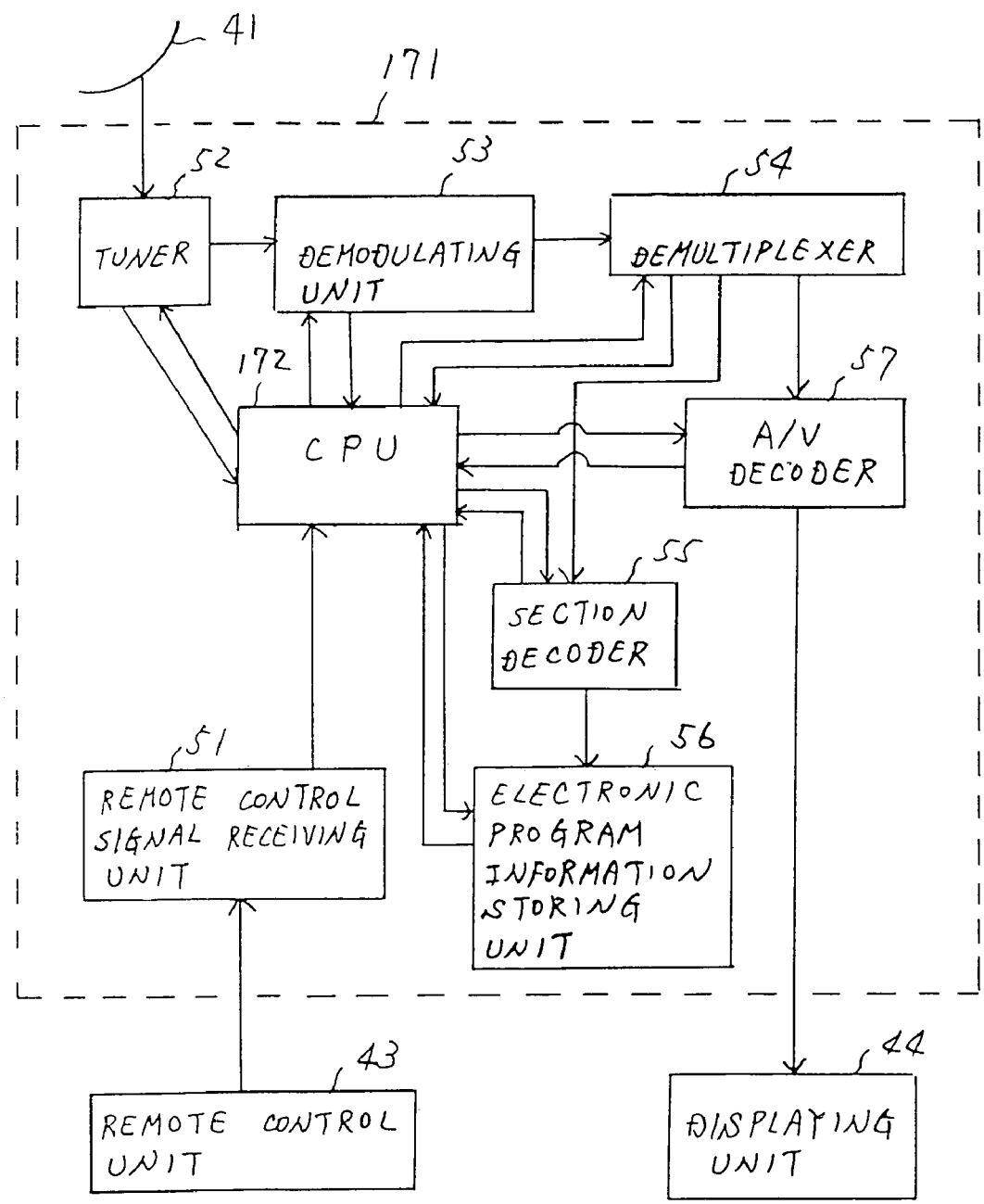
FIG. 49 is a block diagram of an electronic program information receiving terminal including an electronic program guide producing apparatus according to the seventeenth embodiment.

FIG. 49 is a block diagram of an electronic program information receiving terminal including an electronic program guide producing apparatus according to a seventeenth embodiment of the present invention.

As shown in FIG. 49, an electronic program guide producing apparatus 171 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 172 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing a common electronic program guide according to the electronic program information corresponding to main channel services carried in all transport streams, producing an individual electronic program guide of the particular broadcast service provider, in which pieces of information of a plurality of television programs are hierarchically described and arranged, according to the electronic program information corresponding to all groups of sub-channel services and all main channel services carried in one transport stream of the particular broadcast service provider in cases where a plurality of channel services are hierarchically described in a plurality of service description tables SDT and event information tables EIT of the electronic program information stored in the storing unit 56, and displaying the common electronic program guide and the individual electronic program guide on the displaying unit 44.

In the above configuration, electronic program information corresponding to all channel services of a particular broadcast service provider is carried in all of the transform streams of the particular broadcast service provider. When a viewer watches a particular television program carried in a particular transform stream of the particular broadcast service provider, because the electronic program information corresponding to all channel services of the particular broadcast service provider is carried in the particular transform stream, an individual electronic program guide of the particular broadcast service provider is produced according to the electronic program information corresponding to all channel services of the particular broadcast service provider. Therefore, the viewer can watch the individual electronic program guide displayed on the displaying unit 44.

Accordingly, the individual electronic program guide of the particular broadcast service provider, in which information corresponding to all groups of sub-channel services carried in one transport stream of the particular broadcast service provider is included, can be produced and displayed.

Eighteenth Embodiment

In this embodiment, in cases where a viewer selects a particular channel service (or a particular television channel) having a group of sub-channel services subordinate to the particular channel service, an electronic program guide of television programs corresponding to the group of sub-channel services is displayed.

Figure 50:
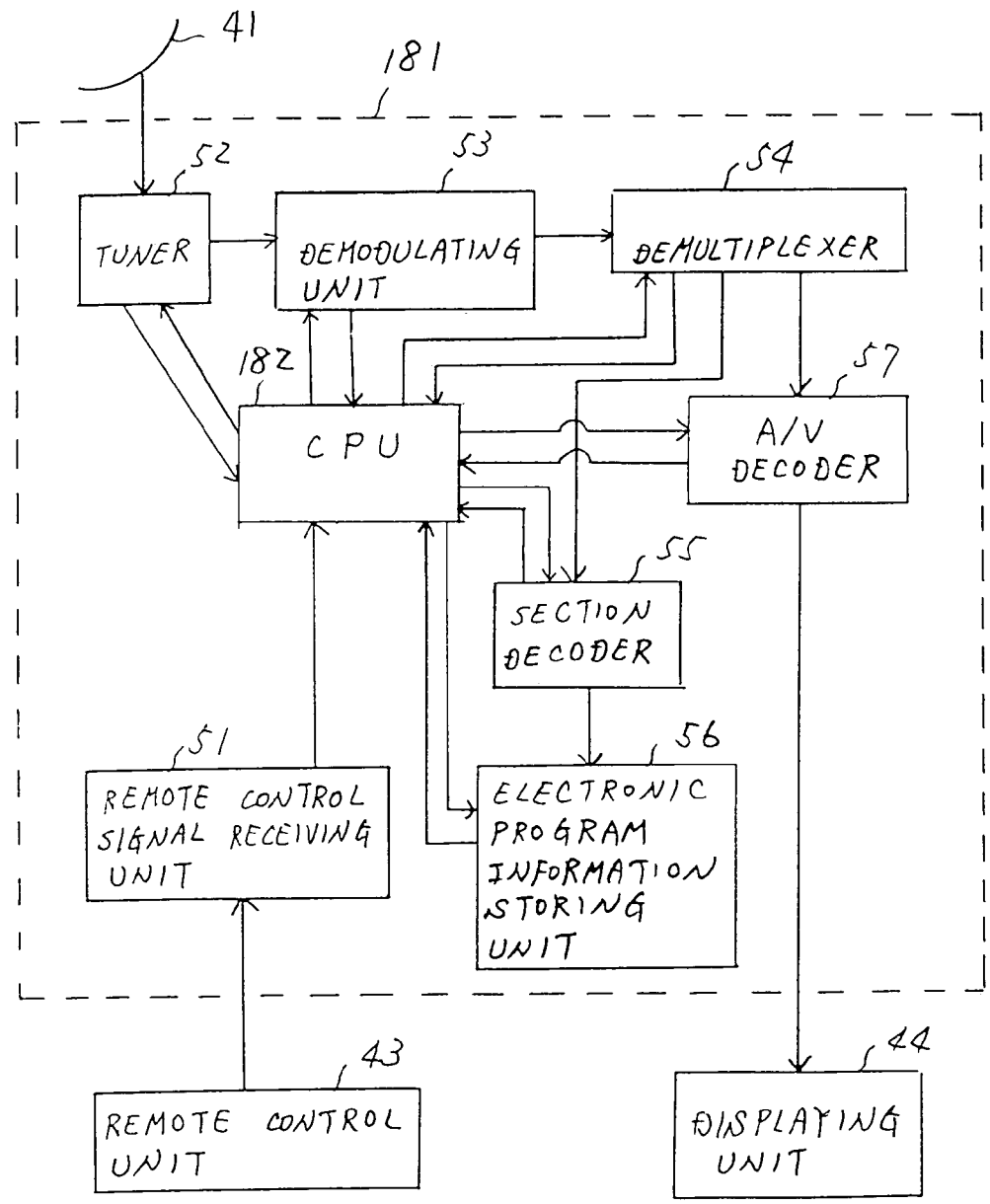
FIG. 50 is a block diagram of an electronic program information receiving terminal including an electronic program guide producing apparatus according to an eighteenth embodiment of the present invention.

FIG. 50 is a block diagram of an electronic program information receiving terminal including an electronic program guide producing apparatus according to an eighteenth embodiment of the present invention.

As shown in FIG. 50, an electronic program guide producing apparatus 181 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 182 for controlling the remote control signal receiving unit 51, the tuner 52, the demodulating unit 53, the demultiplexer 54 and the section decoder 55, controlling the audio/video signal decoder 57 to display a particular television program of the particular broadcast service provider on the displaying unit 44, controlling the electronic program information storing unit 56 to store electronic program information corresponding to each channel service, producing an electronic program guide, in which pieces of information of television programs of a plurality of main channel services are described, in cases where one or more channel services are hierarchically described in a plurality of service description tables (SDT) and event information tables (EIT) of the electronic program information stored in the storing unit 56, producing a subordinate electronic program guide, in which pieces of information of television programs of a group of sub-channel services are described, displaying the electronic program guide on the displaying unit 44, and displaying one subordinate electronic program guide of a group of sub-channel services subordinate to a particular main channel service in cases where the particular main channel service of the electronic program guide displayed is selected by a viewer.

In the above configuration, an electronic program guide, in which pieces of information about television programs of a plurality of main channel services are described, is produced. Also, a subordinate electronic program guide, in which pieces of information about television programs of a group of sub-channel services subordinate to one main channel service are described, is produced for each main channel service.

For example, channel services subordinate to each main channel service and a transport stream of the channel services are specified by referring identification numbers of referenced channels services and an identification number of a reference transport stream described in the service description table shown in FIG. 40 or FIG. 41, and information of the group of sub-channel services subordinate to the main channel service is obtained from the event information table EIT shown in FIG. 44:

Thereafter, the electronic program guide is displayed on the displaying unit 44. An example of the electronic program guide is shown in FIG. 51A. When a viewer selects a particular channel service of the electronic program guide, a particular subordinate electronic program guide corresponding to the particular channel service is automatically displayed on the displaying unit 44. An example of the subordinate electronic program guide is shown in FIG. 51B. As shown in FIG. 51A, when a television channel CH33 is selected as a particular main channel service, information of television programs of a plurality of television channels CH50 to CH55 is displayed as a particular subordinate electronic program guide.

In cases where the particular main channel service has no sub-channel service, no subordinate electronic program guide is displayed.

Accordingly, even though there are a large number of channel services, because a plurality of electronic program guides of television programs of the channel services are hierarchically classified, the viewer can easily select an electronic program guide of desired television programs, so that the viewer can easily specify a particular television program of a particular broadcast service provider.

Also, even if one or more channel services or television channels are added to an electronic program guide, the additional channel services or television channels can be easily arranged in the electronic program guide.

In this embodiment, a channel service is selected by the viewer. However, a television channel can be directly selected.

Nineteenth Embodiment

In this embodiment, as shown in FIG. 52, a default sub-channel service selecting flag is set for each sub-channel service in the service description table SDT, and the default sub-channel service selecting flag is set to "on" in one of the sub-channel services. Therefore, when a viewer selects the sub-channel services, a particular sub-channel service, in which a default sub-channel service selecting flag is set to "on", is automatically selected, and a particular television channel corresponding to the particular sub-channel service is selected.

Figure 53:
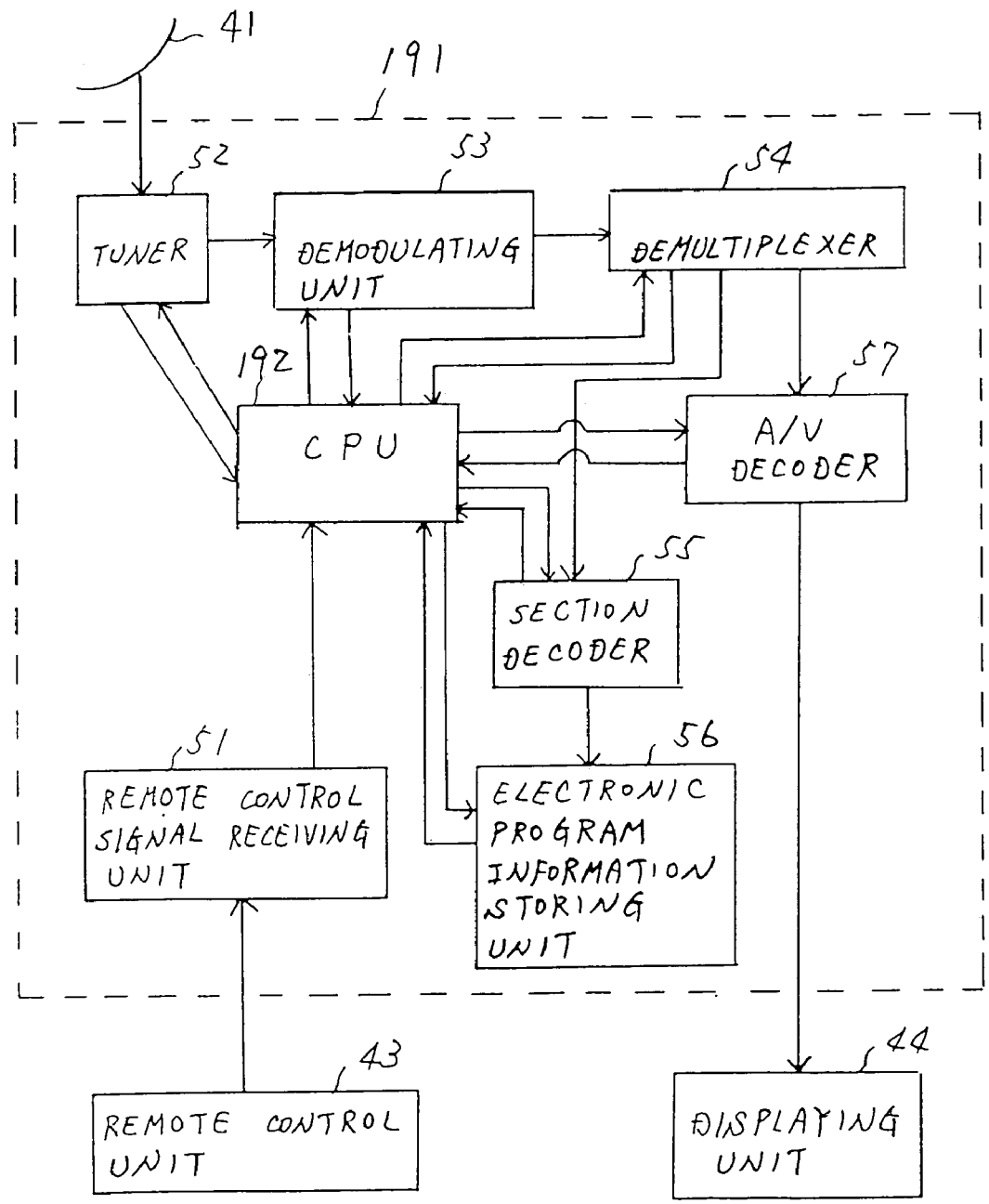
FIG. 53 is a block diagram of an electronic program information receiving terminal including an electronic program guide producing apparatus according to the nineteenth embodiment.

FIG. 53 is a block diagram of an electronic program information receiving terminal including an electronic program guide producing apparatus according to a nineteenth embodiment of the present invention.

As shown in FIG. 53, an electronic program guide producing apparatus 191 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 192 for controlling the remote control signal receiving unit 51, the tuner 52, the demodulating unit 53, the demultiplexer 54 and the section decoder 55, controlling the electronic program information storing unit 56 to store electronic program information corresponding to each channel service, producing an electronic program guide, in which pieces of information of television programs of a plurality of main channel services are described, in cases where one or more channel services are hierarchically described in a plurality of service description tables (SDT) and event information tables (EIT) of the electronic program information stored in the storing unit 56 and a default sub-channel service selecting flag is set in the event information table (EIT) of sub-channel services for each sub-channel service, producing a subordinate electronic program guide, in which pieces of information of television programs of a group of sub-channel services are described, displaying the electronic program guide on the displaying unit 44, and controlling the audio/video signal decoder 57 to display a particular television program currently broadcast in a particular sub-channel service on the displaying unit 44, on condition that a default sub-channel service selecting flag is set to "on" for the particular sub-channel service which is one of sub-channel services subordinate to a particular main channel service, in cases where the particular main channel service of the electronic program guide displayed is selected by a viewer.

In the above configuration, when the viewer selects a particular main channel service of the electronic program guide to be displayed, a plurality of sub-channel services, subordinate to the particular main channel service, is specified, a particular sub-channel service, in which a default sub-channel service selecting flag is set to "on", is automatically selected from the sub-channel services, and a particular television program currently broadcast in the particular sub-channel service is displayed on the displaying unit 44.

Accordingly, because each broadcast service provider can specify a particular sub-channel service automatically selected, the broadcast service provider can make the viewer select the most important sub-channel service determined by the broadcast service provider. Therefore, an advertisement effect can be increased.

Twentieth Embodiment

In this embodiment, as shown in FIG. 54, a viewer attribute such, as the age of the viewer or the residential district of the viewer, is set for each sub-channel service in the service description table (SDT).

Figure 55:
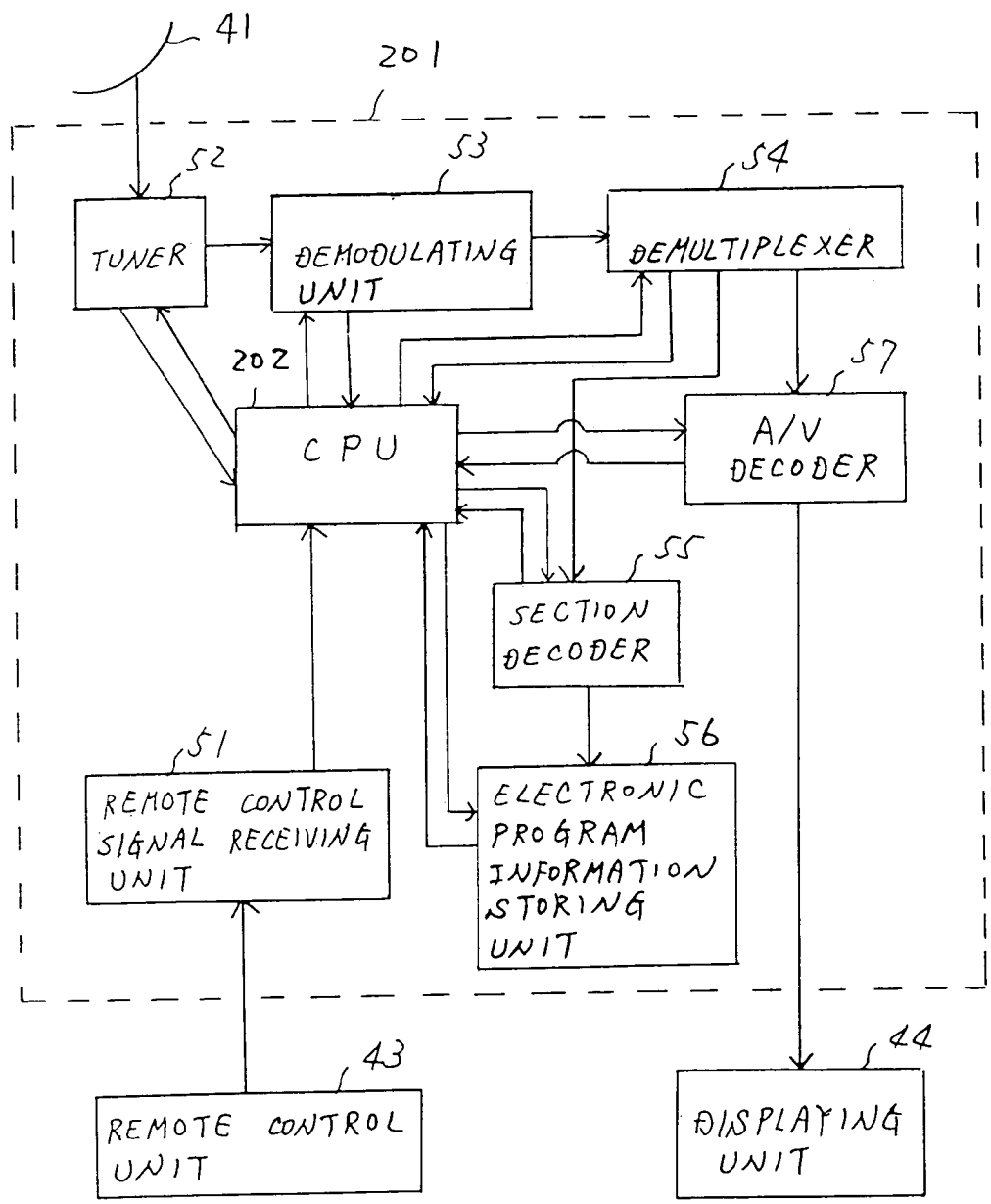
FIG. 55 is a block diagram of an electronic program information receiving terminal including an electronic program guide producing apparatus according to the twentieth embodiment.

FIG. 55 is a block diagram of an electronic program information receiving terminal including an electronic program guide producing apparatus according to a twentieth embodiment of the present invention.

As shown in FIG. 55, an electronic program guide producing apparatus 201 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 202 for controlling the remote control signal receiving unit 51, the tuner 52, the demodulating unit 53, the demultiplexer 54 and the section decoder 55, controlling the electronic program information storing unit 56 to store electronic program information corresponding to each channel service, producing an electronic program guide, in which pieces of information of television programs of a plurality of main channel services are described, in cases where one or more channel services are hierarchically described in a plurality of service description tables SDT and event information tables EIT of the electronic program information stored in the storing unit 56 and a viewer attribute is set in the event information table EIT of sub-channel services for each sub-channel service, producing a subordinate electronic program guide, in which pieces of information of television programs of a group of sub-channel services are described, displaying the electronic program guide on the displaying unit 44, and controlling the audio video signal decoder 57 to display a particular television program currently broadcast on a particular sub-channel service on the displaying unit 44, on condition that a viewer attribute of the particular sub-channel service subordinate to a particular main channel service agrees with an attribute input by the viewer, in cases where the particular main channel service of the electronic program guide displayed is selected by the viewer.

In the above configuration, as shown in FIG. 54, when the viewer selects a main channel service ST103, a viewer attribute of each sub-channel service subordinate to the main channel service ST103 is compared with an attribute input by the viewer, and a particular sub-channel service, in which a viewer attribute agrees with the attribute input by the viewer, is automatically selected. For example, in cases where the age of the viewer is 65 years old, a particular sub-channel service TS902 is selected. Thereafter, a particular television program currently broadcast in the particular sub-channel service is displayed on the displaying unit 44.

Accordingly, because one sub-channel service is automatically selected from a plurality of sub-channel services by inputting the attribute of the viewer, the viewer can easily select a sub-channel service suitable for the viewer without any problem.

Also, each broadcast service provider can select a limited group of viewers from a large number of viewers to make the limited group of viewers watch television programs of a particular sub-channel service according to a common attribute of the limited group of viewers.

Twenty-First Embodiment

In this embodiment, as shown in FIG. 56, a genre, such as movie, sports or news, is set for each sub-channel service in the service description table (SDT). Also, a genre suitable for the viewer is registered in advance in the central broadcasting station system or is determined in the central broadcasting station system according to television program viewing records of the viewer.

Figure 57:
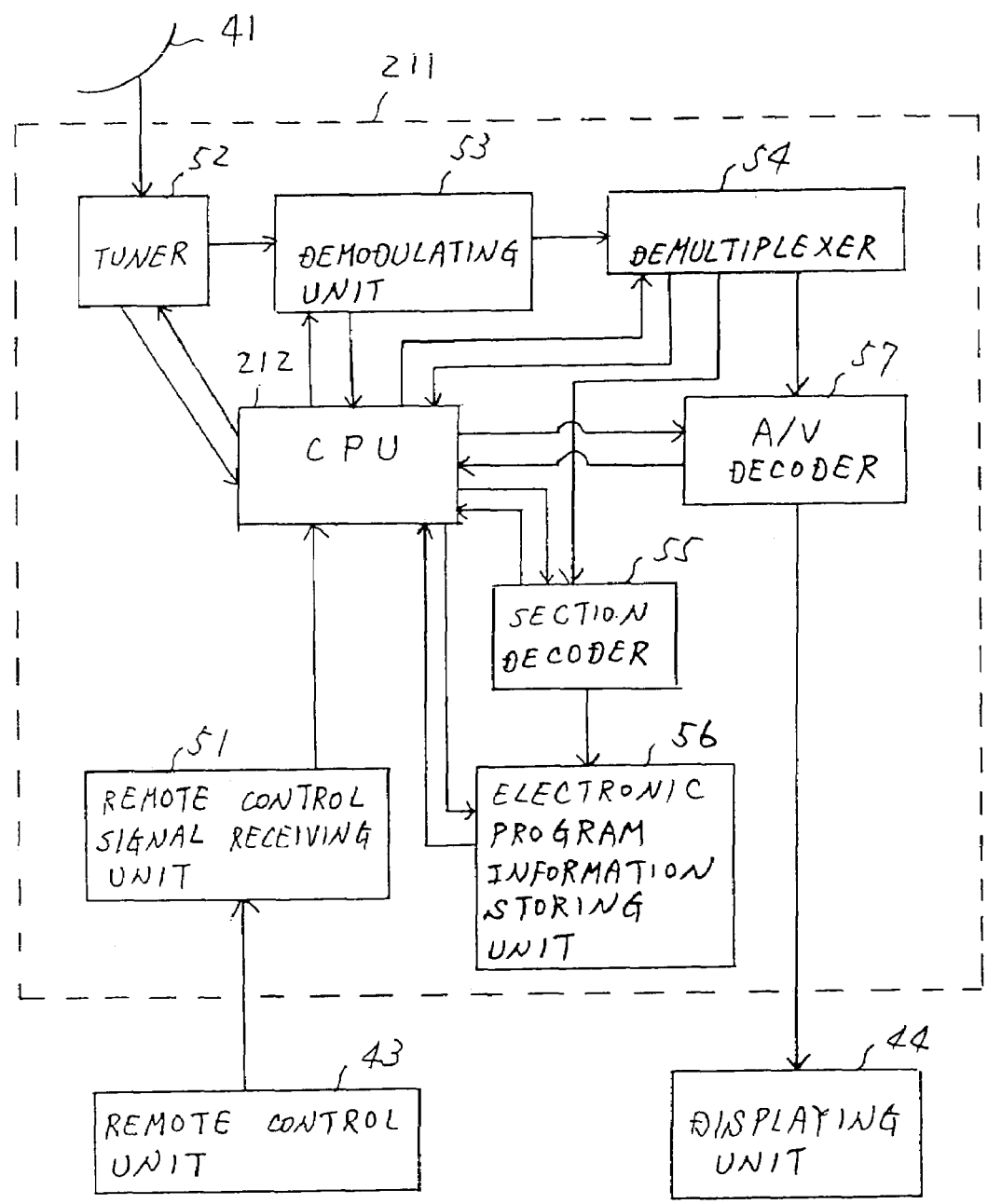
FIG. 57 is a block diagram of an electronic program information receiving terminal including an electronic program guide producing apparatus according to the twenty-first embodiment.

FIG. 57 is a block diagram of an electronic program information receiving terminal including an electronic program guide producing apparatus according to a twenty-first embodiment of the present invention.

As shown in FIG. 57, an electronic program guide producing apparatus 211 comprises:

the remote control signal receiving unit 51, the tuner 52; the demodulating unit 53; the demultiplexer 54; the section decoder 55; the electronic program information storing unit 56; the audio/video signal decoder 57; and a central processing unit (CPU) 212 for controlling the remote control signal receiving unit 51, the tuner 52, the demodulating unit 53, the demultiplexer 54 and the section decoder 55, controlling the electronic program information storing unit 56 to store electronic program information corresponding to each channel service, producing an electronic program guide, in which pieces of information of television programs of a plurality of main channel services are described, in cases where one or more channel services are hierarchically described in a plurality of service description tables SDT and event information tables EIT of the electronic program information stored in the storing unit 56 and a genre is set in the event information table EIT of sub-channel services for each sub-channel service, producing a subordinate electronic program guide, in which pieces of information of television programs of a group of sub-channel services are described, displaying the electronic program guide on the displaying unit 44, and controlling the audio/video signal decoder 57 to display a particular television program currently broadcast in a particular sub-channel service on the displaying unit 44, on condition that a genre of the particular sub-channel service subordinate to a particular main channel service agrees with a viewer genre, in cases where the particular main channel service of the electronic program guide displayed is selected by the viewer.

In the above configuration, as shown in FIG. 56, when the viewer selects the main channel service ST103, a genre of each sub-channel service, subordinate to the main channel service ST103, is compared with a viewer selected genre, and a particular sub-channel service, having a genre that agrees with the viewer selected genre, is automatically selected. For example, in cases where the viewer has an interest in a "movie" genre, a particular sub-channel service TS900 is selected. Thereafter, a particular television program currently broadcast over the particular sub-channel service is displayed on the displaying unit 44.

Accordingly, because one sub-channel service is automatically selected from a plurality of sub-channel services, the viewer can easily select a sub-channel service suitable for the viewer without any problem.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. An electronic program information preparing and transmitting apparatus adapted to prepare electronic program information related to a plurality of channel services and for transmitting the prepared electronic program information to at least one users' terminals via a plurality of transport streams, comprising:

electronic program information preparing means for preparing:
(i): distributing information means indicating which channel service should be distributed to which transport stream and indicating correspondences, respectively, between the transport streams and the channel services broadcast by each of a plurality of broadcast service stations, wherein the correspondences include a correspondence between plural transport streams from among said transport steams and plural channel services which are at least part of the channel services that are adapted to be broadcast by the plurality of broadcast service stations and which are adapted to be broadcast by the same broadcast service station, and
(ii): a plurality of channel services, comprising:
a first type of electronic program information related to each of said channel services; and
a second type of electric program information related to each of the channel services;
wherein the first type of electronic program information is described with a first degree of detail of program information and the second type of electronic program information is described with a second degree of detail of program information, and
wherein said first degree of detail of program information is greater, in a period covering the channel services, than said second degrees of detail of program information;
electronic program information distributing means for distributing, on the basis of the distributing information, to each transport stream:
(i): the first type of electronic program information concerning each channel service to a first transport stream assigned to the channel service,
wherein, the first type of electronic program information concerning each of the plural channel services broadcast by the same broadcast service station is adapted to be distributed to each of the plural transport streams assigned to the same broadcast service station, and
(ii): the second type of electronic program information concerning each channel service is adapted to be distributed to the remaining at least one transport streams other than the first transport stream; and
transmitting means, for transmitting at least the transport streams to which the electronic program information has been distributed, in which the transmission of the transport streams to the users' terminals is adapted to allow each of the users' terminals to receive said first and second degrees of detail of program information so as to display the electronic program information occupying, in its description, both of a period of time for a currently tuned channel service and a second period of time for non-tuned channel services, the first period of time being longer that the second period of time in the period covering the channel services.

2. The electronic program information preparing and transmitting apparatus according to claim 1, wherein the electronic program information preparing means is configured to be adapted to produce the distributing information indicating correspondences between, respectively, the transport streams and the channel services broadcast by each of a plurality of broadcast service stations;
wherein the distribution information includes a correspondence between plural transport streams among the transport steams and plural channel services broadcast by the same broadcast service station, respectively,
wherein the electronic program information distributing means is configured to be adapted to distribute, to each of the plural transport streams assigned to the same broadcast service station, the first type of electronic program information concerning each of the plural channel services broadcast by the same broadcast service station.

3. The electronic program information preparing and transmitting apparatus according to claim 2, wherein the electronic program information preparing means is configured to be adapted to change the first and second degrees of detail of program information on the basis of a degree of detail setting electronic information that assigns a different degree of detail to the first and second types of electric program information.

4. A method of preparing electronic program information related to a plurality of channel services, respectively, and transmitting the prepared electronic program information to at least one users' terminals via a plurality of transport streams, the method comprising the steps of:

preparing:
(i): distributing information indicating which channel service should be distributed to which transport stream and indicating respective correspondences between the transport streams and the channel services broadcast by each of a plurality of broadcast service stations, wherein the correspondences include correspondence between plural transport streams among the transport steams and plural channel services that are at least part of the channel services broadcast by the plurality of broadcast service stations and that are broadcast by the same broadcast service station; and
(ii): for each of a plurality of said channel services, both a first type of electronic program information related to the channel service and a second type of electric program information related to the channel service;
wherein the first type of electronic program information is described with a first degree of detail of program information; and
wherein the second type of electronic program information is described with a second degree of detail of program information, the first degree of program information is greater in a period covering the channel services, from the second degree of detail of program information;
distributing, on the basis of the distributing information:
(i): the first type of electronic program information, with respect to each channel service, to a transport stream assigned to a first channel service, wherein the first type of electronic program information, concerning each of the plural channel services broadcast by the same broadcast service station, is distributed to each of the plural transport streams assigned to the same broadcast service station, and (ii): the second type of electronic program information, concerning each channel service, to the remaining at least one transport streams, other than said first transport stream; and transmitting at least the transport streams, to which the electronic program information has been distributed, in which the transmission of the transport streams to the users' terminals is adapted to allow each of the users' terminals to receive said first and second degrees of detail of program information so as to display the electronic program information occupying, in its description, both of the first period of time for a currently tuned channel service and a second period of time for non-tuned channel services, the first period of time being longer that the second period of time in the period covering the channel services.

5. The method according to claim 4, wherein the electronic program information preparing step is adapted to produce the distributing information indicating correspondences between the transport streams and the channel services broadcast by each of a plurality of broadcast service stations, wherein the distribution information is adapted to include a correspondence between plural transport streams, among the transport steams, and plural channel services broadcast by the same broadcast service station, wherein the electronic program information distributing step is adapted to distribute, to each of the plural transport streams assigned to the same broadcast service station, the first type of electronic program information concerning each of the plural channel services broadcast by the same broadcast service station.

6. An electronic program information preparing and transmitting apparatus adapted to prepare electronic program information related to a plurality of channel services and for transmitting the prepared electronic program information to at least one users' terminal(s) via a plurality of transport streams, comprising:

(i): means for distributing information indicating which channel service should be distributed to which transport steam and indicating correspondences, respectively, between the transport streams and the channel services broadcast by a plurality of broadcast service stations, wherein the correspondences include a correspondence between plural transport streams from among said transport streams and plural channel services which are at least part of the channel services that are adapted to be broadcast by the plurality of broadcast service stations and which are adapted to be broadcast by the same broadcast service station, and (ii): a plurality of channel services, comprising:

a first type of electronic program information related to each of the channel services; and a second type of electronic program information related to each of the channel services;

wherein the first type of electronic program information is described with a first degree of detail of program information and the second type of electronic program information is described with a second degree of detail of program information, and wherein said first degree of detail of program information is greater, in the amount of program information with respect to each channel service, than said second degree of detail of program information;

electronic program information distributing means for distributing, on the basis of the distributing information, to each transport stream:

(i): the first type of electronic program information concerning each channel service to a first transport stream assigned to the channel service, wherein, the first type of electronic program information concerning each of the plural channel services broadcast by the same broadcast service station is adapted to be distributed to each of the plural transport streams assigned to the same broadcast service station, and (ii): the second type of electronic program information concerning each channel service is adapted to be distributed to the remaining at least one transport streams other than the first transport stream; and transmitting means for transmitting at least the transport streams, to which the electronic program information has been distributed, in which the transmission of the transport streams to the users' terminals is adapted to allow each of the users' terminals to receive said first and second degrees of detail of program information so as to display the electronic program information having both of a first amount of program information for a currently tuned channel service and a second amount of program information for non-tuned channel services, the first amount of program information being greater than the second amount of program information in the amount of program information with respect to each channel service.

7. A method of preparing electronic program information related to a plurality of channel services, respectively, and transmitting the prepared electronic program information to at least one users' terminals via a plurality of transport streams, the method comprising the steps of:

preparing (i): distributing information indicating which channel service should be distributed to which transport stream and indicating respective correspondences between the transport streams and the channel services broadcast by each of a plurality of broadcast service stations, wherein the correspondences include correspondence between plural transport streams among the transport steams and plural channel services that are at least part of the channel services broadcast by the plurality of broadcast service stations and that are broadcast by the same broadcast service station; and (ii): for each of a plurality of said channel services, both a first type of electronic program information related to the channel service and a second type of electric program information related to the channel service;

wherein the first type of electronic program information is described with a first degree of detail of program information; and wherein the second type of electronic program information is described with a second degree of detail of program information and the first degree of program information is greater, in an amount of program information with respect to each channel service, from the second degree of detail of program information;

distributing, on the basis of the distributing information:

(i): the first type of electronic program information, with respect to each channel service, to a transport stream assigned to a first channel service, wherein the first type of electronic program information, concerning each of the plural channel services broadcast by the same broadcast service station, is distributed to each of the plural transport streams assigned to the same broadcast service station, and (ii): the second type of electronic program information, concerning each channel service, to the remaining at least one transport streams, other than said first transport stream; and transmitting at least the transport streams, to which the electronic program information has been distributed, in which the transmission of the transport streams to the users' terminals is adapted to allow each of the users' terminals to receive said first and second degrees of detail of program information so as to display the electronic program information having both of a first amount of program information for a currently tuned channel service and a second amount of program information for non-tuned channel services, the first amount of program information being greater than the second amount of program information in the amount of program information with respect to each channel service.

* * * * *

UNITED STATES PATENT AND TRADEMARK OFFICE
CERTIFICATE OF CORRECTION

PATENT NO.        : 7,516,467 B1                                          Page 1 of 1
APPLICATION NO.   : 09/204142
DATED             : April 7, 2009
INVENTOR(S)       : Yuko Arai et al.

It is certified that error appears in the above-identified patent and that said Letters Patent is hereby corrected as shown below:

Title Page, Item [56] REFERENCE:
Jan et al. US Patent 5,579,055
Received in the Patent Office on June 21, 2001 as part of an IDS Claim 1, penultiate line (Column 52, line 3): "that" should be "than";
Claim 5, line 8 (Column 53, line 24): "seams" should be "streams";
Claim 6, line 9 (Column 53, line 40): "steam" should be "stream";
Claim 7, line 6 (Column 54, line 40): "steams" should be "streams".

Signed and Sealed this

Twenty-sixth Day of January, 2010

David J. Kappos
*Director of the United States Patent and Trademark Office*